United States Patent
Zhu et al.

(10) Patent No.: US 12,132,884 B2
(45) Date of Patent: Oct. 29, 2024

(54) PALETTE MODE CODING IN PREDICTION PROCESS

(71) Applicants: Beijing Bytedance Network Technology Co., Ltd., Beijing (CN); Bytedance Inc., Los Angeles, CA (US)

(72) Inventors: Weijia Zhu, San Diego, CA (US); Li Zhang, San Diego, CA (US); Jizheng Xu, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/585,704

(22) Filed: Jan. 27, 2022

(65) Prior Publication Data
US 2022/0159241 A1    May 19, 2022

Related U.S. Application Data

(63) Continuation of application No. PCT/CN2020/105405, filed on Jul. 29, 2020.

(30) Foreign Application Priority Data

Jul. 29, 2019   (WO) ................ PCT/CN2019/098204

(51) Int. Cl.
*H04N 19/105*   (2014.01)
*H04N 19/132*   (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/186* (2014.11)

(58) Field of Classification Search
CPC .. H04N 19/107; H04N 19/186; H04N 19/139; H04N 19/52; H04N 19/159; H04N 19/503; H04N 19/593
See application file for complete search history.

(56) References Cited

U.S. PATENT DOCUMENTS 9,374,578 B1 *  6/2016  Mukherjee ........... H04N 19/182
9,900,617 B2    2/2018  Karczewicz et al.
(Continued)

FOREIGN PATENT DOCUMENTS

CN      102804776 A     11/2012
CN      105704491 A      6/2016
(Continued)

OTHER PUBLICATIONS

"An Efficient Combined Inter and Intra Prediction Scheme for Video Coding"—Run Cha, Oscar C. Au, Xiaopeng Fan, Feng Zou; APSIPA ASC 2011 (Year: 2011).*

(Continued)

*Primary Examiner* — Mainul Hasan
(74) *Attorney, Agent, or Firm* — Perkins Coie LLP

(57) ABSTRACT

Devices, systems and methods for video processing are described. An example method for video processing includes determining, for a conversion between a current block of a video and a bitstream representation of the video, a number of intra-coded neighboring blocks of the current block for a combined inter and intra prediction mode according to a rule that specifies a manner of treating a block coded using a palette coding mode in counting the number of intra-coded neighboring blocks for the combined inter and intra prediction mode. The method also includes performing the conversion based on the determining.

20 Claims, 47 Drawing Sheets

Current picture

(51) Int. Cl.
  *H04N 19/159* (2014.01)
  *H04N 19/176* (2014.01)
  *H04N 19/186* (2014.01)
  *H04N 19/70* (2014.01)

(56) References Cited

U.S. PATENT DOCUMENTS

| | | |
|---|---|---|
| 10,148,981 B2 | 12/2018 | Zhu et al. |
| 10,277,910 B2 | 4/2019 | Xiu et al. |
| 10,484,686 B2 | 11/2019 | Xiu et al. |
| 10,659,783 B2 | 5/2020 | Li et al. |
| 10,681,383 B2 | 6/2020 | Ye et al. |
| 10,735,764 B2 | 8/2020 | Tsai et al. |
| 10,812,817 B2 | 10/2020 | Li et al. |
| 11,611,753 B2 | 3/2023 | Zhu et al. |
| 11,677,935 B2 | 6/2023 | Zhu et al. |
| 11,677,953 B2 | 6/2023 | Zhu et al. |
| 11,683,503 B2 | 6/2023 | Zhu et al. |
| 11,924,432 B2 | 3/2024 | Zhu et al. |
| 2008/0192824 A1 | 8/2008 | Lim et al. |
| 2012/0257678 A1 | 10/2012 | Zhou et al. |
| 2015/0264354 A1 | 9/2015 | Zhang et al. |
| 2015/0264365 A1 | 9/2015 | Tsai et al. |
| 2015/0312573 A1 | 10/2015 | Bugdayci et al. |
| 2015/0341635 A1* | 11/2015 | Seregin ............... H04N 19/176 375/240.16 |
| 2015/0341673 A1 | 11/2015 | Joshi et al. |
| 2015/0358631 A1 | 12/2015 | Zhang et al. |
| 2015/0373325 A1 | 12/2015 | Karczewicz et al. |
| 2015/0373327 A1 | 12/2015 | Zhang et al. |
| 2016/0057430 A1 | 2/2016 | Kolesnikov et al. |
| 2016/0100171 A1 | 4/2016 | Karczewicz et al. |
| 2016/0100179 A1 | 4/2016 | He et al. |
| 2016/0100184 A1 | 4/2016 | Liu et al. |
| 2016/0105670 A1 | 4/2016 | Pang et al. |
| 2016/0212438 A1 | 7/2016 | Andersson et al. |
| 2016/0227211 A1 | 8/2016 | Gisquet et al. |
| 2016/0227221 A1 | 8/2016 | Lai et al. |
| 2016/0227225 A1 | 8/2016 | Zou et al. |
| 2016/0227226 A1 | 8/2016 | Rapaka et al. |
| 2016/0227231 A1 | 8/2016 | Xiu et al. |
| 2016/0234498 A1 | 8/2016 | Misra et al. |
| 2016/0241852 A1 | 8/2016 | Gamei et al. |
| 2016/0316214 A1 | 10/2016 | Gisquet et al. |
| 2016/0381388 A1 | 12/2016 | Kazui et al. |
| 2017/0054988 A1 | 2/2017 | Lin et al. |
| 2017/0078683 A1 | 3/2017 | Seregin et al. |
| 2017/0085891 A1 | 3/2017 | Seregin et al. |
| 2017/0099490 A1 | 4/2017 | Seregin et al. |
| 2017/0127058 A1* | 5/2017 | Misra ................... H04N 19/44 |
| 2017/0127090 A1 | 5/2017 | Rosewarne et al. |
| 2017/0195676 A1 | 7/2017 | Chuang et al. |
| 2017/0374384 A1 | 12/2017 | Xiu et al. |
| 2018/0041757 A1 | 2/2018 | Liu et al. |
| 2018/0041774 A1* | 2/2018 | Zhu ................... H04N 19/597 |
| 2018/0160129 A1 | 6/2018 | Kalevo et al. |
| 2018/0262763 A1 | 9/2018 | Seregin et al. |
| 2018/0288415 A1 | 10/2018 | Li et al. |
| 2018/0376149 A1 | 12/2018 | Zhang et al. |
| 2019/0158854 A1 | 5/2019 | He et al. |
| 2019/0174145 A1 | 6/2019 | Zhang et al. |
| 2019/0215521 A1 | 7/2019 | Chuang et al. |
| 2019/0215524 A1 | 7/2019 | Lee |
| 2019/0222839 A1 | 7/2019 | Jang et al. |
| 2019/0246122 A1 | 8/2019 | Zhang et al. |
| 2019/0281311 A1 | 9/2019 | Ye et al. |
| 2020/0020134 A1 | 1/2020 | Tsukuba |
| 2020/0092546 A1 | 3/2020 | Ye et al. |
| 2020/0169745 A1 | 5/2020 | Han et al. |
| 2020/0213591 A1 | 7/2020 | Sun et al. |
| 2020/0244962 A1 | 7/2020 | Li et al. |
| 2020/0252621 A1 | 8/2020 | Xu et al. |
| 2020/0280742 A1 | 9/2020 | Ramasubramonian et al. |
| 2020/0288145 A1 | 9/2020 | Chuang et al. |
| 2020/0288175 A1 | 9/2020 | Chang et al. |
| 2020/0296423 A1 | 9/2020 | Chao et al. |
| 2020/0322630 A1 | 10/2020 | Tsai et al. |
| 2020/0329257 A1 | 10/2020 | Zhao et al. |
| 2020/0336735 A1 | 10/2020 | Chang et al. |
| 2020/0374545 A1 | 11/2020 | Lai et al. |
| 2020/0389667 A1 | 12/2020 | Zhao et al. |
| 2020/0404253 A1* | 12/2020 | Chen ....................... G11B 33/14 |
| 2020/0413071 A1* | 12/2020 | Huang ................. H04N 19/159 |
| 2021/0006794 A1 | 1/2021 | Karczewicz et al. |
| 2021/0136405 A1 | 5/2021 | Chen et al. |
| 2021/0235072 A1* | 7/2021 | Ko ....................... H04N 19/105 |
| 2021/0297657 A1 | 8/2021 | Lee |
| 2021/0306638 A1 | 9/2021 | Kang et al. |
| 2021/0368180 A1 | 11/2021 | Park et al. |
| 2021/0409686 A1 | 12/2021 | Xu |
| 2021/0409745 A1 | 12/2021 | Ikai et al. |
| 2022/0007010 A1* | 1/2022 | Van der Auwera .. H04N 19/182 |
| 2022/0007021 A1 | 1/2022 | Jang |
| 2022/0070487 A1 | 3/2022 | Park et al. |
| 2022/0078433 A1 | 3/2022 | Yoo et al. |
| 2022/0086449 A1 | 3/2022 | Koo et al. |
| 2022/0103858 A1 | 3/2022 | Jang et al. |
| 2022/0150475 A1 | 5/2022 | Zhu et al. |
| 2022/0182636 A1 | 6/2022 | Zhu et al. |
| 2022/0232205 A1 | 7/2022 | Chiang et al. |
| 2022/0377341 A1 | 11/2022 | Zhu et al. |
| 2023/0059345 A1 | 2/2023 | Zhu et al. |
| 2023/0060824 A1 | 3/2023 | Zhu et al. |

FOREIGN PATENT DOCUMENTS

| | | |
|---|---|---|
| CN | 105791824 A | 7/2016 |
| CN | 105981385 A | 9/2016 |
| CN | 106105202 A | 11/2016 |
| CN | 106105203 A | 11/2016 |
| CN | 106105205 A | 11/2016 |
| CN | 106105207 A | 11/2016 |
| CN | 106170979 A | 11/2016 |
| CN | 106416249 A | 2/2017 |
| CN | 106464875 A | 2/2017 |
| CN | 106464885 A | 2/2017 |
| CN | 106471809 A | 3/2017 |
| CN | 106534846 A | 3/2017 |
| CN | 106664405 A | 5/2017 |
| CN | 106716999 A | 5/2017 |
| CN | 106797475 A | 5/2017 |
| CN | 106797478 A | 5/2017 |
| CN | 107005717 A | 8/2017 |
| CN | 107211134 A | 9/2017 |
| CN | 107409215 A | 11/2017 |
| CN | 107409225 A | 11/2017 |
| CN | 107646195 A | 1/2018 |
| CN | 107710760 A | 2/2018 |
| CN | 107852497 A | 3/2018 |
| CN | 107925759 A | 4/2018 |
| CN | 108495135 A | 9/2018 |
| CN | 109076210 A | 12/2018 |
| CN | 109479137 A | 3/2019 |
| CN | 109547790 A | 3/2019 |
| CN | 109891883 A | 6/2019 |
| EP | 3251358 A1 | 6/2017 |
| EP | 3211900 A1 | 8/2017 |
| EP | 3301914 A1 | 4/2018 |
| EP | 3422717 A1 | 1/2019 |
| EP | 3912351 A1 | 11/2021 |
| EP | 3987791 A4 | 8/2022 |
| GB | 201509936 | 7/2015 |
| JP | 2017521920 A | 8/2017 |
| JP | 2017522839 A | 8/2017 |
| RU | 2483467 C2 | 5/2012 |
| RU | 2678490 C2 | 5/2012 |
| WO | 20140205561 A1 | 12/2014 |
| WO | 2015074047 A1 | 5/2015 |
| WO | 2015091879 A2 | 6/2015 |
| WO | 2015096808 A1 | 7/2015 |
| WO | 2015192800 A1 | 12/2015 |
| WO | 2015196117 A1 | 12/2015 |
| WO | 2015196126 A1 | 12/2015 |
| WO | 2016004086 A1 | 1/2016 |

(56) References Cited

FOREIGN PATENT DOCUMENTS

| WO | 2016048834 A1 | 3/2016 |
|---|---|---|
| WO | 2016074627 A1 | 5/2016 |
| WO | 2016082699 A1 | 6/2016 |
| WO | 2016100424 A1 | 6/2016 |
| WO | 2016115343 A2 | 7/2016 |
| WO | 2016115728 A1 | 7/2016 |
| WO | 2016123492 A1 | 8/2016 |
| WO | 2016123513 A1 | 8/2016 |
| WO | 2016125685 A1 | 8/2016 |
| WO | 2016201032 A1 | 12/2016 |
| WO | 2017049119 A1 | 3/2017 |
| WO | 2017196957 A1 | 11/2017 |
| WO | 2018062788 A1 | 4/2018 |
| WO | 2018064956 A1 | 4/2018 |
| WO | 2018190523 A1 | 10/2018 |
| WO | 2018202558 A1 | 11/2018 |
| WO | 2017008255 1 | 1/2019 |
| WO | 2019009540 A1 | 1/2019 |
| WO | 2019069950 A1 | 4/2019 |
| WO | 2020169103 A1 | 8/2020 |
| WO | 2020169104 A1 | 8/2020 |
| WO | 2020228578 A1 | 11/2020 |
| WO | 2020249762 A1 | 12/2020 |
| WO | 2021013120 A1 | 1/2021 |

OTHER PUBLICATIONS

"Improvements of HEVC SCC Palette Mode and Intra Block Copy"—Sun et al., IEEE Journal on Emerging and Selected Topics and Systems, vol. 6, No. 4, Dec. 2016 (2016).*

"Improved Combined Inter-Intra Prediction Using Spatial-Variant Weighted Coefficient"—Run et al., 978-1-61284-350-6/11/$26.00 A©2011 IEEE (Year: 2011).*

Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.

Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.

Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019.

Bross et al. "Versatile Video Coding (Draft 6)," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O2001, 2019.

Chao et al. "CE15-2: Palette Mode of HEVC SCC," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0336, 2018.

Chao et al. "Proposed WD for CE15-2: Palette Mode of HEVC SCC," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0336-WD, 2018.

Chao et al. "CE8: Palette Mode in HEVC (CE8-2.1)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0344, 2019.

Chao et al. "CE8-2.1: Palette Mode in HEVC," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0119, 2019.

Chen et al. "Description of Screen Content Coding Technology Proposal by NCTU and ITRI International," Joint Collaborative Team on Video Coding (JCT-VC) of ITU-T SG 16 WP3 and ISO/IEC JTC 1/SC29/WG 11, 17th Meeting, Valencia, ES, Mar. 27-Apr. 4, 2014, document JCTVC-Q0032, 2014.

Fang et al. "CE3-Related: MPM List Modification for Zero Reference Line," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0317, 2019.

Galpin et al. "Non-CE4: Affine and Sub-Block Modes Coding Clean-Up," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0500, 2019.

"High Efficiency Video Coding" Series H: Audiovisual and Multimedia Systems: Infrastructure of Audiovisual Services—Coding of Moving Video, ITU-T, H.265, Nov. 2019.

Ikeda et al. "CE11.1.6, CE11.1.7 and CE11.1.8: Joint Proposals for Long Deblocking from Sony, Qualcomm, Sharp, Ericsson," Joint Video Experts Team (JVET) of ITU-T SG 16 WP 3 and ISO/IEC JTC 1/SC 29/WG 11, 13th Meeting, Marrakesh, MA, Jan. 9-18, 2019, document JVET-M0471, 2019.

"Information Technology—High Efficiency Coding and Media Delivery in Heterogeneous Environments—Part 2: High Efficiency Video Coding" Apr. 20, 2018, ISO/DIS 23008, 4th Edition.

Joshi et al. "High Efficiency Video Coding (HEVC) Screen Content Coding: Draft 1," Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2014, document JCTVC-R1005, 2014.

Ma et al. "Restriction of CU Sizes for Intra Block Copy," Joint Collaborative Team on Video Coding (JCT-VC) of ITU-T SG 16 WP 3 and ISO/IEC JTC 1/SC 29/WG 11, 18th Meeting, Sapporo, JP, Jun. 30-Jul. 9, 2014, document JCTVC-R0056, 2014.

Rath et al. "CE3-Related: Further Simplifications of the Unified MPM List for Intra Mode Coding," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O0224, 2019.

Said et al. "CE5: Per-Context CABAC Initialization with Single Window (Test 5.1.4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0413, 2019.

Wang et al. "CE3- Related: A Unified MPM List for Intra Mode Coding," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0185, 2019.

Zhu et al. "CE8-Related: Compound Palette Mode," Joint Video Experts Team (JVET) of ITU-T SG 16 WP3 and ISO/IEC JTC 1/SC 29/WG 11, 14th Meeting, Geneva, CH, Mar. 19-27, 2019, document JVET-N0259, 2019.

Zhu et al. "CE8-Related: Palette Mode with 8 Bits Entries," Joint Video Experts Team (JVET) of ITU-T SG 16 WP3 and ISO/IEC JTC 1/SC 29/WG 11, 15th Meeting, Gothenburg, SE, Jul. 3-12, 2019, document JVET-O0259, 2019.

http://phenix.it-sudparis.eu/jvet/doc_end_user/current_document.php?id=5755.

https://vcgit.hhi.fraunhofer.de/jvet/VVCSoftware_VTM/tags/VTM-4.0.

International Search Report and Written Opinion from International Patent Application No. PCT/CN2020/076367 dated May 28, 2020 (10 pages).

International Search Report and Written Opinion from International Patent Application No. PCT/CN2020/076368 dated Apr. 29, 2020 (10 pages).

International Search Report and Written Opinion from International Patent Application No. PCT/CN2020/076369 dated May 14, 2020 (10 pages).

International Search Report and Written Opinion from International Patent Application No. PCT/CN2020/076370 dated May 14, 2020 (10 pages).

International Search Report and Written Opinion from International Patent Application No. PCT/CN2020/083887 dated Jun. 29, 2020 (9 pages).

International Search Report and Written Opinion from International Patent Application No. PCT/CN2020/102968 dated Oct. 21, 2020 (12 pages).

(56) References Cited

OTHER PUBLICATIONS

International Search Report and Written Opinion from International Patent Application No. PCT/CN2020/102970 dated Aug. 27, 2020 (9 pages).
International Search Report and Written Opinion from International Patent Application No. PCT/CN2020/103694 dated Oct. 28, 2020 (12 pages).
International Search Report and Written Opinion from International Patent Application No. PCT/CN2020/105403 dated Oct. 29, 2020 (10 pages).
International Search Report and Written Opinion from International Patent Application No. PCT/CN2020/105405 dated Sep. 9, 2020 (10 pages).
Non Final Office Action from U.S. Appl. No. 17/330,792 dated Aug. 5, 2021.
Final Office Action from U.S. Appl. No. 17/330,792 dated Nov. 17, 2021.
Non Final Office Action from U.S. Appl. No. 17/384,137 dated Nov. 19, 2021.
Final Office Action from U.S. Appl. No. 17/384,137 dated Mar. 7, 2022.
Non Final Office Action from U.S. Appl. No. 17/572,810 dated Apr. 1, 2022.
Non Final Office Action from U.S. Appl. No. 17/580,314 dated Apr. 11, 2022.
Joshi et al. "High Efficiency Video Coding (HEVC) Screen Content Coding: Draft 6," Joint Collaborative Team on Video Coding (JCT-VC) of ITU-T SG 16 WP 3 and ISO/IEC JTC 1/SC San Diego, USA, Feb. 19-26, 2016, document JCTVC-W1005, 2016.
Sun et al. "CE8 Proposed WD for Palette Mode and Intra Mode Combination (Test 8.2.2)," Joint Video Experts Team (JVET) of ITU-T SG 16 WP 3 and ISO/IEC JTC 1/SC 29/WG 11, 13th Meeting, Marrakech, Jan. 9-18, 2019, document JVET-M0051, 2019.
Zhu et al. "CE8-Related: Palette Mode Coding," Joint Video Experts Team (JVET) of ITU-T SG 16 WP3 and ISO/IEC JTC 1/SC 29/WG 11, 14th Meeting, Geneva, CH, Mar. 19-27, 2019, document JVET-N0258, 2019.
Extended European Search Report from European Patent Application No. 20758451.7 dated Jun. 3, 2022 (11 pages).
Extended European Search Report from European Patent Application No. 20758940.9 dated May 23, 2022 (10 pages).
Non Final Office Action from U.S. Appl. No. 17/578,703 dated May 11, 2022.
Non Final Office Action from U.S. Appl. No. 17/580,446 dated May 11, 2022.
Bross et al. "Versatile Video Coding (Draft 6)," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O2001, 2019. (cited in JP2021-551973 OA mailed Sep. 6, 2022).
Chen et al. "CE8: Separate Palette Coding for Luma and Chroma (Test 8.2.5)." Joint Video Experts Team (JVET) of ITU-T SG 16 WP 3 and ISO/IEC JTC 1/SC 29/WG 11 13th Meeting, Marrakech, MA Jan. 9-18, 2019, document JVET-M0052,2019. (cited in JP2021-548182 PA1 mailed Jul. 26, 2022).
Chen et al. " Algorithm Description for Versatile Video Coding and Test Model 6 (VTM 6)," Joint Video Experts Team (JVET) of ITU-T SG 16 WP 3 and ISO/IEC JTC 1/SC 29/WG 11 15th Meeting, Gothenburg, SE, Jul. 3-12, 2019, document JVET-O2002, 2019. (cited in EP20846718.3 EESR mailed Jul. 21, 2022).
Chernyak et al. "CE15-Related: Separate Palette Coding for Luma and Chroma Components," Joint Video Experts Team (JVET) of ITU-T SG 16 WP 3 and ISO/IEC JTC 1/SC 29/WG 11 12th Meeting, Macao, CN, Oct. 3-12, 2018, document JVET-L0427, 2018. (cited in JP2021-548182 OA mailed Jul. 26, 2022).
Jhu et al. "CE8-Related: Palette Mode Excluding Small Blocks," Joint Video Experts Team (JVET) of ITU-T SG 16 WP 3 and ISO/IEC JTC 1/SC 29/WG 11 15th Meeting, Gothenburg, SE, Jul. 3-12, 2019, document JVET-O0600, 2019. (cited in EP20760048.7 EESR mailed Aug. 3, 2022).
Karczewicz et al. "Non-CE8: Minimum QP for Transform Skip Mode," Joint Video Experts Team (JVET) of ITU-T SG 16 WP 3 and ISO/IEC JTC 1/SC 29/WG 11 15th Meeting, Gothenburg, SE, Jul. 3-12, 2019, documents JVET-30919, 2019. (cited in EP20844841.5 EESR mailed Jul. 25, 2022).
Extended European Search Report from European Patent Application No. 20846718.3 dated Jul. 21, 2022 (12 pages).
Extended European Search Report from European Patent Application No. 20760048.7 dated Aug. 3, 2022 (12 pages).
Extended European Search Report from European Patent Application No. 20844841.5 dated Jul. 25, 2022 (8 pages).
Jhu et al. "Non-CE8: Quantization Unification for Palette Escape and Transform Skip," Joint Video Experts Team (JVET) of ITU-T SG 16 WP 3 and ISO/IEC JTC 1/SC 29/WG 11 16th Meeting, Geneva, CH Oct. 1-11, 2019, document JVET-P515, 2019.
Jhu et al. "Non-CE8: QP Dependent Binarization for Palette Escape," Joint Video Experts Team (JVET) of ITU-T SG 16 WP 3 and ISO/IEC JTC 1/SC 29/WG 11 16th Meeting, Geneva, CH Oct. 1-11, 2019, document JVET-P0529, 2019.
Duanmu et al. "Fast Screen Content Coding and Two Tier 360 Degree Video Streaming," Dissertation for Doctor of Philosophy (Electrical Engineering) at the New York University Tandon School of Engineering, [online], May 2018, pp.22-24, [retrieved on Feb. 8, 2023], Retrieved from the Internet: <URL: https://duanmufanyi.github.io/papers/[Dissertation]%20Fast%20Screen%20Content%20Coding%20and%20Two%20Tier%20360%20Degree%20Video%20Streaming.pdf> (cited in JP2022-506299 OA1 mailed Feb. 21, 2023).
Jin et al. "Combined Inter-lntra Prediction for High Definition Video Coding," Procedures Picture Coding Symposium 2007 Feb. 2007, pp. 1-4, [retrieved on Feb. 8, 2023], Retrieved from the Internet: <URL: https://citeseerx.ist.psu.edu/pdf/d174616e4a71f6487b2659fb2a1819c42b48dab7> (cited in JP2022-506299 OA1 mailed Feb. 21, 2023).
Pu et al. "Palette Mode Coding in HEVC Screen Content Coding Extension," IEEE Journal of Emerging and Selected Topics in Circuits and Systems, Nov. 18, 2016, 6(4):420-432. [retrieved on Feb. 8, 2023], Retrieved from the Internet: <URL: https://ieeexplore.ieee.org/document/7748474> (cited in JP2022-506299 OA1 mailed Feb. 21, 2023).
First Office Action from Chinese Patent Application No. 20208055162.9 dated Apr. 1, 2023.
First Office Action from Canadian Patent Application No. 3,147,923 dated Jun. 19, 2023 (4 pages).
Non Final Office Action from U.S. Appl. No. 17/384,137 dated Jul. 6, 2023.
Ikonin et al. "AHG15: Signalling of Chroma QP Mapping Table," Joint Video Experts Team (JVET) of ITU-T SG 16 WP 3 and ISO/IEC JTC 1/SC 29/WG 1115th Meeting: Gothenberg, SE, Jul. 3-12, 2019, document JVET-O0186, 2019 (cited in CN202080052734.8 NOA1 mailed Aug. 3, 2023).
Lin et al. "CE4-related: On Merging Candidate List Construction," Joint Video Experts Team (JVET) of ITU-T SG 16 WP 3 and ISO/IEC JTC 1/SC 29/WG 11 15th Meeting: Gothenberg, SE, Jul. 3-12, 2019, document JVET-O0285, 2019 (cited in CN202080053551.8 OA1 mailed Aug. 3, 2023).
"Advanced Video Coding for Generic Audiovisual Services," ITU-T Telecommunication Standardization Sector of ITU, Series H: Audiovisual and Multimedia Systems, Infrastructure of Audiovisual Services—Coding of Moving Video, Apr. 2017.
Zhu et al. "Compound Palette Mode for Screen Content Coding," 2019.
Communication Pursuant to Article 94(3) from European Patent Application No. 20760048.7 dated Mar. 14, 2023 (11 pages).
Notice of Allowance from U.S. Appl. No. 17/994,095 dated Jan. 29, 2024.
Notice of Allowance from U.S. Appl. No. 17/994,094 dated Apr. 11, 2024.

\* cited by examiner

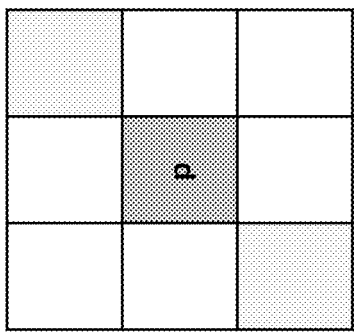
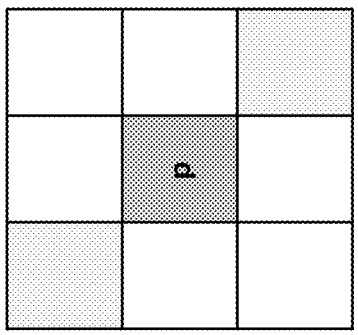
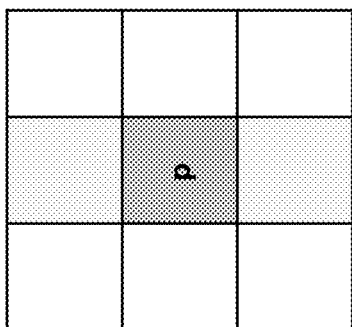
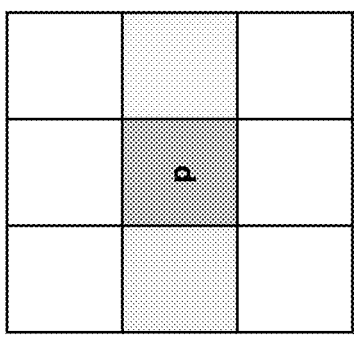
FIG. 18

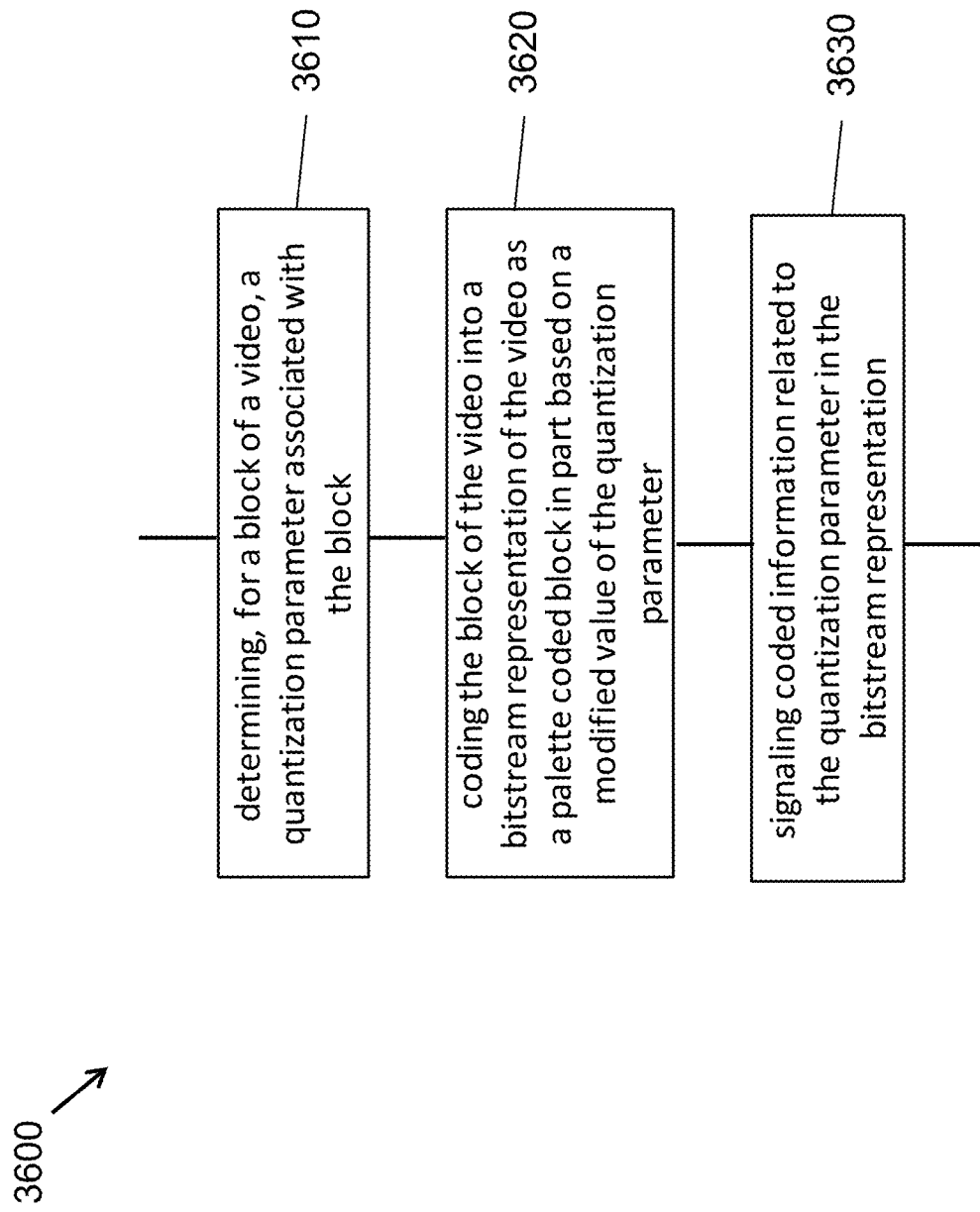

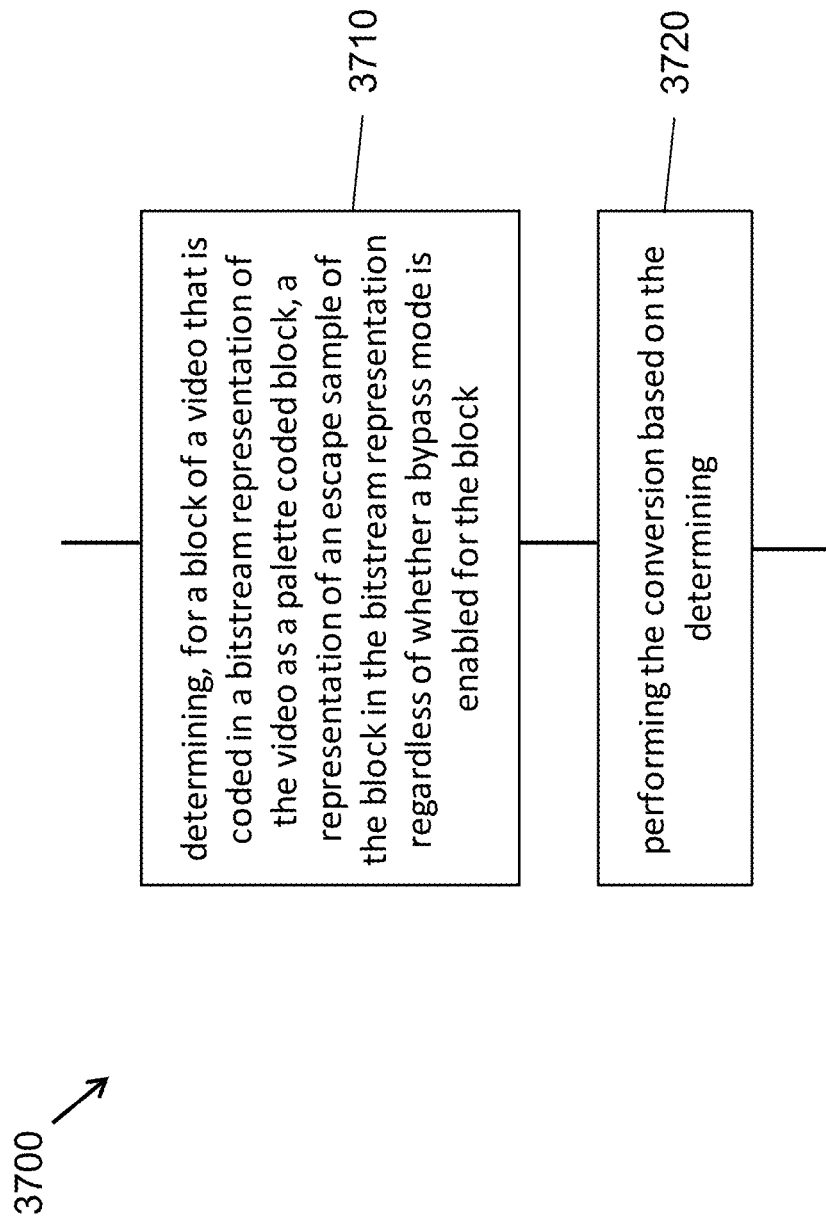

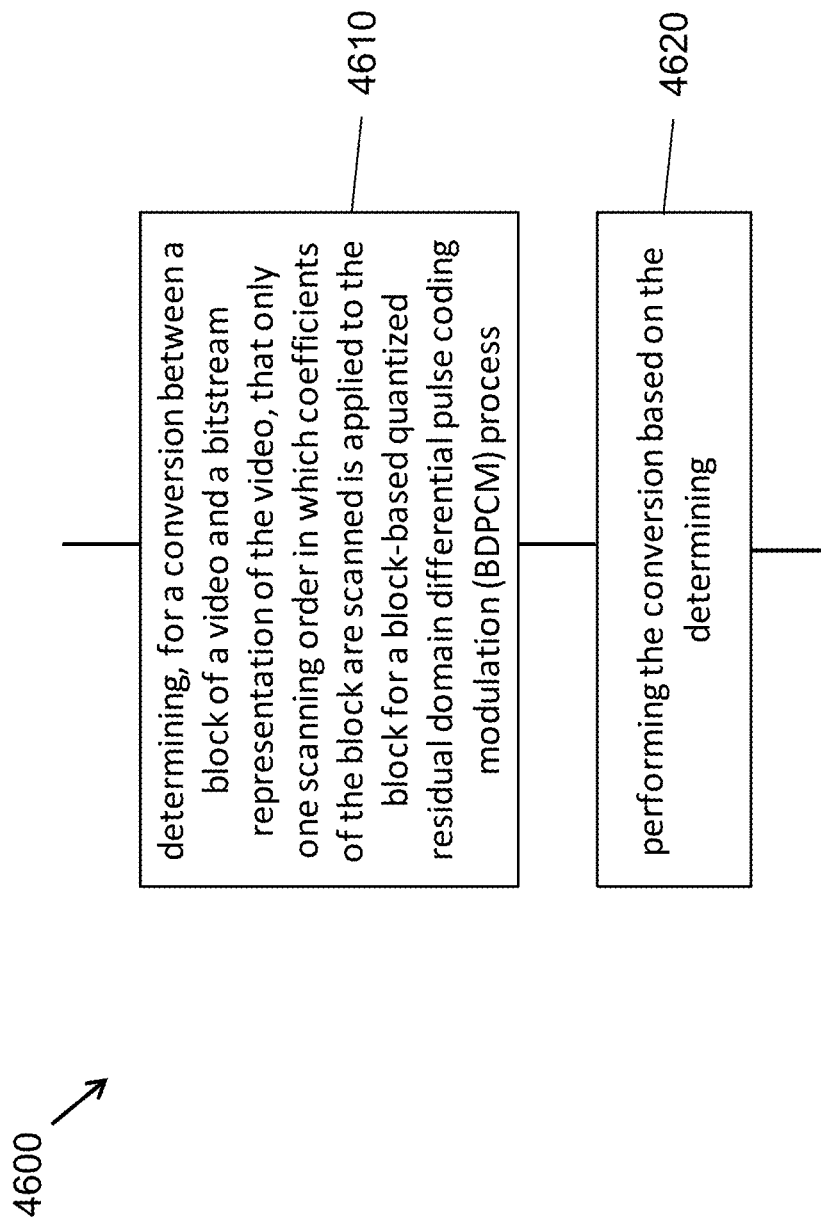

PALETTE MODE CODING IN PREDICTION PROCESS

CROSS REFERENCE TO RELATED APPLICATIONS

This application is a continuation of International Patent Application No. PCT/CN2020/105405, filed on Jul. 29, 2020, which claims the priority to and benefits of International Patent Application No. PCT/CN2019/098204, filed on Jul. 29, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for in which palette mode coding is used.

In one example aspect, a method of video processing is disclosed. The method includes performing a conversion between a block of a video region of a video and a bitstream representation of the video. The bitstream representation is processed according to a first format rule that specifies whether a first indication of usage of a palette mode is signaled for the block and a second format rule that specifies a position of the first indication relative to a second indication of usage of a prediction mode for the block.

In another example aspect, a method of video processing is disclosed. The method includes determining, for a conversion between a block of a video region in a video and a bitstream representation of the video, a prediction mode based on one or more allowed prediction modes that include at least a palette mode of the block. An indication of usage of the palette mode is determined according to the prediction mode. The method also includes performing the conversion based on the one or more allowed prediction modes.

In another example aspect, a method of video processing is disclosed. The method includes performing a conversion between a block of a video and a bitstream representation of the video. The bitstream representation is processed according to a format rule that specifies a first indication of usage of a palette mode and a second indication of usage of an intra block copy (IBC) mode are signaled dependent of each other.

In another example aspect, a method of video processing is disclosed. The method includes determining, for a conversion between a block of a video and a bitstream representation of the video, a presence of an indication of usage of a palette mode in the bitstream representation based on a dimension of the block; and performing the conversion based on the determining.

In another example aspect, a method of video processing is disclosed. The method includes determining, for a conversion between a block of a video and a bitstream representation of the video, a presence of an indication of usage of an intra block copy (IBC) mode in the bitstream representation based on a dimension of the block; and performing the conversion based on the determining.

In another example aspect, a method of video processing is disclosed. The method includes determining, for a conversion between a block of a video and a bitstream representation of the video, whether a palette mode is allowed for the block based on a second indication of a video region containing the block; and performing the conversion based on the determining.

In another example aspect, a method of video processing is disclosed. The method includes determining, for a conversion between a block of a video and a bitstream representation of the video, whether an intra block copy (IBC) mode is allowed for the block based on a second indication of a video region containing the block; and performing the conversion based on the determining.

In another example aspect, a method of video processing is disclosed. The method includes determining, for a conversion between a block of a video and a bitstream representation of the video, a first bit depth of a first sample associated with a palette entry in a palette mode. The first bit depth is different from a second bit depth associated with the block. The method also includes performing the conversion based on the determining.

In another example aspect, a method of video processing is disclosed. The method includes determining, for a conversion between a current block of a video and a bitstream representation of the video, that a neighboring block of the current block that is coded in a palette mode is processed as an intra-coded block having a default mode during a construction of a list of most probable modes (MPM) candidates of the current block in case the neighboring block is located above or left of the current block. The method also includes performing the conversion based on the determining.

In another example aspect, a method of video processing is disclosed. The method includes determining, for a block of a video that is coded in a bitstream representation of the video as a palette mode coded block, a parameter for deblocking filtering according to a rule. The method also includes performing a conversion between the block and the bitstream representation of the video using the parameter for deblocking filtering.

In another example aspect, a method of video processing is disclosed. The method includes determining, for a conversion between a current block of a video and a bitstream representation of the video, that a neighboring block of the current block that is coded in a palette mode is processed as a non-intra coded block during a construction of a list of most probable modes (MPM) candidates of the current block. The method also includes performing the conversion based on the determining.

In another example aspect, a method of video processing is disclosed. The method includes determining, for a block of a video, a quantization parameter associated with the block, coding the block of the video into a bitstream representation of the video as a palette coded block in part based on a modified value of the quantization parameter, and signaling coded information related to the quantization parameter in the bitstream representation.

In another example aspect, a method of video processing is disclosed. The method includes deriving a quantization parameter based on a bitstream representation of a video and decoding a palette coded block in part based on a modified quantization parameter determined by modifying the quantization parameter.

In another example aspect, a method of video processing is disclosed. The method includes determining, for a block of a video that is coded in a bitstream representation of the video as a palette coded block, a representation of an escape sample of the block in the bitstream representation regardless of whether a bypass mode is enabled for the block. The method also includes performing a conversion between the block and the bitstream representation based on the determining.

In another example aspect, a method of video processing is disclosed. The method includes determining, for a block of a video that is coded in a bitstream representation of the video as a palette coded block, a first quantization process. The first quantization process is different from a second quantization process applicable to a non-palette mode coded block. The method also includes performing a conversion between the block and the bitstream representation based on the determining.

In another example aspect, a method of video processing is disclosed. The method includes performing a conversion between a video comprising luma blocks and corresponding chroma blocks and a bitstream representation of the video according to a rule. The rule specifies that, for a case that a current luma block is coded using a palette coding mode and a corresponding current chroma block coded with a derived mode, the current luma block is treated as having a default intra prediction mode and the current chroma block is coded with the default intra prediction mode. The palette coding mode comprises coding the current luma block using a palette of representative sample values.

In another example aspect, a method of video processing is disclosed. The method includes performing a conversion between a video comprising one or more blocks and a bitstream representation of the video. For the conversion, a list of motion candidates is constructed for each block according to a rule. The rule specifies that the motion information of a block coded using a palette coding mode is treated as unavailable or invalid for coding successive blocks.

In another example aspect, a method of video processing is disclosed. The method includes determining, for a block of video that is coded in a bitstream representation of the video as a palette mode coded block, a number of context coded bins of the block based on a rule. The method also includes performing a conversion between the block of the video and the bitstream representation of the video based on the determining.

In another example aspect, a method of video processing is disclosed. The method includes performing a conversion between a video comprising luma blocks and corresponding chroma blocks and a bitstream representation of the video according to a rule that specifies that, for a case that a current luma block is coded using a palette coding mode and a corresponding current chroma block coded with a derived mode, the current luma block is treated as having a default intra prediction mode and the current chroma block is coded with the default intra prediction mode. The palette coding mode comprises coding the current luma block using a palette of representative sample values.

In another example aspect, a method of video processing is disclosed. The method includes performing a conversion between a video comprising one or more blocks and a bitstream representation of the video, where for the conversion, a list of motion candidates is constructed for each block according to a rule that specifies that the motion information of a block coded using a palette coding mode is treated as unavailable or invalid for coding successive blocks.

In another example aspect, a method of video processing is disclosed. The method includes determining, for a block of video that is coded in a bitstream representation of the video as a palette mode coded block, a number of context coded bins of the block based on a rule. The method also includes performing a conversion between the block of the video and the bitstream representation of the video based on the determining.

In another example aspect, a method of video processing is disclosed. The method includes determining, for a conversion between a current block of a video and a bitstream representation of the video, a number of intra-coded neighboring blocks of the current block for a combined inter and intra prediction mode according to a rule. The rule specifies a manner of treating a block coded using a palette coding mode in counting the number of intra-coded neighboring blocks for the combined inter and intra prediction mode, where using the palette coding mode comprises coding a block using a palette of representative sample values. The method also includes performing the conversion based on the determining.

In another example aspect, a method of video processing is disclosed. The method includes determining, for a conversion between a current block of a video and a bitstream representation of the video, that an operation is skipped for a sample of the current block in a filtering process. The sample is coded using a palette coding mode, where using the palette coding mode comprises coding a block using a palette of representative sample values. The method also includes performing the conversion based on the determining.

In another example aspect, a method of video processing is disclosed. The method includes determining, for a conversion between a block of a video and a bitstream representation of the video, a scanning order selected from three or more scanning orders. The block is coded in a palette mode using a palette of representative sample values. The method also includes performing the conversion based on the determining.

In another example aspect, a method of video processing is disclosed. The method includes determining, for a conversion between a block of a video and a bitstream representation of the video, one or more scanning orders in which coefficients of the block are scanned based on a shape of the block. The method also includes performing the conversion based on the determining.

In another example aspect, a method of video processing is disclosed. The method includes determining, for a conversion between a block of a video and a bitstream representation of the video, that only one scanning order in which coefficients of the block are scanned is applied to the block for a block-based quantized residual domain differential pulse coding modulation (BDPCM) process in which a difference between a quantized residual of an intra prediction of the block and a prediction of the quantized residual is represented in the bitstream representation of the block using a differential pulse coding modulation (DPCM). The method also includes performing the conversion based on the determining.

In another example aspect, a method of video processing is disclosed. The method includes determining that palette mode is to be used for processing a transform unit, a coding block, or a region, usage of palette mode being coded separately from a prediction mode, and performing further processing of the transform unit, the coding block, or the region using the palette mode.

In another example aspect, a method of video processing is disclosed. The method includes determining, for a current video block, that a sample associated with one palette entry of a palette mode has a first bit depth that is different from a second bit depth associated with the current video block, and performing, based on at least the one palette entry, further processing of the current video block.

In another example aspect, another method of video processing is disclosed. The method includes performing a conversion between a current video block of a picture of a video and a bitstream representation of the video in which information about whether or not an intra block copy mode is used in the conversion is signaled in the bitstream representation or derived based on a coding condition of the current video block; wherein the intra block copy mode comprises coding the current video block from another video block in the picture.

In yet another example aspect, another method of video processing is disclosed. The method includes determining whether or not a deblocking filter is to be applied during a conversion of a current video block of a picture of video, wherein the current video block is coded using a palette mode coding in which the current video block is represented using representative sample values that are fewer than total pixels of the current video block and performing the conversion such that the deblocking filter is applied in case the determining is that the deblocking filter is to be applied.

In yet another example aspect, another method of video processing is disclosed. The method includes determining a quantization or an inverse quantization process for use during a conversion between a current video block of a picture of a video and a bitstream representation of the video, wherein the current video block is coded using a palette mode coding in which the current video block is represented using representative sample values that are fewer than total pixels of the current video block and performing the conversion based on the determining the quantization or the inverse quantization process.

In yet another example aspect, another method of video processing is disclosed. The method includes determining, for a conversion between a current video block of a video comprising multiple video blocks and a bitstream representation of the video, that the current video block is a palette-coded block; based on the determining, performing a list construction process of most probable mode by considering the current video block to be an intra coded block, and performing the conversion based on a result of the list construction process; wherein the palette-coded block is coded or decoded using a palette or representation sample values.

In yet another example aspect, another method of video processing is disclosed. The method includes determining, for a conversion between a current video block of a video comprising multiple video blocks and a bitstream representation of the video, that the current video block is a palette-coded block; based on the determining, performing a list construction process of most probable mode by considering the current video block to be a non-intra coded block, and performing the conversion based on a result of the list construction process; wherein the palette-coded block is coded or decoded using a palette or representation sample values.

In yet another example aspect, another method of video processing is disclosed. The method includes determining, for a conversion between a current video block of a video comprising multiple video blocks and a bitstream representation of the video, that the current video block is a palette-coded block; based on the determining, performing a list construction process by considering the current video block to be an unavailable block, and performing the conversion based on a result of the list construction process; wherein the palette-coded block is coded or decoded using a palette or representation sample values.

In yet another example aspect, another method of video processing is disclosed. The method includes determining, during a conversion between a current video block and a bitstream representation of the current video block, that the current video block is a palette coded block, determining, based on the current video block being the palette coded block, a range of context coded bins used for the conversion; and performing the conversion based on the range of context coded bins.

In yet another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 4 shows an example of horizontal and vertical traverse scans.

FIG. 9 shows an example of pixels involved in filter on/off decision and strong/weak filter selection.

FIG. 18 shows an example of four 1-D 3-pixel patterns for the pixel classification in EO.

FIG. 36A is another flowchart representation of another method for video processing in accordance with the present technology.

FIG. 37 is another flowchart representation of another method for video processing in accordance with the present technology.

FIG. 46 is yet another flowchart representation of another method for video processing in accordance with the present technology.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This document is related to video coding technologies. Specifically, it is related to palette coding with employing base colors based representation in video coding. It may be applied to the existing video coding standard like HEVC, or the standard (Versatile Video Coding) to be finalized. It may be also applicable to future video coding standards or video codec.

2. Initial Discussion

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

Figure 7:
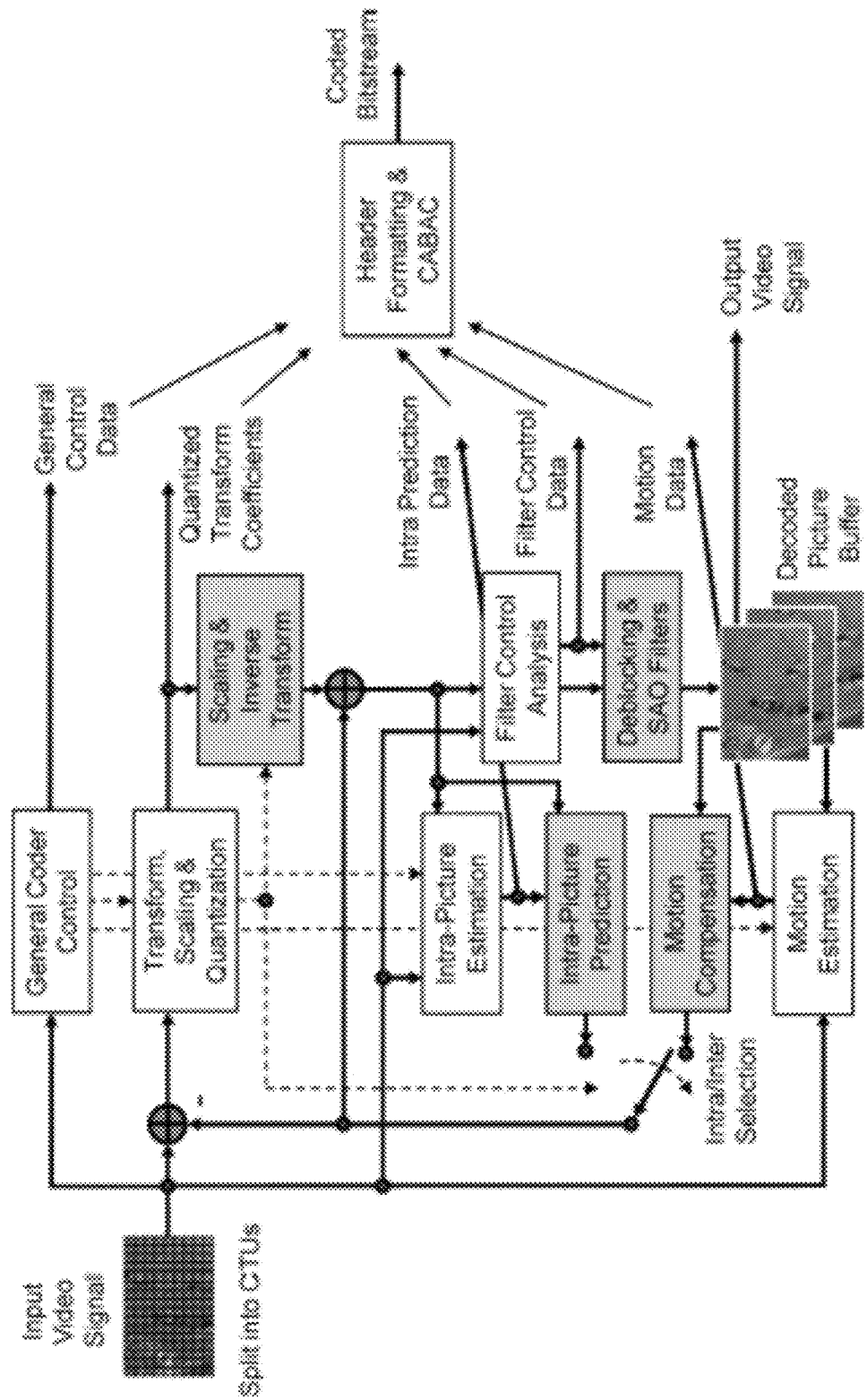
FIG. 7 shows a block diagram of an example implementation of a video encoder.

FIG. 7 is a block diagram of an example implementation of a video encoder. FIG. 7 shows that the encoder implementation has a feedback path built in in which the video encoder also performs video decoding functionality (reconstructing compressed representation of video data for use in encoding of next video data).

2.1 Intra Block Copy

Figure 1:
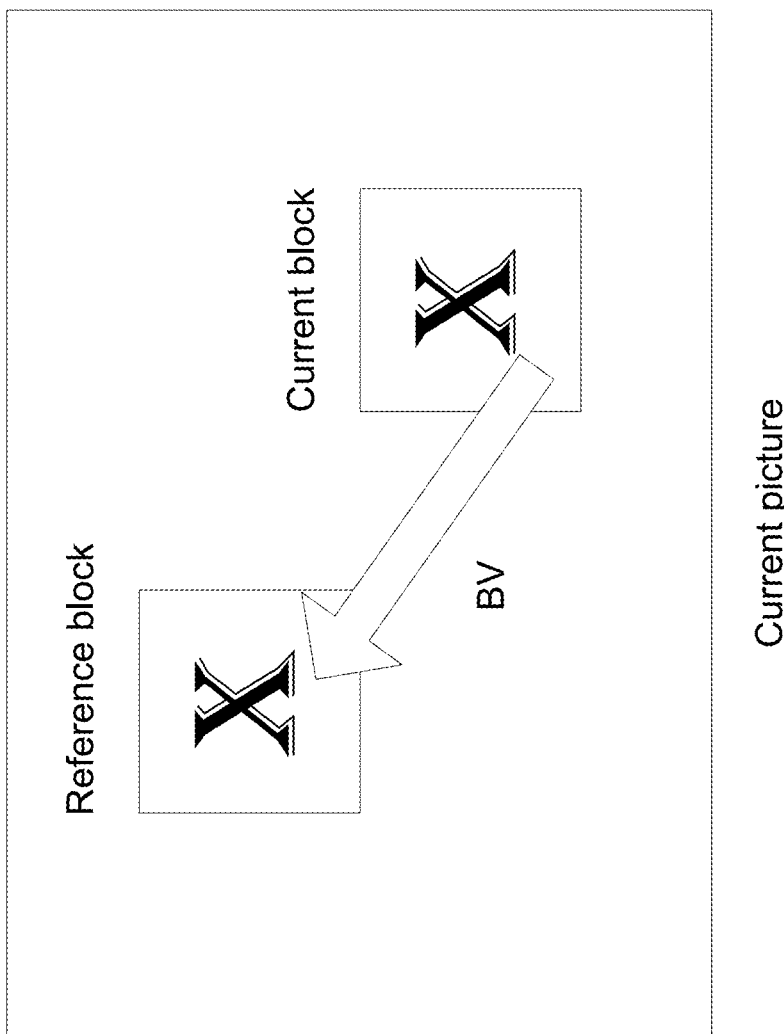
FIG. 1 shows an example of intra block copy.

Intra block copy (IBC), a.k.a. current picture referencing, has been adopted in HEVC Screen Content Coding extensions (HEVC-SCC) and the current VVC test model (VTM-4.0). IBC extends the concept of motion compensation from inter-frame coding to intra-frame coding. As demonstrated in FIG. 1, the current block is predicted by a reference block in the same picture when IBC is applied. The samples in the reference block must have been already reconstructed before the current block is coded or decoded. Although IBC is not so efficient for most camera-captured sequences, it shows significant coding gains for screen content. The reason is that there are lots of repeating patterns, such as icons and text characters in a screen content picture. IBC can remove the redundancy between these repeating patterns effectively. In HEVC-SCC, an inter-coded coding unit (CU) can apply IBC if it chooses the current picture as its reference picture. The MV is renamed as block vector (BV) in this case, and a BV always has an integer-pixel precision. To be compatible with main profile HEVC, the current picture is marked as a "long-term" reference picture in the Decoded Picture Buffer (DPB). It should be noted that similarly, in multiple view/3D video coding standards, the inter-view reference picture is also marked as a "long-term" reference picture.

Following a BV to find its reference block, the prediction can be generated by copying the reference block. The residual can be got by subtracting the reference pixels from the original signals. Then transform and quantization can be applied as in other coding modes.

However, when a reference block is outside of the picture, or overlaps with the current block, or outside of the reconstructed area, or outside of the valid area restricted by some constrains, part or all pixel values are not defined. Basically, there are two solutions to handle such a problem. One is to disallow such a situation, e.g. in bitstream conformance. The other is to apply padding for those undefined pixel values. The following sub-sessions describe the solutions in detail.

2.2 IBC in HEVC Screen Content Coding Extensions

In the screen content coding extensions of HEVC, when a block uses current picture as reference, it should guarantee that the whole reference block is within the available reconstructed area, as indicated in the following spec text:

The variables offsetX and offsetY are derived as follows:

$$\text{offsetX} = (\text{ChromaArrayType}==0)?0:(mvCLX[0]\ \&0x7?2:0) \quad (8\text{-}106)$$

$$\text{offsetY} = (\text{ChromaArrayType}==0)?0:(mvCLX[1]\ \&0x7?2:0) \quad (8\text{-}107)$$

It is a requirement of bitstream conformance that when the reference picture is the current picture, the luma motion vector mvLX shall obey the following constraints:

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)−offsetX, yPb+(mvLX[1]>>2)−offsetY) as inputs, the output shall be equal to TRUE.

When the derivation process for z-scan order block availability as specified in clause 6.4.1 is invoked with (xCurr, yCurr) set equal to (xCb, yCb) and the neighbouring luma location (xNbY, yNbY) set equal to (xPb+(mvLX[0]>>2)+nPbW−1+offsetX, yPb+(mvLX[1]>>2)+nPbH−1+offsetY) as inputs, the output shall be equal to TRUE.

One or both the following conditions shall be true:
The value of (mvLX[0]>>2)+nPbW+xB1+offsetX is less than or equal to 0.
The value of (mvLX[1]>>2)+nPbH+yB1+offsetY is less than or equal to 0.

The following condition shall be true:

$$(xPb+(mvLX[0]>>2)+nPbSw-1+\text{offst}X)/CtbSizeY- \\ xCurr/CtbSizeY <= yCurr/CtbSizeY-(yPb+(mvLX \\ [1]>>2)+nPbSh-1+\text{offset}Y)/CtbSize_Y \quad (8\text{-}108)$$

Thus, the case that the reference block overlaps with the current block or the reference block is outside of the picture will not happen. There is no need to pad the reference or prediction block.

2.3 IBC in VVC Test Model

In the current VVC test model, e.g., VTM-4.0 design, the whole reference block should be with the current coding tree unit (CTU) and does not overlap with the current block. Thus, there is no need to pad the reference or prediction block. The IBC flag is coded as a prediction mode of the current CU. Thus, there are totally three prediction modes, MODE_INTRA, MODE_INTER and MODE_IBC for each CU.

2.3.1 IBC Merge Mode

In IBC merge mode, an index pointing to an entry in the IBC merge candidates list is parsed from the bitstream. The construction of the IBC merge list can be summarized according to the following sequence of steps:

Step 1: Derivation of spatial candidates
Step 2: Insertion of HMVP candidates
Step 3: Insertion of pairwise average candidates In the derivation of spatial merge candidates, a maximum of four merge candidates are selected among candidates located in the positions depicted in the figures. The order of derivation is A1, B1, B0, A0 and B2. Position B2 is considered only when any Prediction Unit (PU) of position A1, B1, B0, A0 is not available (e.g. because it belongs to another slice or tile) or is not coded with IBC mode. After candidate at position A1 is added, the insertion of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in depicted in the figures are considered and a candidate is only added to the list if the corresponding candidate used for redundancy check has not the same motion information.

After insertion of the spatial candidates, if the IBC merge list size is still smaller than the maximum IBC merge list size, IBC candidates from HMVP table may be inserted. Redundancy check are performed when inserting the HMVP candidates.

Finally, pairwise average candidates are inserted into the IBC merge list.

When a reference block identified by a merge candidate is outside of the picture, or overlaps with the current block, or outside of the reconstructed area, or outside of the valid area restricted by some constrains, the merge candidate is called invalid merge candidate.

It is noted that invalid merge candidates may be inserted into the IBC merge list.

2.3.2 IBC AMVP Mode

In IBC AMVP mode, an AMVP index point to an entry in the IBC AMVP list is parsed from the bitstream. The construction of the IBC AMVP list can be summarized according to the following sequence of steps:

Step 1: Derivation of spatial candidates

Check A0, A1 until an available candidate is found.

Check B0, B1, B2 until an available candidate is found.

Step 2: Insertion of HMVP candidates

Step 3: Insertion of zero candidates

After insertion of the spatial candidates, if the IBC AMVP list size is still smaller than the maximum IBC AMVP list size, IBC candidates from HMVP table may be inserted.

Finally, zero candidates are inserted into the IBC AMVP list.

2.4 Palette Mode

Figure 2:
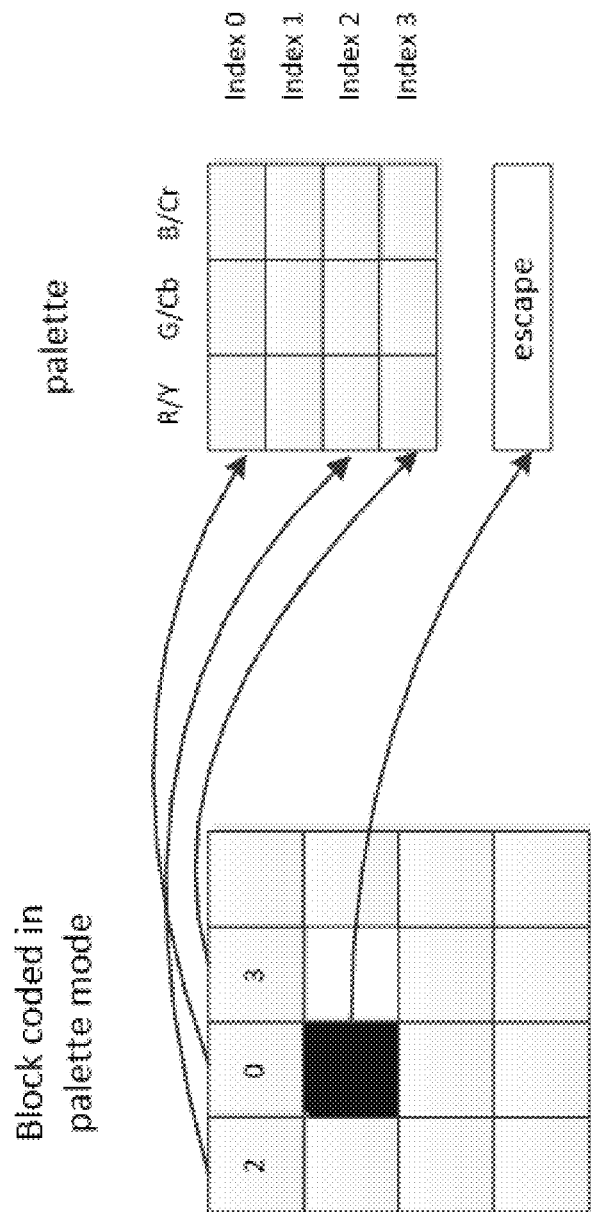
FIG. 2 shows an example of a block coded in palette mode.

The basic idea behind a palette mode is that the samples in the CU are represented by a small set of representative color values. This set is referred to as the palette. It is also possible to indicate a sample that is outside the palette by signaling an escape symbol followed by (possibly quantized) component values. This is illustrated in FIG. 2.

2.5 Palette Mode in HEVC Screen Content Coding Extensions (HEVC-SCC)

In the palette mode in HEVC-SCC, a predictive way is used to code the palette and index map.

2.5.1 Coding of the Palette Entries

For coding of the palette entries, a palette predictor is maintained. The maximum size of the palette as well as the palette predictor is signaled in the Sequence Parameter Set (SPS). In HEVC-SCC, a palette_predictor_initializer present flag is introduced in the PPS. When this flag is 1, entries for initializing the palette predictor are signaled in the bitstream. The palette predictor is initialized at the beginning of each CTU row, each slice and each tile. Depending on the value of the palette_predictor_initializer_present_flag, the palette predictor is reset to 0 or initialized using the palette predictor intializer entries signaled in the PPS. In HEVC-SCC, a palette predictor initializer of size 0 was enabled to allow explicit disabling of the palette predictor initialization at the PPS level.

Figure 3:
FIG. 3 shows an example of use of a palette predictor to signal palette entries.

For each entry in the palette predictor, a reuse flag is signaled to indicate whether it is part of the current palette. This is illustrated in FIG. 3. The reuse flags are sent using run-length coding of zeros. After this, the number of new palette entries are signaled using exponential Golomb code of order 0. Finally, the component values for the new palette entries are signaled.

2.5.2 Coding of Palette Indices

Figure 4:
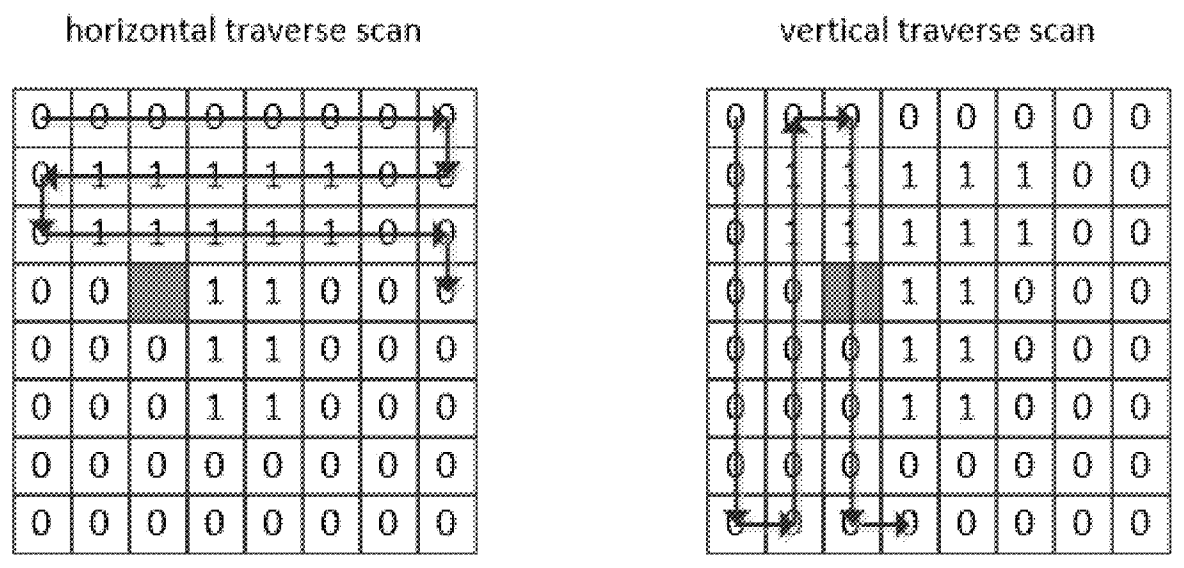

The palette indices are coded using horizontal and vertical traverse scans as shown in FIG. 4. The scan order is explicitly signaled in the bitstream using the palette_transpose_flag. For the rest of the subsection it is assumed that the scan is horizontal.

Figure 5:
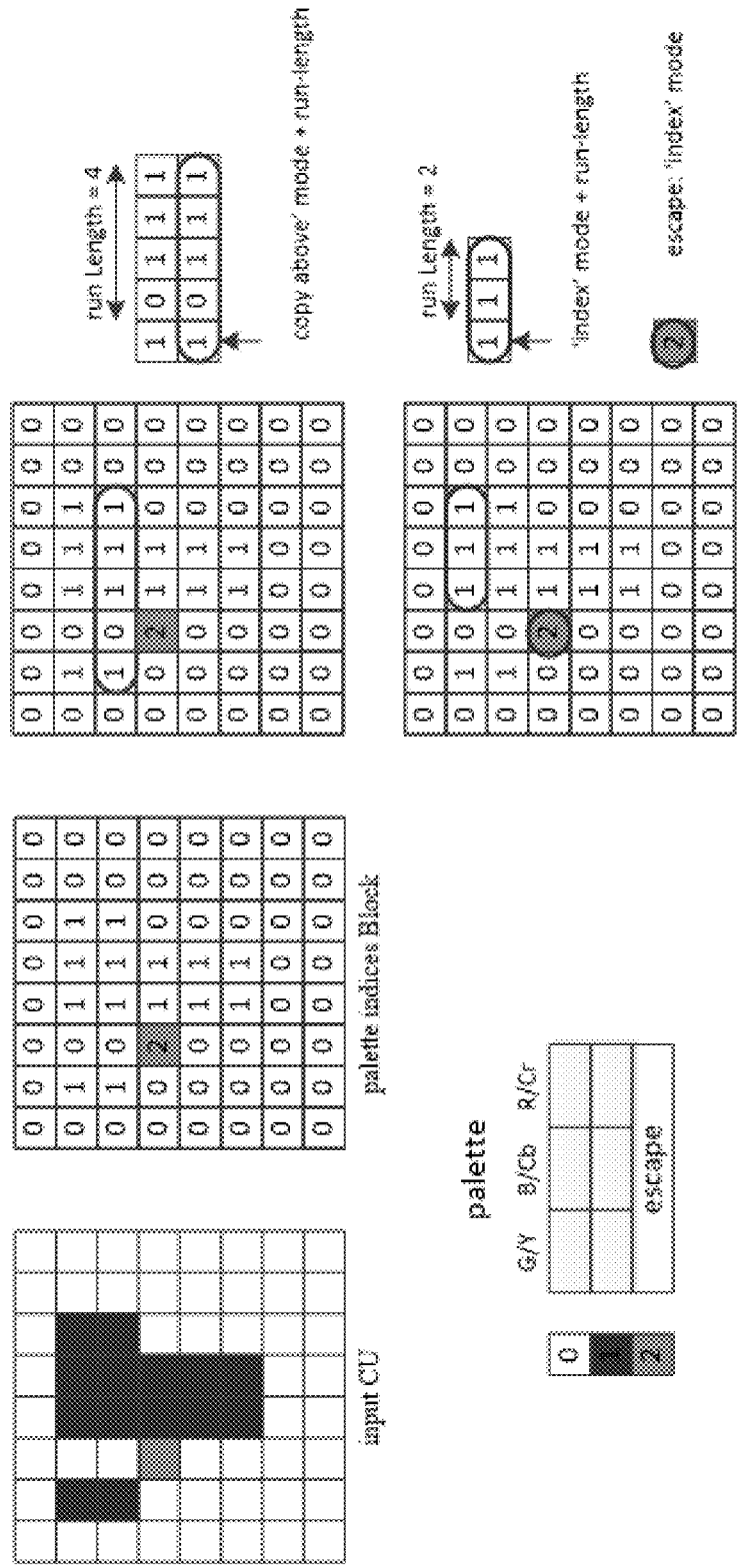
FIG. 5 shows an example of coding of palette indices.

The palette indices are coded using two main palette sample modes: 'INDEX' and 'COPY_ABOVE'. As explained previously, the escape symbol is also signaled as an 'INDEX' mode and assigned an index equal to the maximum palette size. The mode is signaled using a flag except for the top row or when the previous mode was 'COPY_ABOVE'. In the 'COPY_ABOVE' mode, the palette index of the sample in the row above is copied. In the 'INDEX' mode, the palette index is explicitly signaled. For both 'INDEX' and 'COPY_ABOVE' modes, a run value is signaled which specifies the number of subsequent samples that are also coded using the same mode. When escape symbol is part of the run in 'INDEX' or 'COPY_ABOVE' mode, the escape component values are signaled for each escape symbol. The coding of palette indices is illustrated in FIG. 5.

This syntax order is accomplished as follows. First the number of index values for the CU is signaled. This is followed by signaling of the actual index values for the entire CU using truncated binary coding. Both the number of indices as well as the the index values are coded in bypass mode. This groups the index-related bypass bins together. Then the palette sample mode (if necessary) and run are signaled in an interleaved manner. Finally, the component escape values corresponding to the escape samples for the entire CU are grouped together and coded in bypass mode.

An additional syntax element, last_run_type_flag, is signaled after signaling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape sample, the number of escape component values signaled may be different depending on the number of components associated with that sample.

In VVC, the dual tree coding structure is used on coding the intra slices, so the luma component and two chroma components may have different palette and palette indices. In addition, the two chroma component shares same palette and palette indices.

2.6 Deblocking Scheme in VVC

Figure 9:
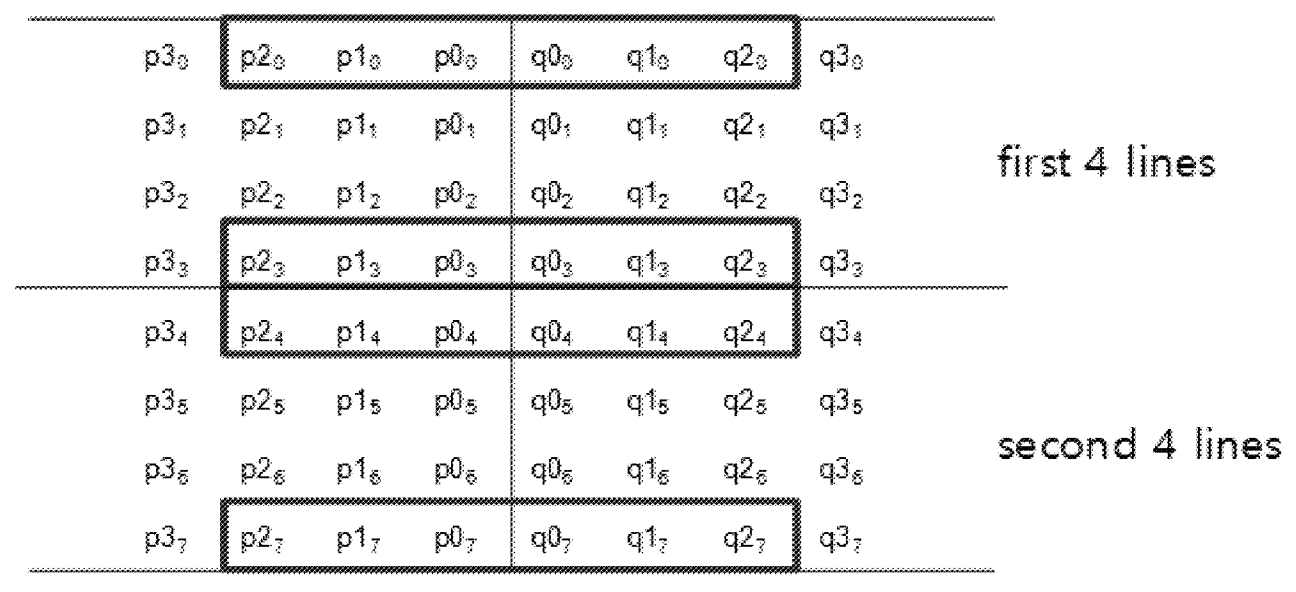

Note that, in the following descriptions, $pN_M$ denotes the left-side N-th sample in the M-th row relative to the vertical edge or the top-side N-th sample in the M-th column relative to the horizontal edge, $qN_M$ denotes the right-side N-th sample in the M-th row relative to the vertical edge or the bottom-side N-th sample in the M-th column relative to the horizontal edge. An example of $pN_M$ and $qN_M$ is depicted in FIG. 9.

Note that, in the following descriptions, $p_N$ denotes the left-side N-th sample in a row relative to the vertical edge or the top-side N-th sample in a column relative to the horizontal edge, $q_N$ denotes the right-side N-th sample in a row relative to the vertical edge or the bottom-side N-th sample in a column relative to the horizontal edge.

Filter on/off decision is done for four lines as a unit. FIG. 9 illustrates the pixels involving in filter on/off decision. The 6 pixels in the two red boxes for the first four lines are used to determine filter on/off for 4 lines. The 6 pixels in two red boxes for the second 4 lines are used to determine filter on/off for the second four lines.

In some embodiments, the vertical edges in a picture are filtered first. Then the horizontal edges in a picture are filtered with samples modified by the vertical edge filtering process as input. The vertical and horizontal edges in the CTBs of each CTU are processed separately on a coding unit basis. The vertical edges of the coding blocks in a coding unit are filtered starting with the edge on the left-hand side of the coding blocks proceeding through the edges towards the right-hand side of the coding blocks in their geometrical order. The horizontal edges of the coding blocks in a coding unit are filtered starting with the edge on the top of the coding blocks proceeding through the edges towards the bottom of the coding blocks in their geometrical order.

2.6.1 Boundary Decision

Filtering is applied to 8×8 block boundaries. In addition, it must be a transform block boundary or a coding subblock boundary (e.g., due to usage of Affine motion prediction, ATMVP). For those which are not such boundaries, filter is disabled.

2.6.2 Boundary Strength Calculation

For a transform block boundary/coding subblock boundary, if it is located in the 8×8 grid, it may be filtered and the setting of $bS[xD_i][yD_j]$ (wherein $[xD_i][yD_j]$ denotes the coordinate) for this edge is defined as follows:

If the sample $p_0$ or $q_0$ is in the coding block of a coding unit coded with intra prediction mode, $bS[xD_i][yD_j]$ is set equal to 2.

Otherwise, if the block edge is also a transform block edge and the sample $p_0$ or $q_0$ is in a transform block which contains one or more non-zero transform coefficient levels, $bS[xD_i][yD_j]$ is set equal to 1.

Otherwise, if the prediction mode of the coding subblock containing the sample $p_0$ is different from the prediction mode of the coding subblock containing the sample $q_0$, $bS[xD_i][yD_j]$ is set equal to 1.

Otherwise, if one or more of the following conditions are true, $bS[xD_i][yD_j]$ is set equal to 1:

The coding subblock containing the sample $p_0$ and the coding subblock containing the sample $q_0$ are both coded in IBC prediction mode, and the absolute difference between the horizontal or vertical component of the motion vectors used in the prediction of the two coding subblocks is greater than or equal to 4 in units of quarter luma samples.

For the prediction of the coding subblock containing the sample $p_0$ different reference pictures or a different number of motion vectors are used than for the prediction of the coding subblock containing the sample $q_0$.

NOTE 1—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.

NOTE 2—The number of motion vectors that are used for the prediction of a coding subblock with top-left sample covering (xSb, ySb), is equal to PredFlagL0[xSb][ySb]+PredFlagL1[xSb][ySb].

One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 4 in units of quarter luma samples.

Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 4 in units of quarter luma samples.

Two motion vectors for the same reference picture are used to predict the coding subblock containing the sample $p_0$, two motion vectors for the same reference picture are used to predict the coding subblock containing the sample $q_0$ and both of the following conditions are true:

The absolute difference between the horizontal or vertical component of list 0 motion vectors used in the prediction of the two coding subblocks is greater than or equal to 4 in quarter luma samples, or the absolute difference between the horizontal or vertical component of the list 1 motion vectors used in the prediction of the two coding subblocks is greater than or equal to 4 in units of quarter luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 4 in units of quarter luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 4 in units of quarter luma samples.

Otherwise, the variable $bS[xD_i][yD_j]$ is set equal to 0. Table 2-1 and 2-2 summarize the BS calculation rules.

TABLE 2-1

Boundary strength (when SPS IBC is disabled)

| Priority | Conditions | Y | U | V |
|---|---|---|---|---|
| 5 | At least one of the adjacent blocks is intra | 2 | 2 | 2 |
| 4 | Transform Unit (TU) boundary and at least one of the adjacent blocks has non-zero transform coefficients | 1 | 1 | 1 |
| 3 | Reference pictures or number of MVs (1 for uni-prediction, 2 for bi-prediction) of the adjacent blocks are different | 1 | N/A | N/A |
| 2 | Absolute difference between the motion vectors of same reference picture that belong to the adjacent blocks is greater than or equal to one integer luma sample | 1 | N/A | N/A |
| 1 | Otherwise | 0 | 0 | 0 |

TABLE 2-2

Boundary strength (when SPS IBC is enabled)

| Priority | Conditions | Y | U | V |
|---|---|---|---|---|
| 8 | At least one of the adjacent blocks is intra | 2 | 2 | 2 |
| 7 | TU boundary and at least one of the adjacent blocks has non-zero transform coefficients | 1 | 1 | 1 |
| 6 | Prediction mode of adjacent blocks is different (e.g., one is IBC, one is inter) | 1 | | |
| 5 | Both IBC and absolute difference between the motion vectors that belong to the adjacent blocks is greater than or equal to one integer luma sample | 1 | N/A | N/A |

TABLE 2-2-continued

Boundary strength (when SPS IBC is enabled)

| Priority | Conditions | Y | U | V |
|---|---|---|---|---|
| 4 | Reference pictures or number of MVs (1 for uni-prediction, 2 for bi-prediction) of the adjacent blocks are different | 1 | N/A | N/A |
| 3 | Absolute difference between the motion vectors of same reference picture that belong to the adjacent blocks is greater than or equal to one integer luma sample | 1 | N/A | N/A |
| 1 | Otherwise | 0 | 0 | 0 |

2.6.3 Deblocking Decision for Luma Component

The deblocking decision process is described in this sub-section.

Wider-stronger luma filter is filters are used only if all of the Condition1, Condition2 and Condition 3 are TRUE.

The condition 1 is the "large block condition". This condition detects whether the samples at P-side and Q-side belong to large blocks, which are represented by the variable bSidePisLargeBlk and bSideQisLargeBlk respectively. The bSidePisLargeBlk and bSideQisLargeBlk are defined as follows.

bSidePisLargeBlk=((edge type is vertical and $p_0$ belongs to CU with width>=32)||(edge type is horizontal and $p_0$ belongs to CU with height>=32))? TRUE: FALSE bSideQisLargeBlk=((edge type is vertical and $q_0$ belongs to CU with width>=32)||(edge type is horizontal and $q_0$ belongs to CU with height>=32))? TRUE: FALSE Based on bSidePisLargeBlk and bSideQisLargeBlk, the condition 1 is defined as follows.

Condition1=(bSidePisLargeBlk||bSidePisLargeBlk) ?TRUE: FALSE

Next, if Condition 1 is true, the condition 2 will be further checked. First, the following variables are derived:

dp0, dp3, dq0, dq3 are first derived as in HEVC if (p side is greater than or equal to 32)

$$dp0=(dp0+Abs(p5_0-2*p4_0+p3_0)+1)>>1$$

$$dp3=(dp3+Abs(p5_3-2*p4_3+p3_3)+1)>>1$$

if (q side is greater than or equal to 32)

$$dq0=(dq0+Abs(q5_0-2*q4_0+q3_0)+1)>>1$$

$$dq3=(dq3+Abs(q5_3-2*q4_3+q3_3)+1)>>1$$

Condition2=(d<β)? TRUE: FALSE where d=dp0+dq0+dp3+dq3, as shown in section 2.2.4.

If Condition1 and Condition2 are valid, whether any of the blocks uses sub-blocks is further checked:

If (bSidePisLargeBlk)
  If (mode block P == SUBBLOCKMODE)
    Sp =5
  Else
    Sp =7
Else
  Sp = 3
If (bSideQisLargeBlk)
  If (mode block Q == SUBBLOCKMODE)
    Sq =5
  Else
    Sq =7
Else
  Sq = 3

Finally, if both the Condition 1 and Condition 2 are valid, the proposed deblocking method will check the condition 3 (the large block strong filter condition), which is defined as follows.

In the Condition3 StrongFilterCondition, the following variables are derived:

dpq is derived as in HEVC.
$sp_3$ = Abs( $p_3 - p_0$ ), derived as in HEVC
if (p side is greater than or equal to 32)
  if(Sp==5)
    $sp_3$ = ( $sp_3$ + Abs( $p_5 - p_3$ ) + 1 ) >> 1
  Else
    $sp_3$ = ( $sp_3$ + Abs( $p_7 - p_3$ ) + 1 ) >> 1
$sq_3$ = Abs( $q_0 - q_3$ ), derived as in HEVC
if (q side is greater than or equal to 32)
  If(Sq=5)
    $sq_3$ = ( $sq_3$ + Abs( $q_5 - q_3$ ) + 1 ) >> 1
  Else
    $sq_3$ = ( $sq_3$ + Abs( $q_7 - q_3$ ) + 1 ) >> 1

As in HEVC, StrongFilterCondition=(dpq is less than (β>>2), $sp_3+sq_3$ is less than (3*β>>5), and Abs($p_0-q_0$) is less than (5*$t_C$+1)>>1)?TRUE: FALSE.

2.6.4 Stronger Deblocking Filter for Luma (Designed for Larger Blocks)

Bilinear filter is used when samples at either one side of a boundary belong to a large block. A sample belonging to a large block is defined as when the width>=32 for a vertical edge, and when height>=32 for a horizontal edge.

The bilinear filter is listed below.

Block boundary samples $p_i$ for i=0 to Sp−1 and qi for j=0 to Sq−1 (pi and qi are the i-th sample within a row for filtering vertical edge, or the i-th sample within a column for filtering horizontal edge) in HEVC deblocking described above) are then replaced by linear interpolation as follows:

$p_i'=(f_i*Middle_{s,t}+(64-f_i)*P_s+32)>>6)$, clipped to $p_i±tcPD_i$ $q_j'=(g_j*Middle_{s,t}+(64-g_j)*Q_s+32)>>6)$, clipped to $q_j±tcPD_j$ where $tcPD_i$ and $tcPD_j$ term is a position dependent clipping described in Section 2.3.6 and $g_j$, $f_i$, $Middle_{s,t}$, $P_s$ and $Q_s$ are given in Table 2-3:

TABLE 2-3

Long tap deblocking filters

| | |
|---|---|
| Sp, Sq | $f_i$ = 59 − i * 9, can also be described as f = {59, 50, 41, 32, 23, 14, 5} |
| 7, 7 | $g_j$ = 59 − j * 9, can also be described as g = {59, 50, 41, 32, 23, 14, 5} |
| (p side: 7, | $Middle_{7,7}$ = (2* ($p_o + q_o$) + $p_1 + q_1 + p_2 + q_2 + p_3 + q_3 + p_4 + q_4 + p_5 + q_5 + p_6 + q_6$ + 8) >> 4 |
| q side: 7) | $P_7$ = ($p_6 + p_7$ + 1) >> 1, $Q_7$ = ($q_6 + q_7$ + 1) >> 1 |
| 7, 3 | $f_i$ = 59 − i * 9, can also be described as f = {59, 50, 41, 32, 23, 14, 5} |
| (p side:7 | $g_j$ = 53 − j * 21, can also be described as g = {53, 32, 11} |
| q side: 3) | $Middle_{7,3}$ = (2 * ($p_o + q_o$) + $q_0$ + 2 * ($q_1 + q_2$) + $p_1 + q_1 + p_2 + p_3 + p_4 + p_5 + p_6$ + 8) >> 4 |
| | $p_7$ = ($p_6 + p_7$ + 1) >> 1, $Q_3$ = ($q_2 + q_3$ + 1) >> 1 |

TABLE 2-3-continued

Long tap deblocking filters

| | |
|---|---|
| 3, 7 (p side: 3) q side: 7) | $g_j = 59 - j * 9$, can also be described as $g = \{59, 50, 41, 32, 23, 14, 5\}$<br>$f_i = 53 - i * 21$, can also be described as $f = \{53, 32, 11\}$<br>$Middle_{3,7} = (2 * (q_o + p_o) + p_0 + 2 * (p_1 + p_2) + q_1 + p_1 + q_2 + q_3 + q_4 + q_5 + q_6 + 8) >> 4$<br>$Q_7 = (q_6 + q_7 + 1) >> 1, P_3 = (p_2 + p_3 + 1) >> 1$ |
| 7, 5 (p side: 7) q side: 5) | $g_j = 58 - j * 13$, can also be described as $g = \{58, 45, 32, 19, 6\}$<br>$f_i = 59 - i * 9$, can also be described as $f = \{59, 50, 41, 32, 23, 14, 5\}$<br>$Middle_{7,5} = (2 * (p_o + q_o + p_1 + q_1) + q_2 + p_2 + q_3 + p_3 + q_4 + p_4 + q_5 + p_5 + 8) >> 4$<br>$Q_5 = (q_4 + q_5 + 1) >> 1, P_7 = (p_6 + p_7 + 1) >> 1$ |
| 5, 7 (p side: 5) q side: 7) | $g_j = 59 - j * 9$, can also be described as $g = \{59, 50, 41, 32, 23, 14, 5\}$<br>$f_i = 58 - i * 13$, can also be described as $f = \{58, 45, 32, 19, 6\}$<br>$Middle_{5,7} = (2 * (q_o + p_o + p_1 + q_1) + q_2 + p_2 + q_3 + p_3 + q_4 + p_4 + q_5 + p_5 + 8) >> 4$<br>$Q_7 = (q_6 + q_7 + 1) >> 1, P_5 = (p_4 + p_5 + 1) >> 1$ |
| 5, 5 (p side: 5) q side: 5) | $g_j = 58 - j * 13$, can also be described as $g = \{58, 45, 32, 19, 6\}$<br>$f_i = 58 - i * 13$, can also be described as $f = \{58, 45, 32, 19, 6\}$<br>$Middle_{5,5} = (2 * (q_o + p_o + p_1 + q_1 + q_2 + p_2) + q_3 + p_3 + q_4 + p_4 + 8) >> 4$<br>$Q_5 = (q_4 + q_5 + 1) >> 1, P_5 = (p_4 + p_5 + 1) >> 1$ |
| 5, 3 (p side: 5) q side: 3) | $g_j = 53 - j * 21$, can also be described as $g = \{53, 32, 11\}$<br>$f_i = 58 - i * 13$, can also be described as $f = \{58, 45, 32, 19, 6\}$<br>$Middle_{5,3} = (q_o + p_o + p_1 + q_1 + q_2 + p_2 + q_3 + p_3 + 4) >> 3$<br>$Q_3 = (q_2 + q_3 + 1) >> 1, P_5 = (p_4 + p_5 + 1) >> 1$ |
| 3, 5 (p side: 3) q side: 5) | $g_j = 58 - j * 13$, can also be described as $g = \{58, 45, 32, 19, 6\}$<br>$f_i = 53 - i * 21$, can also be described as $f = \{53, 32, 11\}$<br>$Middle_{3,5} = (q_o + p_o + p_1 + q_1 + q_2 + p_2 + q_3 + 4) >> 3$<br>$Q_5 = (q_4 + q_5 + 1) >> 1, P_3 = (p_2 + p_3 + 1) >> 1$ |

2.6.5 Deblocking Control for Chroma

The chroma strong filters are used on both sides of the block boundary. Here, the chroma filter is selected when both sides of the chroma edge are greater than or equal to 8 (chroma position), and the following decision with three conditions are satisfied: the first one is for decision of boundary strength as well as large block. The proposed filter can be applied when the block width or height which orthogonally crosses the block edge is equal to or larger than 8 in chroma sample domain. The second and third one is basically the same as for HEVC luma deblocking decision, which are on/off decision and strong filter decision, respectively.

In the first decision, boundary strength (bS) is modified for chroma filtering as shown in Table 2-2. The conditions in Table 2-2 are checked sequentially. If a condition is satisfied, then the remaining conditions with lower priorities are skipped.

Chroma deblocking is performed when bS is equal to 2, or bS is equal to 1 when a large block boundary is detected.

The second and third condition is basically the same as HEVC luma strong filter decision as follows.

In the second condition: d is then derived as in HEVC luma deblocking.

The second condition will be TRUE when d is less than 0.

In the third condition StrongFilterCondition is derived as follows:

dpq is derived as in HEVC $sp_3 = Abs(p_3 - p_0)$, derived as in HEVC $sq_3 = Abs(q_0 - q_3)$, derived as in HEVC As in HEVC design, StrongFilterCondition=(dpq is less than ($\beta >> 2$), $sp_3 + sq_3$ is less than ($\beta >> 3$), and $Abs(p_0 - q_0)$ is less than ($5 * t_C + 1) >> 1$)

2.6.6 Strong Deblocking Filter for Chroma

The following strong deblocking filter for chroma is defined:

$$p'_2 = (3 * p_3 + 2 * p_2 + p_1 + p_0 + q_0 + 4) \gg 3$$

$$p'_1 = (2 * p_3 + p_2 + 2 * p_1 + p_0 + q_0 + q_1 + 4) \gg 3$$

$$p'_0 = (p_3 + p_2 + p_1 + 2 * p_0 + q_0 + q_1 + q_2 + 4) \gg 3$$

The proposed chroma filter performs deblocking on a 4×4 chroma sample grid.

2.6.7 Position Dependent Clipping

The position dependent clipping tcPD is applied to the output samples of the luma filtering process involving strong and long filters that are modifying 7, 5 and 3 samples at the boundary. Assuming quantization error distribution, it is proposed to increase clipping value for samples which are expected to have higher quantization noise, thus expected to have higher deviation of the reconstructed sample value from the true sample value.

For each P or Q boundary filtered with asymmetrical filter, depending on the result of decision-making process in section 2.3.3, position dependent threshold table is selected from two tables (i.e., Tc7 and Tc3 tabulated below that are provided to decoder as a side information:

$Tc7 = \{6, 5, 4, 3, 2, 1, 1\};$ $Tc3 = \{6, 4, 2\};$ $tcPD = (Sp == 3)?Tc3:Tc7;$ $tcQD = (Sq == 3)?Tc3:Tc7;$

For the P or Q boundaries being filtered with a short symmetrical filter, position dependent threshold of lower magnitude is applied:

$Tc3 = \{3, 2, 1\};$

Following defining the threshold, filtered $p'_i$ and $q'_i$ sample values are clipped according to tcP and tcQ clipping values:

$$p''_i = Clip3(p'_i + tcP_i, p'_i - tcP_i, p'_i);$$

$$q''_j = Clip3(q'_j + tcQ_j, q'_j - tcQ_j, q'_j);$$

where $p'_i$ and $q'_i$ are filtered sample values, $p''_i$ and $q''_j$ are output sample value after the clipping and $tcP_i$ $tcP_i$ are clipping thresholds that are derived from the VVC tc parameter and tcPD and tcQD. The function Clip3 is a clipping function as it is specified in VVC.

2.6.8 Sub-Block Deblocking Adjustment

To enable parallel friendly deblocking using both long filters and sub-block deblocking the long filters is restricted to modify at most 5 samples on a side that uses sub-block deblocking (AFFINE or ATMVP or DMVR) as shown in the luma control for long filters. Additionally, the sub-block deblocking is adjusted such that that sub-block boundaries on an 8×8 grid that are close to a CU or an implicit TU boundary is restricted to modify at most two samples on each side.

Following applies to sub-block boundaries that not are aligned with the CU boundary.

```
If (mode block Q == SUBBLOCKMODE && edge !=0) {
  if (!(implicitTU && (edge == (64 / 4))))
    if (edge == 2 || edge == (orthogonalLength − 2) || edge = (56 / 4) || edge == (72 /
      Sp = Sq = 2;
    Else
      Sp = Sq = 3,
  Else
    Sp = Sq = bSideQisLargeBlk ? 5:3
}
```

Where edge equal to 0 corresponds to CU boundary, edge equal to 2 or equal to orthogonalLength-2 corresponds to sub-block boundary 8 samples from a CU boundary etc. Where implicit TU is true if implicit split of TU is used.

2.6.9 Restriction to 4CTU/2CTU Line Buffers for Luma/Chroma

Filtering of horizontal edges is limiting Sp=3 for luma, Sp=1 and Sq=1 for chroma, when the horizontal edge is aligned with the CTU boundary.

2.7 Intra Mode Coding in VVC

Figure 12:
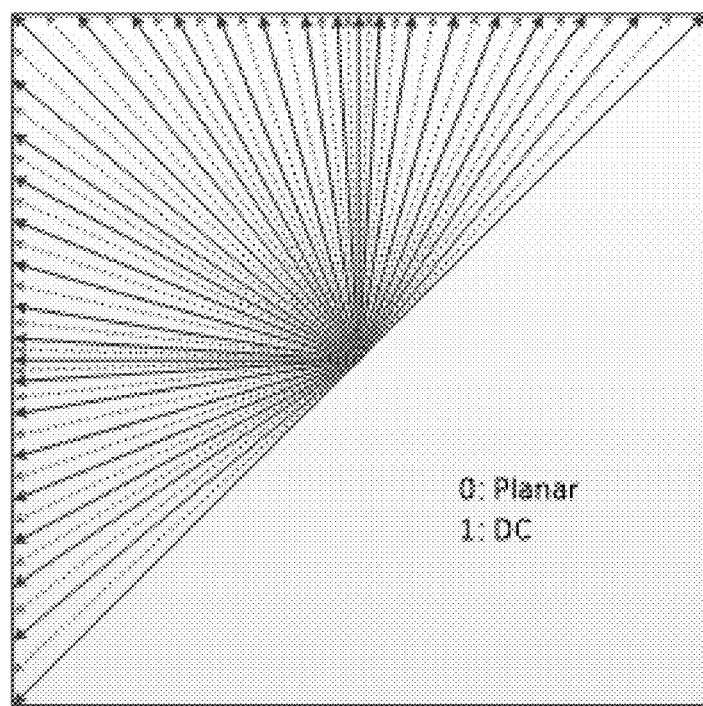
FIG. 12 shows examples of 67 intra mode prediction directions.

To capture the arbitrary edge directions presented in natural video, the number of directional intra modes in VTM5 is extended from 33, as used in HEVC, to 65. The new directional modes not in HEVC are depicted as red dotted arrows in FIG. 12, and the planar and DC modes remain the same. These denser directional intra prediction modes apply for all block sizes and for both luma and chroma intra predictions.

In VTM5, several conventional angular intra prediction modes are adaptively replaced with wide-angle intra prediction modes for the non-square blocks. Wide angle intra prediction is described in Section 3.3.1.2.

In HEVC, every intra-coded block has a square shape and the length of each of its side is a power of 2. Thus, no division operations are required to generate an intra-predictor using DC mode. In VTM5, blocks can have a rectangular shape that necessitates the use of a division operation per block in the general case. To avoid division operations for DC prediction, only the longer side is used to compute the average for non-square blocks.

Figure 13:
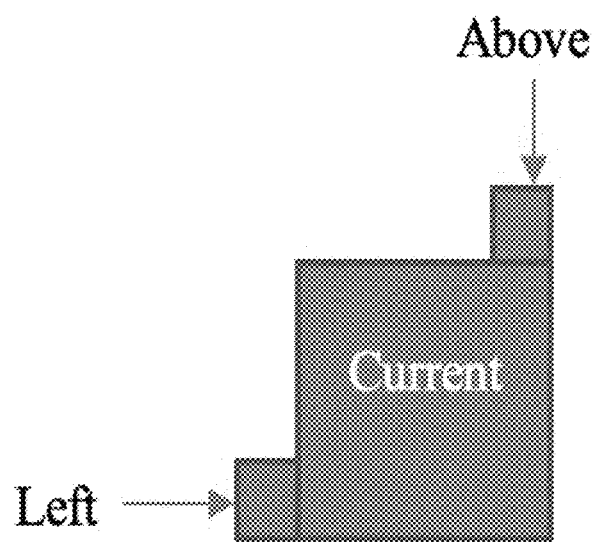
FIG. 13 shows examples of neighboring video blocks.

To keep the complexity of the most probable mode (MPM) list generation low, an intra mode coding method with 6 MPMs is used by considering two available neighboring intra modes. The following three aspects are considered to construct the MPM list:
1. Default intra modes
2. Neighbouring intra modes
3. Derived intra modes A unified 6-MPM list is used for intra blocks irrespective of whether MRL and ISP coding tools are applied or not. The MPM list is constructed based on intra modes of the left and above neighboring block. Suppose the mode of the left block is denoted as Left and the mode of the above block is denoted as Above, the unified MPM list is constructed as follows (The left and above blocks are shown in FIG. 13.

When a neighboring block is not available, its intra mode is set to Planar by default.

If both modes Left and Above are non-angular modes:
  MPM list→{Planar, DC, V, H, V−4, V+4}

If one of modes Left and Above is angular mode, and the other is non-angular:
  Set a mode Max as the larger mode in Left and Above
  MPM list→{Planar, Max, DC, Max−1, Max+1, Max−2}

If Left and Above are both angular and they are different
  Set a mode Max as the larger mode in Left and Above
  if the difference of mode Left and Above is in the range of 2 to 62, inclusive
    MPM list→{Planar, Left, Above, DC, Max−1, Max+1}
  Otherwise
    MPM list→{Planar, Left, Above, DC, Max−2, Max+2}

If Left and Above are both angular and they are the same:
  MPM list→{Planar, Left, Left−1, Left+1, DC, Left−2}

Besides, the first bin of the mpm index codeword is CABAC context coded. In total three contexts are used, corresponding to whether the current intra block is MRL enabled, ISP enabled, or a normal intra block.

During 6 MPM list generation process, pruning is used to remove duplicated modes so that only unique modes can be included into the MPM list. For entropy coding of the 61 non-MPM modes, a Truncated Binary Code (TBC) is used.

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table 2-4. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 2-4

Derivation of chroma prediction mode from
luma mode when cclm_is enabled

| Chroma prediction mode | Corresponding luma intra prediction mode | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 0 | 50 | 18 | 1 | X |

2.8 Quantized Residual Block Differential Pulse-Code Modulation (QR-BDPCM)

In some embodiments, a quantized residual block differential pulse-code modulation (QR-BDPCM) is proposed to code screen contents efficiently.

The prediction directions used in QR-BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \leq i \leq M-1$, $0 \leq j \leq N-1$ be the prediction residual after performing intra prediction horizontally (copying left neighbor pixel value across the the predicted block line by line) or vertically (copying top neighbor line to each line in the predicted block) using unfiltered samples from above or left block boundary samples. Let $Q(r_{i,j})$, $0 \leq i \leq M-1$, $0 \leq j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical DPCM is signaled:

$$\tilde{r}_{i,j} = \begin{cases} Q(r_{i,j}), & i=0, 0 \leq j \leq (N-1) \\ Q(r_{i,j}) - Q(r_{(i-1),j}), & 1 \leq i \leq (M-1), 0 \leq j \leq (N-1) \end{cases} \quad (2\text{-}7\text{-}1)$$

For horizontal prediction, similar rules apply, and the residual quantized samples are obtained by $$\tilde{r}_{i,j} = \begin{cases} Q(r_{i,j}), & 0 \leq i \leq (M-1), j=0 \\ Q(r_{i,j}) - Q(r_{i,(j-1)}), & 0 \leq i \leq (M-1), 1 \leq j \leq (N-1) \end{cases} \quad (2\text{-}7\text{-}2)$$

The residual quantized samples $\tilde{r}_{i,j}$ are sent to the decoder. On the decoder side, the above calculations are reversed to produce $Q(r_{i,j})$, $0 \leq i \leq M-1$, $0 \leq j \leq N-1$. For vertical prediction case, $$Q(r_{i,j}) = \sum_{k=0}^{i} \tilde{r}_{k,j}, 0 \leq i \leq (M-1), 0 \leq j \leq (N-1) \quad (2\text{-}7\text{-}3)$$

For horizontal case, $$Q(r_{i,j}) = \sum_{k=0}^{j} \tilde{r}_{i,k}, 0 \leq i \leq (M-1), 0 \leq j \leq (N-1) \quad (2\text{-}7\text{-}4)$$

The inverse quantized residuals, $Q^{-1}(Q(r_{i,j}))$, are added to the intra block prediction values to produce the reconstructed sample values.

The main benefit of this scheme is that the inverse DPCM can be done on the fly during coefficient parsing simply adding the predictor as the coefficients are parsed or it can be performed after parsing.

2.9 Adaptive Loop Filter

In the VTM5, an Adaptive Loop Filter (ALF) with block-based filter adaption is applied. For the luma component, one among 25 filters is selected for each 4×4 block, based on the direction and activity of local gradients.

2.9.1 Filter Shape

Figure 14:
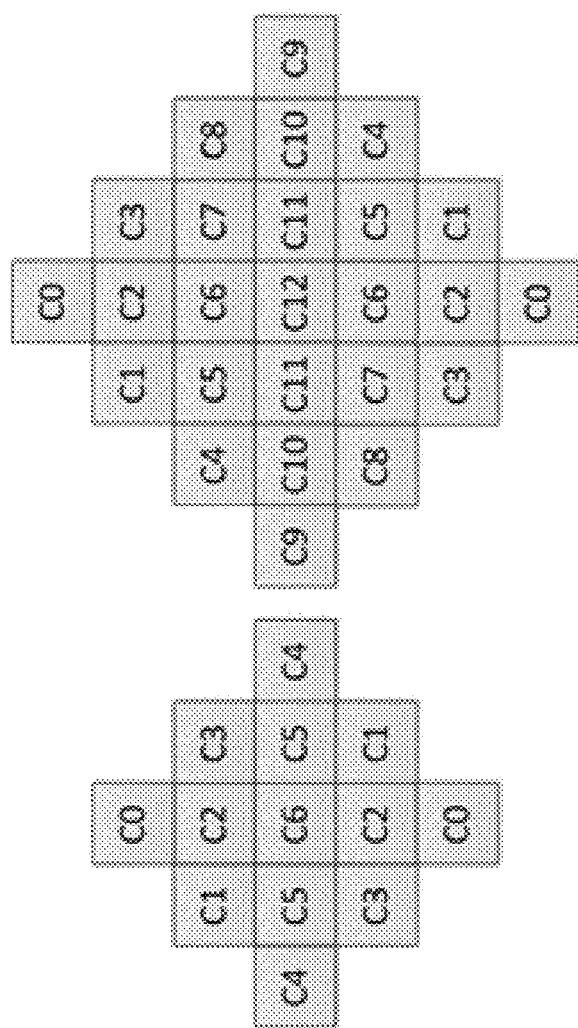
FIG. 14 shows examples of ALF filter shapes (chroma: 5×5 diamond, luma: 7×7 diamond).
Figure 15B:
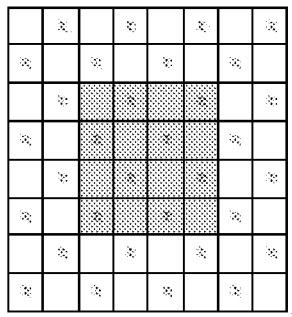
FIG. 15B shows an examples of subsampled Laplacian calculation for horizontal gradient.
Figure 15D:
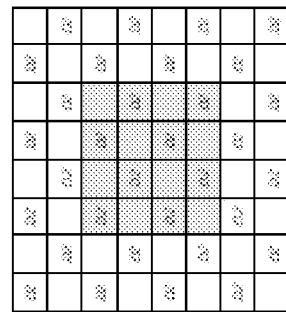
FIG. 15D shows an examples of subsampled Laplacian calculation for diagonal gradient.
Figure 15A:
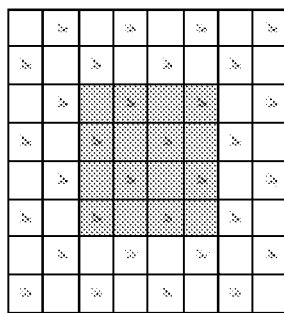
FIG. 15A shows an examples of subsampled Laplacian calculation for vertical gradient.
Figure 15C:
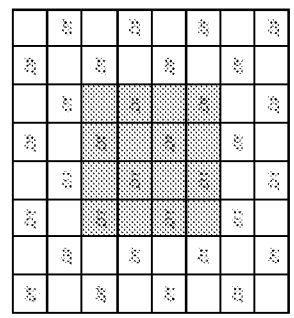
FIG. 15C shows an examples of subsampled Laplacian calculation for diagonal gradient.

In the VTM5, two diamond filter shapes (as shown in FIG. 14) are used. The 7×7 diamond shape is applied for luma component and the 5×5 diamond shape is applied for chroma components.

2.9.2 Block Classification

For luma component, each 4×4 block is categorized into one out of 25 classes. The classification index C is derived based on its directionality D and a quantized value of activity $\hat{A}$, as follows:

$$C = 5D + \hat{A} \quad (2\text{-}9\text{-}1)$$

To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l}, \quad V_{k,l} = |2R(k,l) - R(k,l-1) - R(k,l+1)| \quad (2\text{-}9\text{-}2)$$

$$g_h = \sum_{k=i-2}^{i+3} \sum_{l=j-2}^{j+3} H_{k,l}, \quad H_{k,l} = |2R(k,l) - R(k-1,l) - R(k+1,l)| \quad (2\text{-}9\text{-}3)$$

$$g_{d1} = \sum_{k=i-2}^{i+3} \sum_{l=j-3}^{j+3} D1_{k,l}, \quad D1_{k,l} = |2R(k,l) - R(k-1,l-1) - R(k+1,l+1)| \quad (2\text{-}9\text{-}4)$$

$$g_{d2} = \sum_{k=i-2}^{i+3} \sum_{l=j-2}^{j+3} D2_{k,l}, \quad D2_{k,l} = |2R(k,l) - R(k-1,l+1) - R(k+1,l-1)| \quad (2\text{-}9\text{-}5)$$

Where indices i and j refer to the coordinates of the upper left sample within the 4×4 block and R(i,j) indicates a reconstructed sample at coordinate (i,j).

To reduce the complexity of block classification, the subsampled 1-D Laplacian calculation is applied. As shown in FIG. 15A-D, the same subsampled positions are used for gradient calculation of all directions.

Then D maximum and minimum values of the gradients of horizontal and vertical directions are set as:

$$g_{h,v}^{max} = \max(g_h, g_v), g_{h,v}^{min} = \min(g_h, g_v) \qquad (2\text{-}9\text{-}6)$$

The maximum and minimum values of the gradient of two diagonal directions are set as:

$$g_{d0,d1}^{max} = \max(g_{d0}, g_{d1}), g_{d0,d1}^{min} = \min(g_{d0}, g_{d1}) \qquad (2\text{-}9\text{-}7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, D is set to 2; otherwise D is set to 1.

Step 4. If $g_{d0,d1}^{max} > t_2 \cdot g_{d0,d1}^{min}$, D is set to 4; otherwise D is set to 3.

The activity value A is calculated as:

$$A = \sum_{k=i-2}^{i+3} \sum_{l=j-2}^{j+3} (V_{k,l} + H_{k,l}) \qquad (2\text{-}9\text{-}8)$$

A is further quantized to the range of 0 to 4, inclusively, an the quantized value is denoted as Â.

For chroma components in a picture, no classification method is applied, i.e. a single set of ALF coefficients is applied for each chroma component.

2.9.3. Geometric Transformations of Filter Coefficients and Clipping Values

Before filtering each 4×4 luma block, geometric transformations such as rotation or diagonal and vertical flipping are applied to the filter coefficients $f(k, l)$ and to the corresponding filter clipping values c(k, l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

$$\text{Diagonal: } f_D(k, l) = f(l, k), c_D(k, l) = c(l, k) \qquad (2\text{-}9\text{-}9)$$

$$\text{Vertical flip: } f_V(k, l) = f(k, K-l-1), c_V(k, l) = c(k, K-l-1) \qquad (2\text{-}9\text{-}10)$$

$$\text{Rotation: } f_R(k, l) = f(K-l-1, k), c_R(k, l) = c(K-l-1, k) \qquad (2\text{-}9\text{-}11)$$

where K is the size of the filter and $0 \leq k, l \leq K-1$ are coefficients coordinates, such that location (0,0) is at the upper left corner and location (K−1, K−1) is at the lower right corner. The transformations are applied to the filter coefficients f (k, l) and to the clipping values c(k, l) depending on gradient values calculated for that block. The relationship between the transformation and the four gradients of the four directions are summarized in the following table.

TABLE 2-5

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

2.9.4 Filter Parameters Signalling

In the VTM5, ALF filter parameters are signaled in Adaptation Parameter Set (APS). In one APS, up to 25 sets of luma filter coefficients and clipping value indexes, and up to one set of chroma filter coefficients nd clipping value indexes could be signaled. To reduce bits overhead, filter coefficients of different classification can be merged. In slice header, the indices of the APSs used for the current slice are signaled.

Clipping value indexes, which are decoded from the APS, allow determining clipping values using a Luma table of clipping values and a Chroma table of clipping values. These clipping values are dependent of the internal bitdepth. More precisely, the Luma table of clipping values and Chroma table of clipping values are obtained by the following formulas:

$$AlfClip_L = \left\{ \text{round}\left(2^{B\frac{N-n+1}{N}}\right) \text{ for } n \in [1 \ldots N] \right\}, \qquad (2\text{-}9\text{-}12)$$

$$AlfClip_C = \left\{ \text{round}\left(2^{(B-8)+8\frac{(N-n)}{N-1}}\right) \text{ for } n \in [1 \ldots N] \right\} \qquad (2\text{-}9\text{-}13)$$

with B equal to the internal bitdepth and N equal to 4 which is the number of allowed clipping values in VTM5.0.

The filtering process can be controlled at CTB level. A flag is always signaled to indicate whether ALF is applied to a luma CTB. A luma CTB can choose a filter set among 16 fixed filter sets and the filter sets from APSs. A filter set index is signaled for a luma CTB to indicate which filter set is applied. The 16 fixed filter sets are pre-defined and hard-coded in both the encoder and the decoder.

The filter coefficients are quantized with norm equal to 128. In order to restrict the multiplication complexity, a bitstream conformance is applied so that the coefficient value of the non-central position shall be in the range of $-2^7$ to $2^7-1$, inclusive. The central position coefficient is not signaled in the bitstream and is considered as equal to 128.

2.9.5 Filtering Process

At decoder side, when ALF is enabled for a CTB, each sample R(i, j) within the CU is filtered, resulting in sample value R'(i, j) as shown below, $$R'(i, j) = R(i, j) + \qquad (2\text{-}9\text{-}14)$$
$$\left(\left(\sum_{k \neq 0}\sum_{l \neq 0} f(k, l) \times K(R(i+k, j+l) - R(i, j), c(k, l)) + 64\right) \gg 7\right)$$

where ƒ(k,l) denotes the decoded filter coefficients, K(x, y) is the clipping function and c(k,l) denotes the decoded clipping parameters. The variable k and I varies between $$-\frac{L}{2} \text{ and } \frac{L}{2}$$

where L denotes the filter length. The clipping function $K(x, y)=\min(y, \max(-y,x))$ which corresponds to the function Clip3 $(-y, y, x)$.

2.9.6 Virtual Boundary Filtering Process for Line Buffer Reduction

Figure 16:
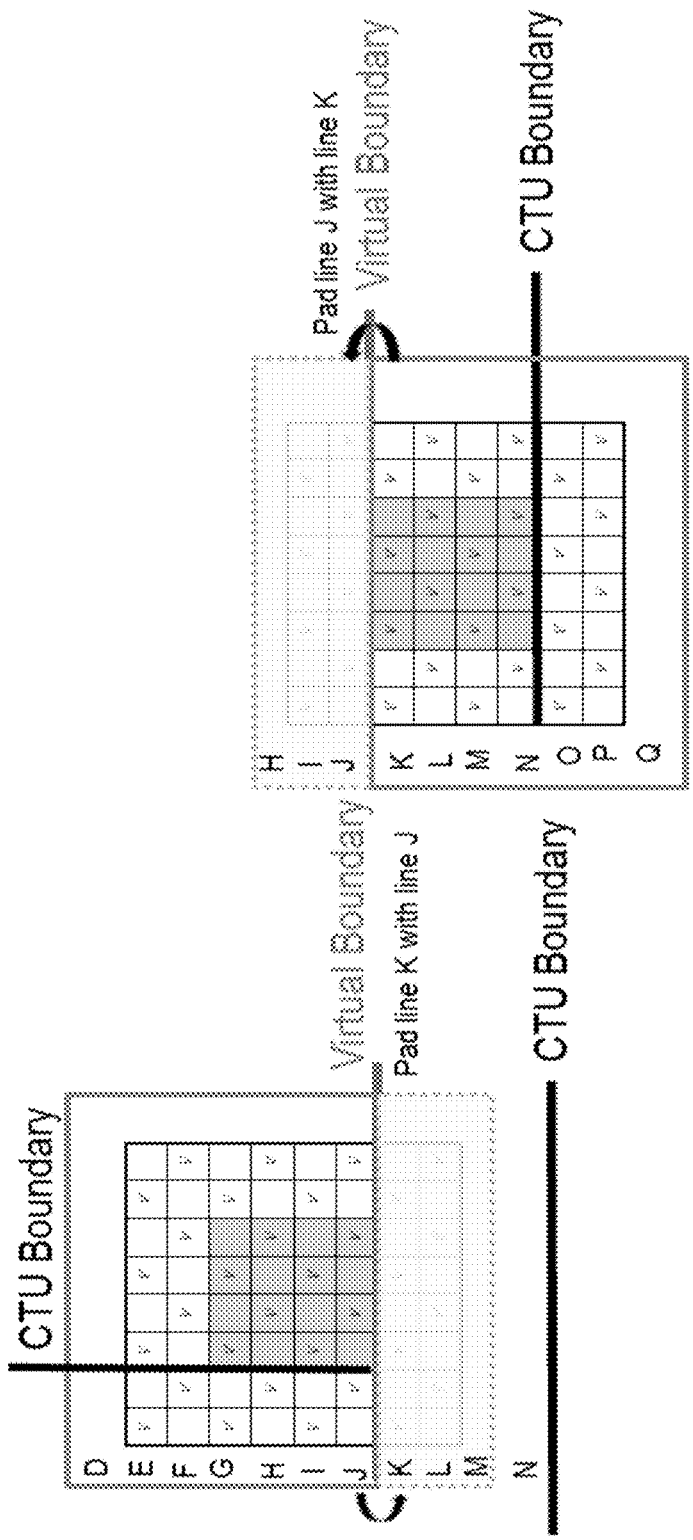
FIG. 16 shows an examples of modified block classification at virtual boundaries.

In VTM5, to reduce the line buffer requirement of ALF, modified block classification and filtering are employed for the samples near horizontal CTU boundaries. For this purpose, a virtual boundary is defined as a line by shifting the horizontal CTU boundary with "N" samples as shown in FIG. 16, with N equal to 4 for the Luma component and 2 for the Chroma component.

Modified block classification is applied for the Luma component as depicted in FIG. 2-11. For the 1D Laplacian gradient calculation of the 4×4 block above the virtual boundary, only the samples above the virtual boundary are used. Similarly for the 1D Laplacian gradient calculation of the 4×4 block below the virtual boundary, only the samples below the virtual boundary are used. The quantization of activity value A is accordingly scaled by taking into account the reduced number of samples used in 1D Laplacian gradient calculation.

Figure 17:
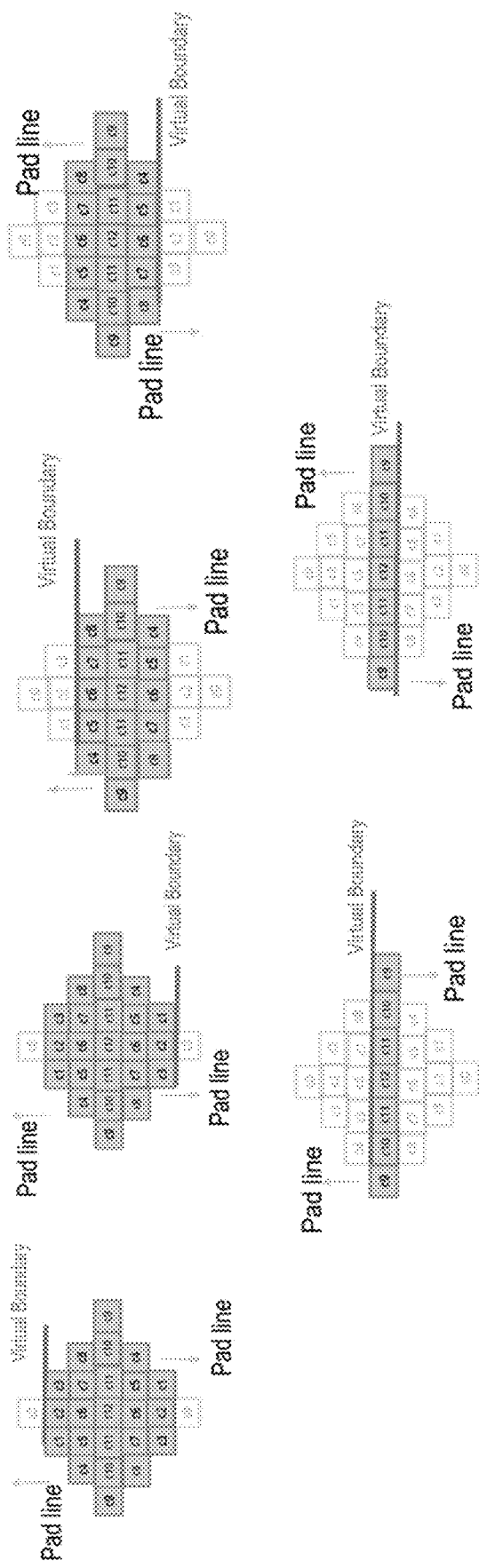
FIG. 17 shows an examples of modified ALF filtering for luma component at virtual boundaries.

For filtering processing, symmetric padding operation at the virtual boundaries are used for both Luma and Chroma components. As shown in FIG. 17, when the sample being filtered is located below the virtual boundary, the neighboring samples that are located above the virtual boundary are padded. Meanwhile, the corresponding samples at the other sides are also padded, symmetrically.

2.10 Sample Adaptive Offset (SAO)

Sample adaptive offset (SAO) is applied to the reconstructed signal after the deblocking filter by using offsets specified for each CTB by the encoder. The HM encoder first makes the decision on whether or not the SAO process is to be applied for current slice. If SAO is applied for the slice, each CTB is classified as one of five SAO types as shown in Table 2-6. The concept of SAO is to classify pixels into categories and reduces the distortion by adding an offset to pixels of each category. SAO operation includes Edge Offset (EO) which uses edge properties for pixel classification in SAO type 1-4 and Band Offset (BO) which uses pixel intensity for pixel classification in SAO type 5. Each applicable CTB has SAO parameters including sao_merge_left_flag, sao_merge_up_flag, SAO type and four offsets. If sao_merge_left_flag is equal to 1, the current CTB will reuse the SAO type and offsets of the CTB to the left. If sao_merge_up_flag is equal to 1, the current CTB will reuse SAO type and offsets of the CTB above.

TABLE 2-6

Specification of SAO type

| SAO type | sample adaptive offset type to be used | Number of categories |
|---|---|---|
| 0 | None | 0 |
| 1 | 1-D 0-degree pattern edge offset | 4 |
| 2 | 1-D 90-degree pattern edge offset | 4 |

TABLE 2-6-continued

Specification of SAO type

| SAO type | sample adaptive offset type to be used | Number of categories |
|---|---|---|
| 3 | 1-D 135-degree pattern edge offset | 4 |
| 4 | 1-D 45-degree pattern edge offset | 4 |
| 5 | band offset | 4 |

2.10.1. Operation of Each SAO Type

Edge offset uses four 1-D 3-pixel patterns for classification of the current pixel p by consideration of edge directional information, as shown in FIG. 18. From left to right these are: 0-degree, 90-degree, 135-degree and 45-degree.

Each CTB is classified into one of five categories according to Table 2-7.

TABLE 2-7

Pixel classification rule for EO

| Category | Condition | Meaning |
|---|---|---|
| 0 | None of the below | Largely monotonic |
| 1 | p < 2 neighbours | Local minimum |
| 2 | p < 1 neighbour && p == 1 neighbour | Edge |
| 3 | p > 1 neighbour && p == 1 neighbour | Edge |
| 4 | p > 2 neighbours | Local maximum |

Figure 19:
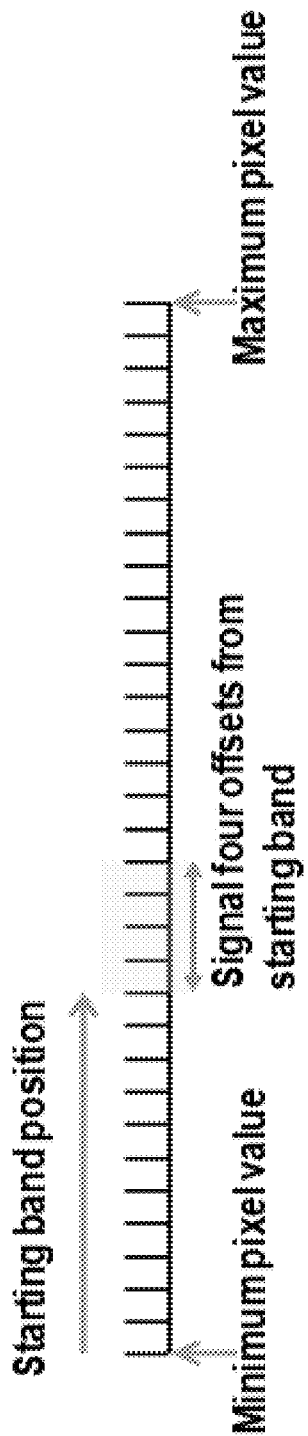
FIG. 19 shows an example of four bands are grouped together and represented by its starting band position.

Band offset (BO) classifies all pixels in one CTB region into 32 uniform bands by using the five most significant bits of the pixel value as the band index. In other words, the pixel intensity range is divided into 32 equal segments from zero to the maximum intensity value (e.g. 255 for 8-bit pixels). Four adjacent bands are grouped together and each group is indicated by its most left-hand position as shown in FIG. 19. The encoder searches all position to get the group with the maximum distortion reduction by compensating offset of each band.

2.11 Combined Inter and Intra Prediction (CIIP)

Figure 20:
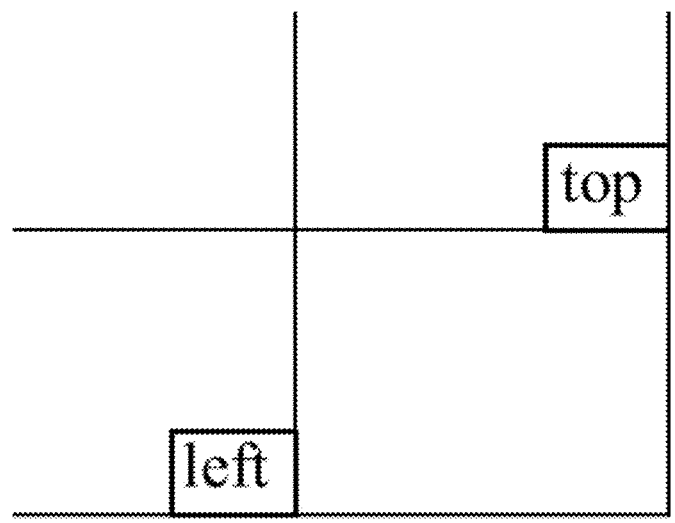
FIG. 20 shows an example of top and left neighboring blocks used in CIIP weight derivation.

In VTM5, when a CU is coded in merge mode, if the CU contains at least 64 luma samples (that is, CU width times CU height is equal to or larger than 64), and if both CU width and CU height are less than 128 luma samples, an additional flag is signaled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in FIG. 20) as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraLeft) is equal to 2, then wt is set to 3;

Otherwise, if (isIntraLeft+isIntraLeft) is equal to 1, then wt is set to 2,

Otherwise, set wt to 1.

The CIP prediction is formed as follows:

$$P_{CIIP} = ((4 - wt) * P_{inter} + wt * P_{intra} + 2) \gg 2 \qquad (3\text{-}1)$$

2.12 Luma Mapping with Chroma Scaling (LMCS)

Figure 21:
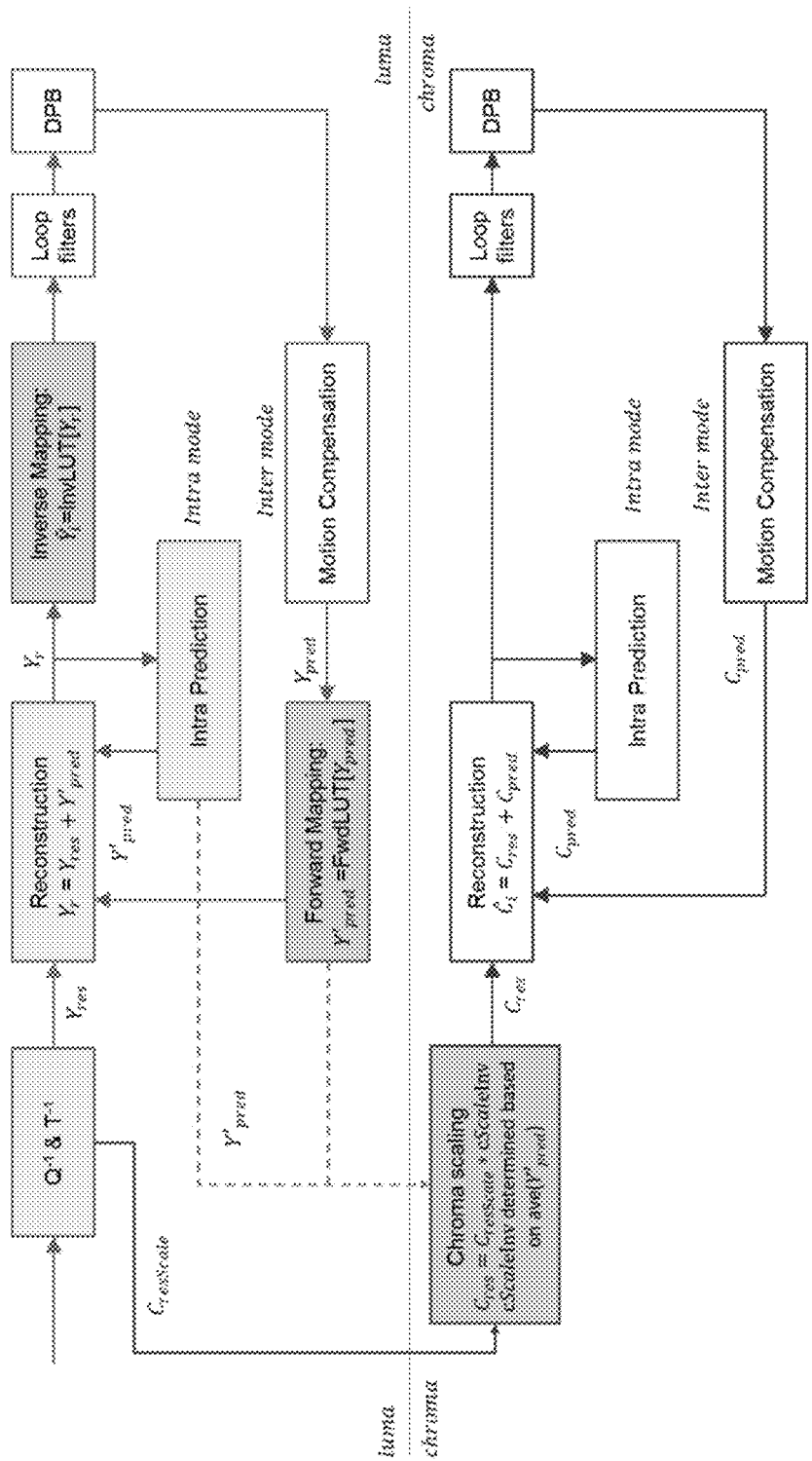
FIG. 21 shows an example of luma mapping with chroma scaling architecture.

In VTM5, a coding tool called the luma mapping with chroma scaling (LMCS) is added as a new processing block before the loop filters. LMCS has two main components: 1) in-loop mapping of the luma component based on adaptive piecewise linear models; 2) for the chroma components, luma-dependent chroma residual scaling is applied. FIG. 21 shows the LMCS architecture from decoder's perspective. The light-blue shaded blocks in FIG. 21 indicate where the processing is applied in the mapped domain; and these include the inverse quantization, inverse transform, luma intra prediction and adding of the luma prediction together with the luma residual. The unshaded blocks in FIG. 21 indicate where the processing is applied in the original (i.e., non-mapped) domain; and these include loop filters such as deblocking, ALF, and SAO, motion compensated prediction, chroma intra prediction, adding of the chroma prediction together with the chroma residual, and storage of decoded pictures as reference pictures. The light-yellow shaded blocks in FIG. 21 are the new LMCS functional blocks, including forward and inverse mapping of the luma signal and a luma-dependent chroma scaling process. Like most other tools in VVC, LMCS can be enabled/disabled at the sequence level using an SPS flag.

3. Examples of Problems Solved by Embodiments

One palette flag is usually used to indicate whether the palette mode is employed on the current CU, which can have different limitations and variances on its entropy coding. However, how to better code the palette flag has not been fully studied in the previous video coding standards.

The palette samples may have visual artifact if they are processed by post loop filtering process.

The palette scanning order could be improved for non-square blocks.

4. Examples of Embodiments

The detailed inventions below should be considered as examples to explain general concepts. These inventions should not be interpreted in a narrow way. Furthermore, these inventions can be combined in any manner.

Figure 10:
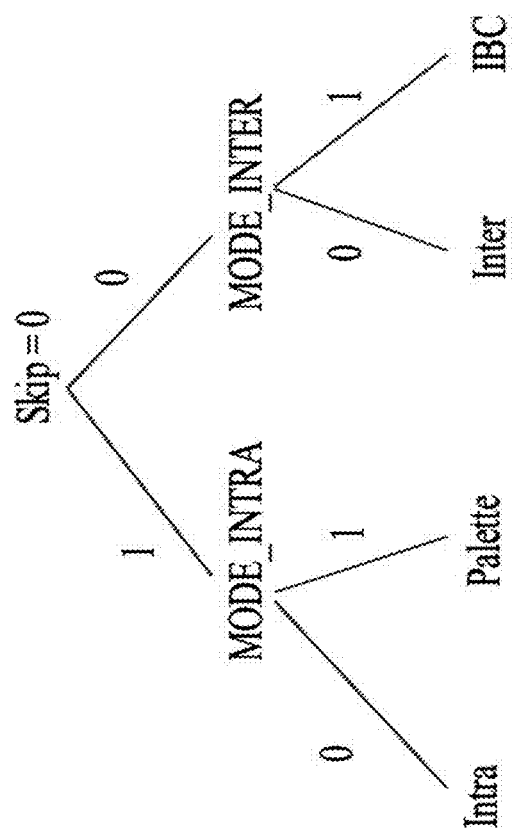
FIG. 10 shows an example of binarization of four modes.
Figure 11:
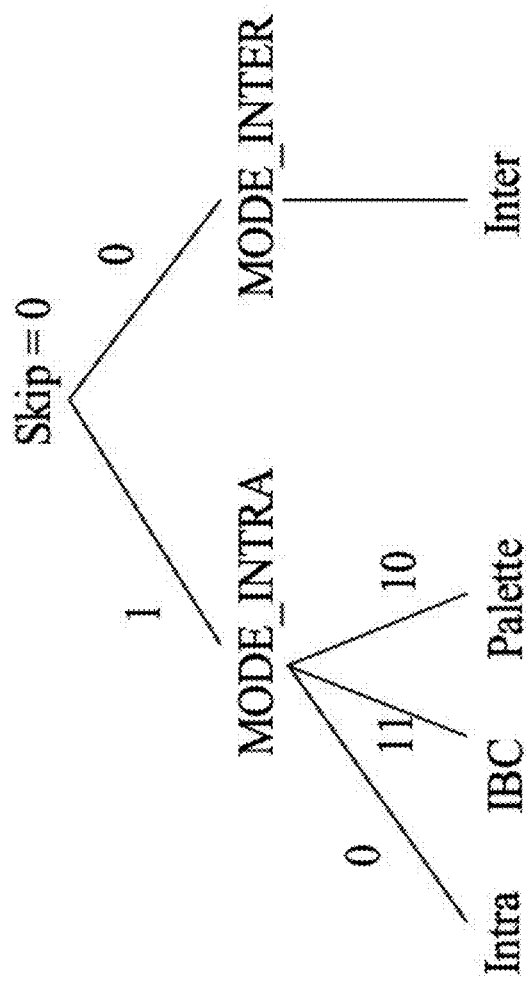
FIG. 11 shows an example of binarization of four modes.

1. Indication of usage of palette mode for a transform unit/prediction unit/coding block/region may be coded separately from the prediction mode.
   a. In one example, the prediction mode may be coded before the indication of usage of palette.
      i. Alternatively, furthermore, the indication of usage of palette may be conditionally signaled based on the prediction mode.
         1. In one example, when the prediction mode is the intra block copy mode (i.e., MODE_IBC), the signalling of the indication of usage of palette mode may be skipped. Alternatively, furthermore, the indication of usage of palette may be inferred to false when the current prediction mode is MODE_IBC.
         2. In one example, when the prediction mode is the inter mode (i.e., MODE_INTER), the signalling of the indication of usage of palette mode may be skipped. Alternatively, furthermore, the indication of usage of palette mode may be inferred to false when the current prediction mode is MODE_INTER.
         3. In one example, when the prediction mode is the intra mode (i.e., MODE_INTRA), the signalling of the indication of usage of palette mode may be skipped. Alternatively, furthermore, the indication of usage of palette mode may be inferred to false when the current prediction mode is MODE_INTRA.
         4. In one example, when the prediction mode is the skip mode (i.e., the skip flag equal to 1), the signalling of the indication of usage of palette mode may be skipped. Alternatively, furthermore, the indication of usage of palette mode may be inferred to false when the skip mode is employed on the current CU.
         5. In one example, when the prediction mode is the intra mode (e.g., MODE_INTRA), the indication of usage of palette mode may be signaled. Alternatively, furthermore, when the prediction mode is the inter mode or intra block copy mode, the signalling of the indication of usage of palette mode may be skipped.
            a) Alternatively, furthermore, when the prediction mode is the intra mode and not the Pulse-code modulation (PCM) mode, the indication of usage of palette mode may be signaled.
            b) Alternatively, furthermore, when the prediction mode is the intra mode, the indication of usage of palette mode may be signaled before the indication of usage of the PCM mode. In one example, when palette mode is applied, the signalling of usage of PCM mode may be skipped.
            c) Alternatively, furthermore, when the prediction mode is the inter mode or intra block copy mode, the signalling of the indication of usage of palette mode may be skipped.
         6. In one example, when the prediction mode is the inter mode (e.g MODE_INTER), the indication of usage of palette mode may be signaled.
            a) Alternatively, when the prediction mode is the intra mode, the signalling of the indication of usage of palette mode may be skipped.
         7. In one example, when the prediction mode is the intra block copy mode, the indication of usage of palette mode may be signaled. Alternatively, furthermore, when the prediction mode is the inter mode or intra mode, the signalling of the indication of usage of palette mode may be skipped.
      ii. Alternatively, furthermore, the indication of usage of palette mode may be conditionally signaled based on the picture/slice/tile group type.
   b. In one example, the prediction mode may be coded after the indication of usage of palette mode.
   c. In one example, indication of usage of palette mode may be signaled when the prediction mode is INTRA mode or INTER_MODE.
      i. In one example, the indication of usage of palette mode may be coded after the skip flag, prediction mode and the flag of PCM mode.
      ii. In one example, the indication of usage of palette mode may be coded after the skip flag, prediction mode, before the flag of PCM mode iii. In one example, when the current block is coded with intra mode, the indications of palette and IBC modes may be further signaled
1. In one example, one bit flag may be signaled to indicate whether palette or IBC mode is signaled.
2. In one example, signalling of the bit flag may be skipped under certain conditions, such as block dimension, whether IBC or palette mode is enabled for one tile/tile group/slice/picture/sequence.
d. In one example, the prediction mode (such as whether it is intra or inter mode) may be coded firstly, followed by the conditional signalling of whether it is palette mode or not.
i. In one example, when the prediction mode is the intra mode, another flag may be further signaled to indicate whether it is palette mode or not.
1. In one example, the 'another flag' may be signaled when the palette mode is enabled for one video data unit (e.g., sequence/picture/tile group/tile).
2. In one example, the 'another flag' may be signaled under the condition of block dimension.
3. Alternatively, furthermore, if it is not palette mode, one flag may be further signaled to indicate whether it is PCM mode or not.
4. In one example, the 'another flag' may be context coded according to information of neighboring blocks. Alternatively, the 'another flag' may be context coded with only one context. Alternatively, the 'another flag' may be bypass coded, i.e., without context.
ii. Alternatively, when the prediction mode is the inter mode, another flag may be further signaled to indicate whether it is IBC mode or not.
1. In one example, the 'another flag' may be signaled when the IBC mode is enabled for one video data unit (e.g., sequence/picture/tile group/tile).
2. In one example, the 'another flag' may be signaled under the condition of block dimension
2. It is proposed to add the palette mode as an additional candidate for prediction mode. Therefore, there is no need to signal the indication of usage of palette mode separately from the prediction mode.
a. In one example, the prediction modes may include intra, intra block copy and palette modes for intra slices/I pictures/intra tile groups.
b. Alternatively, the prediction modes may include intra, palette modes for intra slices/I pictures/intra tile groups.
c. In one example, the prediction modes may include intra, intra block copy and palette modes for 4×4 blocks.
d. In one example, the prediction modes may include intra, inter, intra block copy and palette modes for inter slices/P and/or B pictures/inter tile groups.
e. In one example, the prediction modes may include intra, inter, intra block copy modes for inter slices/P and/or B pictures/inter tile groups.
f. Alternatively, the prediction modes may include at least two of intra, inter, intra block copy and palette mode.
g. In one example, the inter mode may be not included in the prediction modes for 4×4 blocks.
h. In one example, when the block is not coded as the skip mode (which is a special case for the inter mode), the prediction mode index may be signaled.
i. In one example, the binarization of the four modes is defined as: intra (1), inter (00), IBC (010) and Palette (011).
ii. In one example, the binarization of the four modes is defined as: intra (10), inter (00), IBC (01) and Palette (11), as shown in FIG. 10.
iii. In one example, if the current slice is an intra slice and IBC is not enabled in the SPS, the binarization of the Palette and intra modes is defined as: Palette (1) and intra (0).
iv. In one example, if the current slice is not an intra slice and IBC is not enabled in the SPS, the binarization of the Palette, inter and intra modes is defined as: intra (1), inter (00), and Palette (01).
v. In one example, if the current slice is an intra slice and IBC is enabled in the SPS, the binarization of the Palette and intra modes is defined as: IBC (1), Palette (01), and intra (00).
vi. In one example, the binarization of the four modes is defined as: inter (1), intra (01), IBC (001) and Palette (000).
vii. In one example, the binarization of the four modes is defined as: intra (1), inter (01), IBC (001) and Palette (000).
viii. In one example, the binarization of the four modes is defined as: inter (0), intra (10), IBC (111) and Palette (110), as shown in FIG. 11.
3. The signaling of the indication of usage of palette/IBC mode may depend on the information of other mode.
a. In one example, the indication of usage of palette mode may be signaled when the current prediction mode is an intra mode and not a IBC mode.
b. In one example, the indication of usage of IBC mode may be signaled when the current prediction mode is an intra mode and not a palette mode.
4. How to signal the mode information may depend on the slice/picture/tile group type.
a. In one example, when it is I-slice/Intra tile group, one flag may be signaled to indicate whether it is IBC mode. If it is not the IBC mode, another flag may be further signaled to indicate whether it is palette or intra mode.
b. In one example, when it is I-slice/Intra tile group, one flag may be signaled to indicate whether it is intra mode. If it is not the intra mode, another flag may be further signaled to indicate whether it is palette or IBC mode.
5. The indication of usage of palette mode may be signaled and/or derived based on the following conditions.
a. block dimension of current block
i. In one example, the indication of usage of palette mode may be signaled only for blocks with width*height smaller than or equal to a threshold, such as 64*64.
ii. In one example, the indication of usage of palette mode may be signaled only for blocks with both width and height larger than or equal to a threshold, such as 64
iii. In one example, the indication of usage of palette mode may be signaled only for blocks with all below conditions are true:

1. width and/or height larger than or equal to a threshold, such as 16;
2. width and/or height smaller than or equal to a threshold, such as 32 or 64
   iv. In one example, the indication of usage of palette mode may be signaled only for blocks with width equal to height (i.e., square blocks)
   b. prediction mode of current block
   c. Current quantization parameter of current block
   d. The palette flag of neighboring blocks
   e. The intra block copy flags of neighboring blocks
   f. Indication of the color format (such as 4:2:0, 4:4:4)
   g. Separate/dual coding tree structure
   h. Slice/tile group type and/or picture type
6. The indication of usage of IBC mode may be signaled and/or derived based on the following conditions.
   a. block dimension of current block
      i. In one example, the indication of usage of IBC mode may be signaled only for blocks with both width or height smaller than 128
   b. prediction mode of current block
   c. Current quantization parameter of current block
   d. The palette flag of neighboring blocks
   e. The intra block copy flags of neighboring blocks
   f. Indication of the color format (such as 4:2:0, 4:4:4)
   g. Separate/dual coding tree structure
   h. Slice/tile group type and/or picture type
7. The palette mode may be treated as intra mode (e.g MODE_INTRA) in the deblocking decision process.
   a. In one example, if the samples at p side or q side are coded with palette mode, the boundary strength is set to 2.
   b. In one example, if the samples both at p side and q side are coded with palette mode, the boundary strength is set to 2
   c. Alternatively, the palette mode may be treated as inter mode (e.g MODE_INTER) in the deblocking decision process.
8. The palette mode may be treated as a separate mode (e.g MODE_PLT) in the deblocking decision process.
   a. In one example, if the samples at p side and q side are coded with palette mode, the boundary strength is set to 0.
      i. Alternatively, if samples at one side are coded with palette mode, the boundary strength is set to 0.
   b. In one example, if the samples at p side are coded with IBC mode and the samples at q side are coded with palette mode, the boundary strength is set to 1, vice versa.
   c. In one example, if the samples at p side are coded with intra mode and the samples at q side are coded with palette mode, the boundary strength is set to 2, vice versa.
9. The palette mode may be treated as a transform-skip block in the deblocking process
   a. Alternatively, the palette mode may be treated as a BDPCM block in the deblocking process.
10. The indication of usage of palette mode for a block may be signaled and/or derived based on the slice/tile group/picture level flag
    a. In one example, the flag indicates whether fractional motion vector difference (MVD) is allowed in the merge with motion vector difference (MMVD, a.k.a., UMVE) and/or adaptive motion vector resolution (AMVR) mode, (e.g. slice_fracmmvd_flag). Alternatively, furthermore, if the slice_fracmmvd_flag indicates fractional MVD is enabled, the signalling of indication of usage of palette mode is skipped and palette mode is inferred to be disabled.
    b. In one example, the flag indicates whether palette mode is enabled for the slice/tile group/picture. Alternatively, furthermore, when such a flag indicates palette mode is disabled, the signaling of usage of palette mode for a block is skipped and palette mode is inferred to be disabled.
11. The indication of usage of intra block copy mode (IBC) for a block may be signaled and/or derived based on the slice/tile group/picture level flag.
    a. In one example, the flag indicates whether fractional motion vector difference (MVD) is allowed in the merge with motion vector difference (MMVD, a.k.a., UMVE) and/or adaptive motion vector resolution (AMVR) mode, (e.g. slice_fracmmvd_flag). Alternatively, furthermore, if the slice_fracmmvd_flag indicates fractional MVD is enabled, the signalling of indication of usage of IBC mode is skipped and IBC mode is inferred to be disabled.
    b. In one example, the flag indicates whether IBC mode is enabled for the slice/tile group/picture. Alternatively, furthermore, when such a flag indicates IBC mode is disabled, the signaling of usage of IBC mode for a block is skipped and IBC mode is inferred to be disabled.
12. The sample associated with one palette entry may have different bit depths from the internal bit depth and/or the bit depth of original/reconstructed samples.
    a. In one example, denote the sample associated with one may have the bit depth equal to N, the following may apply:
       i. In one example, N may be a integer number (e.g. 8).
       ii. In one example, N may be larger than the internal bit depth and/or the bit depth of original/reconstructed samples.
       iii. In one example, N may be smaller than the internal bit depth and/or the bit depth of original/reconstructed samples.
       iv. In one example, N may depend on
          1. Block dimension of current block
          2. Current quantization parameter of current block
          3. Indication of the color format (such as 4:2:0, 4:4:4)
          4. Separate/dual coding tree structure
          5. Slice/tile group type and/or picture type
          6. Number of palette entries
          7. Number of prediction palette entries
          8. Index of color component
    b. In one example, the sample associated with multiple palette entries may have different bit depths.
       i. In one example, let C0, C1 be two palette entries in the current palette, and they may have bit depth equal to b0 and b1, respectively. b0 may be unequal to b1
          1. In one example, b0 may be larger/smaller than the internal bit depth and/or the bit depth of original/reconstructed samples and/or b1 may be larger/smaller than the internal bit depth and/or the bit depth of original/reconstructed samples.
    c. In one example, in the palette mode, the samples may be reconstructed according to the shifted values of samples associated with palette entries.

i. In one example, the samples may be reconstructed by left shifting the samples in the palette entries by M bits.
ii. In one example, the reconstructed value may be (C<<M)+(1<<(M−1)), wherein C is the palette entry.
iii. In one example, the samples may be reconstructed by right shifting the samples in the palette entries by M bits.
iv. In one example, the reconstructed value may be clip((C+(1<<(M−1)))>>M, 0, (1<<N)−1), wherein C is the palette entry and N is the bit-depth of reconstruction.
v. Alternatively, furthermore, in one example, the M may depend on the bit depth difference between samples associated with palette entries and the internal bit depth of reconstructed samples/original samples.
  1. In one example, M may be equal to the internal bit depth minus the bit depth of samples in the palette entries
  2. In one example, M may be equal to the bit depth of samples in the palette entries minus the internal bit depth
  3. In one example, M may be equal to the bit depth of the original samples minus the bit depth of samples in the palette entries
  4. In one example, M may be equal to the bit depth of samples in the palette entries minus the bit depth of the original samples.
  5. In one example, M may be equal to the bit depth of the reconstructed samples minus the bit depth of samples in the palette entries
  6. In one example, M may be equal to the bit depth of samples in the palette entries minus the bit depth of the reconstructed samples
vi. In one example, M may be an integer number (e.g. 2).
vii. Alternatively, furthermore, in one example, the M may depend on
  1. Block dimension of current block
  2. Current quantization parameter of current block
  3. Indication of the color format (such as 4:2:0, 4:4:4)
  4. Separate/dual coding tree structure
  5. Slice/tile group type and/or picture type
  6. Number of palette entries
  7. Number of prediction palette entries
  8. Sample position in a block/picture/slice/tile
  9. Index of color component
viii. In one example, a look up operation based on the samples in the palette entries may be used during the sample's reconstruction.
  1. In one example, the values in the look up table may be signaled in the Sequence Parameter Set (SPS)/Video Parameter Set (VPS)/Picture Parameter Set (PPS)/picture header/slice header/tile group header/LCU row/group of LCUs.
  2. In one example, the values in the look up table may be inferred in the SPS/VPS/PPS/picture header/slice header/tile group header/LCU row/group of LCUs.
13. The signaled/derived quantization parameter (QP) for palette coded blocks may be firstly modified before being used to derive escape pixel/samples, such as being clipped.
  a. In one example, the applied QP range for palette coded blocks may be treated in the same way as transform skip mode, and/or BDPCM mode.
  b. In one example, the applied QP for palette coded blocks may be revised to be max(Qp, 4+T), where T is an integer value and Qp is the signaled or derived quantization parameter for the block.
    i. In one example, T may be a predefined threshold.
    ii. In one example, T may be equal to (4+min_qp_prime_ts_minus4) wherein min_qp_prime_ts_minus4 may be signaled.
14. How to code escape samples/symbols may be unified regardless whether transquant bypass is enabled or not.
  a. In one example, escape sample may be signaled with fixed length.
  b. In one example, an escape sample may be signaled in fixed length using N bits.
    i. In one example, N may be an integer number (e.g. 8 or 10) and may depend on
      1. A message signaled in the SPS/VPS/PPS/picture header/slice header/tile group header/LCU row/group of LCUs.
      2. Internal bit depth
      3. Input bit depth
      4. Block dimension of current block
      5. Current quantization parameter of current block
      6. Indication of the color format (such as 4:2:0, 4:4:4)
      7. Separate/dual coding tree structure
      8. Slice/tile group type and/or picture type
  c. In one example, the code length to signal an escape pixel/sample may depend on internal bit depth.
    i. Alternatively, the code length to signal an escape pixel/sample may depend on input bit depth.
  d. In one example, the code length to signal an escape pixel/sample may depend on the quantization parameter.
    i. In one example, the code length for signalling an escape pixel/sample may be f(Qp)
      1. In one example, the function $f$ may be defined as (internal bitdepth−(Qp−4)/6).
15. The quantization and/or inverse quantization process for palette coded blocks and non-palette coded blocks may be defined in different ways.
  a. In one example, right bit-shifting may be used for quantizing escape sample instead of using the quantization process for transform coefficients or residuals.
  b. In one example, left bit-shifting may be used for inverse quantizing escape sample instead of using the inverse quantization process for transform coefficients or residuals.
  c. At the encoder side, the following may apply:
    i. In one example, the escape pixel/sample value may be signaled as f(p, Qp), where p is the pixel/sample value.
    ii. In one example, the function $f$ may be defined as p>>((Qp−4)/6), where p is the pixel/sample value and Qp is the quantization parameter.
    iii. In one example, the escape pixel/sample value may be signaled as p>>N, where p is the pixel/sample value.
      1. In one example, N may be an integer number (e.g. 2) and may depend on
        a) A message signaled in the SPS/VPS/PPS/picture header/slice header/tile group header/LCU row/group of LCUs.

b) Internal bit depth
c) Input bit depth
d) Block dimension of current block
e) Current quantization parameter of current block
f) Indication of the color format (such as 4:2:0, 4:4:4)
g) Separate/dual coding tree structure
h) Slice/tile group type and/or picture type
d. At the decoder side, the following may apply:
  i. In one example, the escape pixel/sample value may be signaled as f(bd,p,Qp)
    1. In one example, the function $f$ may be defined as clip(0, (1<<(bd−(Qp−4)/6))−1, (p+(1<<(bd−1)))>>((Qp−4)/6)).
  ii. In one example, the escape pixel/sample value may be reconstructed as f(p,Qp), where p is the decoded escape pixel/sample value.
    1. In one example, f may be defined as p<<((Qp−4)/6)
  iii. In one example, the escape pixel/sample value may be reconstructed as f(bd,p,Qp), where p is the decoded escape pixel/sample value.
    1. In one example, the function clip may be defined as clip(0, (1<<bd)−1, p<<((Qp−4)/6))
  iv. In the above examples, the clip function clip(a,i,b) may be defined as (i<a?a: (i>b?b:i)).
  v. In the above examples, the clip function clip(a,i,b) may be defined as (i<=a?a: (i>=b?b: i)).
  vi. In the above examples, p may be the pixel/sample value, bd may be the internal bit depth or input bit depth, and Qp is the quantization parameter.
16. A palette-coded block may be treated as an intra block (e.g. MODE_INTRA) during the list construction process of most probable modes (MPM).
  a. In one example, when fetching the intra modes of neighboring (adjacent or non-adjacent) blocks during the construction of the MPM list, if a neighboring block (e.g., left and/or above) is coded with palette mode, it may be treated as conventional intra-coded block (e.g. MODE_INTRA) with a default mode.
    i. In one example. the default mode may be DC/PLANAR/VER/HOR mode.
    ii. In one example, the default mode may be any one intra prediction mode.
    iii. In one example, the default mode may be signaled in the Dependency Parameter Set (DPS)/SPS/VPS/PPS/APS/picture header/slice header/tile group header/Largest coding unit (LCU)/Coding unit (CU)/LCU row/group of LCUs/TU/PU block/Video coding unit.
17. A palette-coded block may be treated as a non-intra block (e.g. treated as a block with prediction mode equal to MODE. PLT) during the list construction process of most probable modes (MPM).
  a. In one example, when fetching the intra modes of neighboring blocks during the construction of the MPM list, if a neighboring block (e.g., left and/or above) is coded with palette mode, it may be treated in the same way or a similar way as those coded with inter mode.
  b. In one example, when fetching the intra modes of neighboring blocks during the construction of the MPM list, if a neighboring block (e.g., left and/or above) is coded with palette mode, it may be treated in the same way or a similar way as those coded with IBC mode.
18. The luma block coded with palette mode corresponding to a chroma block coded with the DM mode may be interpreted as having a default intra prediction mode.
  a. In one example, the corresponding luma block coded with palette mode may be treated as an intra block (e.g. MODE_INTRA) or a palette block (e.g. MODE_PLT) when a chroma block is coded with the DM mode.
  b. In one example, the default prediction mode may be DC/PLANAR/VER/HOR mode.
  c. In one example, the default prediction mode may be any one intra prediction mode.
  d. In one example, the default prediction mode may be signaled in the DPS/SPS/VPS/PPS/APS/picture header/slice header/tile group header/Largest coding unit (LCU)/Coding unit (CU)/LCU row/group of LCUs/TU/PU block/Video coding unit.
19. A palette-coded block may be treated as an unavailable block during the list construction of history-based motion vector prediction (HMVP), the merge (MERGE) and/or the advanced motion vector prediction (AMVP) modes.
  a. In one example, an unavailable block may denote a block which does not have any motion information or its motion information could not be used as a prediction for other blocks.
  b. In one example, a block coded with palette mode may be treated as an intra block (e.g. MODE_INTRA) or a palette block (e.g. MODE_PLT) in the process of list construction in HMVP, MERGE and/or AMVP modes.
    i. Alternatively, in one example, when fetching the motion information of neighboring blocks during the construction of the HMVP, MERGE and/or AMVP list, a neighboring block coded with palette mode may be treated as a block with an invalid reference index.
    ii. Alternatively, in one example, when fetching the motion information of neighboring blocks during the construction of the HMVP, MERGE and/or AMVP list, a neighboring block coded with palette mode may be treated as a inter block with a reference index equal to 0.
    iii. Alternatively, in one example, when fetching the motion information of neighboring blocks during the list construction of the HMVP, MERGE and/or AMVP modes, a neighboring block coded with palette mode may be treated as a inter block with a zero-motion vector.
20. How to treat a block coded with palette mode (e.g. whether to and/or how to apply above methods) may be based on:
  a. Video contents (e.g. screen contents or natural contents)
  b. A message signaled in the DPS/SPS/VPS/PPS/APS/picture header/slice header/tile group header/Largest coding unit (LCU)/Coding unit (CU)/LCU row/group of LCUs/TU/U block/Video coding unit
  c. Position of CU/PU/TU/block/Video coding unit
  d. Block dimension of current block and/or its neighboring blocks
  e. Block shape of current block and/or its neighboring blocks
  f. Indication of the color format (such as 4:2:0, 4:4:4, RGB or YUV)
  g. Coding tree structure (such as dual tree or single tree)
  h. Slice/tile group type and/or picture type i. Color component (e.g. may be only applied on luma component and/or chroma component)
j. Temporal layer ID
k. Profiles/Levels/Tiers of a standard 21. Context coded bins for palette coded blocks may be restricted to be within a certain range.
    a. In one example, a counter is assigned to a block to record how many bins have been context coded. When the counter exceeds a threshold, bypass coding is applied instead of using context coding.
        i. Alternatively, NumColorComp counters may be assigned to record how many bins have been context coded for each color component. NumColorComp is the number of color components to be coded in one block (e.g., for one CU in YUV format, NumColorComp is set to 3).
        ii. Alternatively, a counter may be initialized to be zero, and after coding one bin with context, the counter is increased by one.
    b. Alternatively, a counter may be initialized with some value greater than zero (e.g., W*H*K) and after coding one bin with context, the counter is decreased by one. When the counter is smaller than or equal to T, bypass coding is applied instead of using context coding.
        i. In one example, T is set to 0 or 1.
        ii. In one example, T is set according to decoded information or number of coding passes, etc. al.
    c. In one example, the palette coded blocks may have a same or different threshold compared with TS coded blocks or non-TS coded blocks in terms of context coded bins.
        i. In one example, number of context coded bins for a palette coded block may be set to (W*H*T) wherein W and H are the width and height of one block, respectively and T is an integer. In one example, T is set to be the same as that used for TS coded blocks, such as 1.75 or 2.
        ii. In one example, number of context coded bins for a palette coded block may be set to (W*H*NumColorComp*T) wherein W and H are the width and height of one block, respectively; NumColorComp is the number of color components to be coded in one block (e.g., for one CU in YUV format, NumColorComp is set to 3). and T is an integer. In one example, T is set to be the same as that used for TS coded blocks, such as 1.75 or 2.
    d. In one example, the threshold of palette-coded blocks may be smaller than TS coded blocks or non-TS coded blocks in terms of context coded bins.
    e. In one example, the threshold of palette-coded blocks may be larger than TS coded blocks or non-TS coded blocks in terms of context coded bins.

22. A palette-coded block may be treated as a non-intra block (e.g. treated as a block with prediction mode equal to MODE_PLT) during the process of counting neighboring intra blocks in CIIP mode.
    a. In one example, when fetching the intra modes of neighboring blocks during counting neighboring intra blocks in CIIP mode, if a neighboring block (e.g., left and/or above) is coded with palette mode, it may be treated in the same way or a similar way as those coded with inter mode.
    b. In one example, when fetching the intra modes of neighboring blocks during counting neighboring intra blocks in CIP mode, if a neighboring block (e.g., left and/or above) is coded with palette mode, it may be treated in the same way or a similar way as those coded with IBC mode.
    c. Alternatively, a palette-coded block may be treated as an intra block during the process of counting neighboring intra blocks in CIIP mode.

23. It is proposed to skip the pre- and/or post-filtering processes for palette coded samples.
    a. In one example, the palette coded samples may be not deblocked.
    b. In one example, the palette coded samples may be not compensated an offset in the SAO process.
    c. In one example, the palette coded samples may be not filtered in the ALF process.
        i. In one example, the classification in the ALF process may skip palette coded samples.
    d. In one example, the LMCS may be disabled for palette coded samples.

Figure 22:
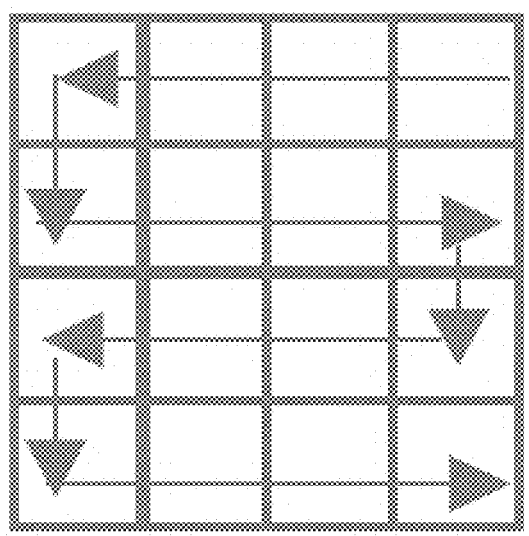
FIG. 22 shows an example of scanning order for a 4×4 block.
Figure 23:
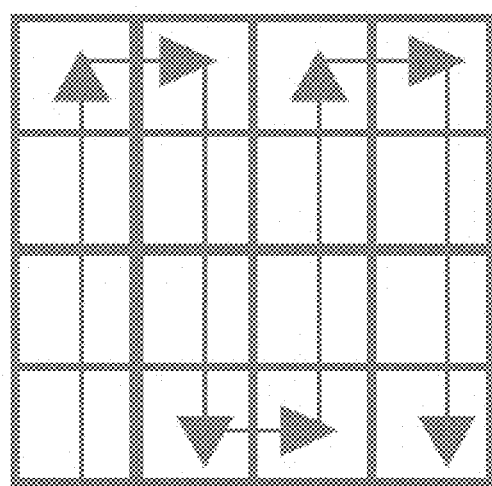
FIG. 23 shows another example of scanning order for a 4×4 block.

24. It is proposed to add more scanning orders in the palette mode.
    a. In one example, reverse horizontal transverse scanning order defined as follows may be used.
        i. In one example, the scanning direction for the odd rows may be from left to right.
        ii. In one example, the scanning direction for the even rows may be from right to left.
        iii. In one example, the scanning order for a 4×4 block may be as shown in FIG. 22.
    b. In one example, reverse vertical transverse scanning order defined as follows may be used.
        i. In one example, the scanning direction for the odd rows may be from top to bottom.
        ii. In one example, the scanning direction for the even rows may be from bottom to top.
        iii. In one example, the scanning order for a 4×4 block may be as shown in FIG. 23.

25. The combination of allowed scanning orders may depend on block shape.
    a. In one example, when the ratio between width and height of a block is larger than a threshold, only horizontal traverse and reverse horizontal traverse scanning orders may be applied.
        i. In one example, the threshold is equal to 1.
        ii. In one example, the threshold is equal to 4.
    b. In one example, when the ratio between height and width of a block is larger than a threshold, only vertical traverse and reverse vertical traverse scanning orders may be applied.
        i. In one example, the threshold is equal to 1.
        ii. In one example, the threshold is equal to 4.

26. It is proposed to only allow one intra prediction direction and/or one scanning direction in the QR-BDPCM process.
    a. In one example, only vertical direction is allowed on a block with width larger than height.
    b. In one example, only horizontal direction is allowed on a block with width smaller than height.

c. In one example, the indication of direction of QR-BDPCM may be inferred for a non-square block.
  i. In one example, furthermore, the indication of direction of QR-BDPCM may be inferred to vertical direction for a block with width larger than height.
  ii. In one example, furthermore, the indication of direction of QR-BDPCM may be inferred to horizontal direction for a block with width smaller than height.
27. The methods in bullet 24,25 and 26 may be only applied on a block with w*Th>=h or h*Th>=w, where the w and h are the block width and height respectively, and Th is a threshold.
  a. In one example, Th is an integer number (e.g. 4 or 8) and may be based on
    i. Video contents (e.g. screen contents or natural contents)
    ii. A message signaled in the DPS/SPS/VPS/PPS/APS/picture header/slice header/tile group header/Largest coding unit (LCU)/Coding unit (CU)/LCU row/group of LCUs/TU/PU block/Video coding unit
    iii. Position of CU/PU/TU/block/Video coding unit
    iv. Block dimension of current block and/or its neighboring blocks
    v. Block shape of current block and/or its neighboring blocks
    vi. Indication of the color format (such as 4:2:0, 4:4:4, RGB or YUV)
    vii. Coding tree structure (such as dual tree or single tree)
    viii. Slice/tile group type and/or picture type
    ix. Color component (e.g. may be only applied on luma component and/or chroma component)
    x. Temporal layer ID
    xi. Profiles/Levels/Tiers of a standard 5. Additional Embodiments In the following embodiments, the newly added texts are in {{ }} and the deleted texts are marked by "[[ ]]".

5.1 Embodiment 1

This section shows an example embodiment in which the bitstream representation of video may be changed as compared to the baseline bitstream syntax.

|  | Descriptor |
|---|---|
| seq_parameter_set_rbsp( ) { | |
|   sps_max_sub_layers_minus1 | u(3) |
|   ... | |
|   sps_gbi_enabled_flag | u(1) |
|   sps_ibc_enabled_flag | u(1) |
|   {{sps_plt_enabled_flag | u(1)}} |
|   ... | |
| } | |

{{sps_plt_enabled_flag equal to 1 specifies that palette mode may be used in decoding of pictures in the CVS. sps_plt_enabled_flag equal to 0 specifies that palette mode is not used in the CVS. When sps_plt_enabled_flag is not present, it is inferred to be equal to 0. }}

|  | Descriptor |
|---|---|
| coding_unit( x0, y0, cbWidth, cb Height, tree Type ) { | |
|   if( tile_group_type != I \| \| sps_ibc_enabled_flag\|\| {{sps_plt_enabled_flag}} { | |
|     if( treeType!=DUAL_TREE_CHROMA) | |
|       cu_skip_flag[ x0 ][ y0 ] | ae(v) |
|     if( cu_skip_flag[ x0 ][ y0 ] == 0 && tile_group_type != I ) | |
|       pred_mode_flag | ae(v) |
|     if( ( ( tile_group_type == I && cu_skip_flag[ x0 ][ y0 ] ==0 ) \|\| | |
|       ( tile_group_type != I && CupredMode[ x0 ][ y0 ] != MODE_INTRA ) ) && | |
|       (sps_ibc_enabled_flag \|\| {{sps_plt_enabled_flag}} | |
|     {{pred_mode_scc_flag | ae(v) |
|     if(scc_mode_flag){ | |
|       if(sps_ibc_enabled_flag) { | ae(v) |
|         pred_mode_ibc_flag | |
|       } | |
|       if(sps_plt_enabled_flag) { | |
|         pred_mode_plt_flag | ae(v) |
|       } | |
|     }}} | |
|   } | |
| ... | |
| } | |

{{pred_mode_sec_flag equal to 1 specifies that the current coding unit is coded by a screen content coding mode. pred_mode_sec_flag equal to 0 specifies that the current coding unit is not coded by a screen content coding mode When pred_mode_sec_flag is not present, it is inferred to be equal to 0. pred_mode_plt_flag equal to 1 specifies that the current coding unit is coded in the palette mode. pred_mode_plt_flag equal to 0 specifies that the current coding unit is not coded in the palette mode.

When pred_mode_plt_flag is not present, it is inferred to be equal to the value of sps_plt_enabled_flag when decoding an I tile group, and 0 when decoding a P or B tile group, respectively.

When pred_mode_sec_flag is equal to 1 and sps_ibc_enabled_flag is equal to 0, the pred_mode_plt_flag is inferred to be equal to 1.
When pred_mode_ibc_flag is equal to 1, the variable CuPredMode[x][y] is set to be equal to MODE_PLT for x=x0 . . . x0+cbWidth−1 and y=y0 . . . y0+cbHeight−1.}}

| | Descriptor |
|---|---|
| coding_unit( x0, y0, cbWidth, cbHeight, treeType ) { | |
|   if( tile_group_type != I \|\| sps_ibc_enabled_flag \|\| {{sps_plt_enabled_flag}}) { | |
|     if( treeType != DUAL_TREE_CHROMA ) | |
|       cu_skip_flag[ x0 ] [ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \|\| | |
|       ( tile_group_type != I && CuPredMode[ x0 ][ y0 ] != MODE_INTRA ) ) && | |
|       (sps_ibc_enabled_flag) | |
|       pred_mode_ibc_flag | ae(v) |
| {{if( ( ( tile_group_type = = I && cu_skip_flag[ x0 ][ y0 ] = =0 ) \|\| | |
|       ( tile_group_type != I && CuPredMode[ x0 ][ \|y0 ] = MODE_INTRA ) ) && | |
|       sps_plt_enabled_flag && | |
|       CuPredMode[ x0 ] [ y0 ] != MODE_IBC | |
|       pred_mode_plt flag | ae(v)}} |
|     } | |
|     ... | |
| } | |

| | Descriptor |
|---|---|
| coding_unit( x0, y0, cbWidth, cbHeight, treeType ) { | |
|   if( tile_group_type != I \| \| sps_ibc_enabled_flag \|\| {{sps_plt_enabled_flag}} ) { | |
|     if( treeType != DUAL_TREE_CHROMA ) | |
|       cu_skip_flag[ x0 ] [ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \|\| | |
|       ( tile_group_type != I && CuPredMode[ x0 ][ y0 ] != MODE_INTRA ) ) && | |
|       (sps_ibc_enabled_flag) | |
|       pred_mode_ibc_flag | ae(v) |
| {{if( CuPredMode[ x0 ] [ y0 ] == MODE_INTRA ) ) && | |
|       sps_plt_enabled_flag ) | |
|       pred_mode_plt flag | ae(v)}} |
|     } | |
|     ... | |
| } | |

45

{{pred_mode_plt_flag equal to 1 specifies that the current coding unit is coded in palette mode pred_mode_plt_flag equal to 0 specifies that the current coding unit is not coded in the palette mode.
When pred_mode_plt_flag is not present it is inferred to be equal to the value of sps_plt_enabled_flag when decoding an I tile group, and 0 when decoding a P or B tile group, respectively.
When pred_mode_ibc_flag is equal to 1, the variable CuPredMode[x][y] is set to be equal to MODE_PLT for x=x0 . . . x0+cbWidth−1 and y=y0 . . . y0+cbHeight−1.}}

| | Descriptor |
|---|---|
| coding_unit( x0, y0, cbWidth, cbHeight, treeType ) { | |
|   if( tile_group_type != I \| \| sps_ibc_enabled_flag \|\| {{sps_plt_enabled_flag}} ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     {{if( ( ( tile_group_type = = I && cu_skip_flag[ x0 ][ y0 ] = =0 ) \|\| | |
|       ( tile_group_type != I && CuPredMode[ x0 ][ y0 ] == MODE_INTRA ) ) && | |
|       (sps_ibc_enabled_flag)}} | |
|       pred_mode_ibc_flag | |

-continued

| | Descriptor |
|---|---|
| {{if( ( ( tile_group_type = = I && cu_skip_flag[ x0 ][ y0 ] = =0 ) \|\|<br>    ( tile_group_type != I && CuPredMode[ x0 ][ y0 ] = MODE_INTRA &&<br>(sps_ibc_enabled_flag? CuPredMode[ x0 ] [ y0 ] != MODE_IBC : TRUE) ) ) &&<br>    sps_plt_enable_flag<br>)<br>      pred_mode_plt flag<br>  }<br>  ...<br>} | ae(v)<br><br><br><br><br><br>ae(v)}} |

{{pred_mode_plt_flag flag equal to 1 specifies that the current coding unit is coded in the palette mode. pred_mode_plt_flag equal to 0 specifies that the current coding unit is not coded in the palette mode.
When pred_mode_plt_flag is not present, it is inferred to be equal to the value of sps_plt_enabled_flag when decoding an I tile group, and 0 when decoding a P or B tile group, respectively.
When pred_mode_ibc_flag is equal to 1, the variable CuPredMode[x][y] is set to be equal to MODE_PLT for x=x0 . . . x0+cbWidth−1 and y=y0 . . . y0+cbHeight−1. }}

| | Descriptor |
|---|---|
| coding_unit( x0, y0, cbWidth, cbHeight, treeType ) {<br>  if( tile_group_type != I \|\| sps_ibc_enabled_flag \|\| {{sps_plt_enabled_flag}} ) {<br>    if( treeType != DUAL_TREE_CHROMA )<br>      cu_skip_flag[ x0 ][ y0 ]<br>    {{if( cu_skip_flag[ x0 ][ y0 ] = = 0 )<br>      pred_modes(x0, y0, cbWidth, cbHeight)}}<br>    ...<br>} | <br><br><br>ae(v)<br> |

| | Descriptor |
|---|---|
| {{pred_modes ( x0, y0, cbWidth cbHeight) {<br>    if(tile_group_type == I ) {<br>      if(sps_ibc_enabled_flag)<br>        pred_mode_ibc_flag<br>      if(CuPredMode[ x0 ][ y0 ] != MODE_IBC){<br>        if(sps_plt_enabled_flag && cbWidth <=64 && cbHeight <= 64)<br>          plt_mode_flag<br>      }<br>    else{<br>      pred_mode_flag<br>      if(CuPredMode[ x0 ][ y0 ] == MODE INTRA \|\| (CuPredMode[ x0 ][ y0 ] != MODE_INTRA && ! sps_ibc_enabled_flag)){<br>        if(sps_plt_enabled_flag && cbWidth <=64 && cbHeight <= 64)<br>          plt_mode_flag<br>      }<br>      else{<br>        if(sps_ibc_enabled_flag)<br>          pred_mode_ibc_flag<br>      }<br>    }<br>}}} | <br><br><br>ae(v)<br><br><br>ae(v)<br><br><br>ae(v)<br><br><br><br>ae(v)<br><br><br><br>ae(v)<br> |

| | Descriptor |
|---|---|
| {{pred_modes ( x0, y0, cbWidth cbHeight) {<br>    if(tile_group_type == I) {<br>      if(sps_ibc_enabled_flag \|\| sps_plt_enabled_flag)<br>        pred_mode_ibc_flag<br>      if(CuPredMode[ x0 ][ y0 ] != MODE_INTRA){<br>        if(sps_plt_enabled_flag && cbWidth <=64 && cbHeight <= 64)<br>          plt_mode_flag<br>      } | <br><br><br>ae(v)<br><br><br>ae(v)<br> |

|  | Descriptor |
|---|---|
| ```
        else{
            pred_mode_flag
            if(CuPredMode[ x0 ][ y0 ] == MODE_INTRA || (CuPredMode[ x0 ][ y0 ] !=
MODE_INTRA && ! sps_ibc_enabled_flag)){
                if(sps_plt_enabled_flag && cbWidth <=64 && cbHeight <= 64)
                    plt_mode_flag
            }
            else{
                if(sps_ibc_enabled_flag)
                    pred_mode_ibc_flag
            }
        }
    }
}}}
``` | ae(v)<br><br><br>ae(v)<br><br><br>ae(v) |

|  | Descriptor |
|---|---|
| ```
{(pred_modes ( x0, y0, cbWidth cbHeight) {
    if(tile_group_type == I) {
        if(sps_ibc_enabled_flag || sps_plt_enabled_flag)
            pred_mode_flag
        if(CuPredMode[ x0 ][ y0 ] = MODE_INTRA){
            if(sps_plt_enabled_flag && cbWidth <=64 && cbHeight <= 64)
                plt_mode_flag
        }
        else{
            pred_mode_flag
            if(CuPredMode[ x0 ][ y0 ] == MODE_INTRA || (CuPredMode[ x0 ][ y0 ] !=
MODE_INTRA && ! sps_ibc_enabled_flag)){
                if(sps_plt_enabled_flag && cbWidth <=64 && cbHeight <= 64)
                    plt_mode_flag
            }
            else{
                if(sps_ibc_enabled_flag)
                    pred_mode_ibc_flag
            }
        }
    }
}
``` | <br><br>ae(v)<br><br><br>ae(v)<br><br>ae(v)<br><br><br><br>ae(v)<br><br><br>ae(v) |

|  | Descriptor |
|---|---|
| ```
pred_modes ( x0, y0, cbWidth cbHeight) {
    if(tile_group_type == I) {
        if(sps_ibc_enabled_flag || sps_plt_enabled_flag)
            pred_mode_flag
        if(CuPredMode[ x0 ][ y0 ] = MODE_INTRA){
            if(sps_plt_enabled_flag)
                plt_mode_flag
        }
        else{
            pred_mode_flag
            if(CuPredMode[ x0 ][ y0 ] == MODE_INTRA || (CuPredMode[ x0 ][ y0 ] !=
MODE_INTRA && ! sps_ibc_enabled_flag)){
                if(sps_plt_enabled_flag)
                    plt_mode_flag
            }
            else{
                if(sps_ibc_enabled_flag)
                    pred_mode_ibc_flag
            }
        }
    }
}}}
``` | <br><br>ae(v)<br><br><br>ae(v)<br><br>ae(v)<br><br><br><br>ae(v)<br><br><br>ae(v) |

{{plt_mode_flag equal to 1 specifies that the current coding unit is coded in palette mode. intra_mode_plt_flag flag equal to 0 specifies that the current coding unit is coded in the palette mode.

When plt_mode_flag is not present, it is inferred to be equal to false.

When pred_mode_sec_flag is equal to 1, the variable CuPredMode[x][y] is set to be equal to MODE_PLT for x=x0 . . . x0+cbWidth−1 and y=y0 . . . y0+cbHeight−1 pred_mode_flag equal to 0 specifies that the current coding unit is coded in inter prediction mode or IBC prediction mode. pred_mode_flag equal to 1 specifies that the current coding unit is coded in intra prediction mode or PLT mode. The variable CuPredMode[x][y] is derived as follows for x=x0 . . . x0+cbWidth−1 and y=y0 . . . y0+cbHeight−1:

If pred_mode_flag is equal to 0, CuPredMode[x][y] is set equal to MODE_INTER.

Otherwise (pred_mode_flag is equal to 1), CuPredMode [x][y] is set equal to MODE_INTRA.

When pred_mode_flag is not present. it is inferred to be equal to 1 when decoding an I tile group, and equal to 0 when decoding a P or B tile group, respectively.}}

{{Table 9-4 Syntax elements and associated binarization.

| Syntax structure | Syntax element | Binarization process | Input parameter |
|---|---|---|---|
| pred_modes( ) | PLT mode flag | FL | cMax = 1 |

TABLE 9-10

Assignment of ctxInc to syntax elements with context coded bins

| | binIdx | | | | | |
|---|---|---|---|---|---|---|
| Syntax element | 0 | 1 | 2 | 3 | 4 | >= 5 |
| PLT_mode_flag | 0 | na | na | na | na | Na}} |

5.2 Embodiment #2

This embodiment describes the modeType.

A variable modeType specifying whether Intra, IBC, {{Palette}} and Inter coding modes can be used (MODE_TYPE_ALL), or whether only Intra, {{(Palette}} and IBC coding modes can be used (MODE_TYPE_INTRA), or whether only Inter coding modes can be used (MODE_TYPE_INTER) for coding units inside the coding tree node.

5.3 Embodiment #3

This embodiment describes the coding unit syntax. In this embodiment, the pred_mode_plt_flag is signaled after the pred_mode_ibc_flag.

| 7.3.7.5 Coding unit syntax | |
|---|---|
| | Descriptor |
| coding_unit( x0, y0, cbWidth, cbHeight, treeType, {{modeType}} ) { | |
|   if( slice_type != I \|\| sps_ibc_enabled_flag \|\| {{sps_plt_enabled_flag}} ) { | |
|     if(  treeType  !=  DUAL_TREE_CHROMA  && | |
|     !( [[cbWidth = = 4 && cbHeight = = 4 && !sps_ibc_enabled_flag) ]] | |
|     {{( ( cbWidth = = 4 && cbHeight = = 4 ) \|\| modeType = = MODE_TYPE_INTRA ) | |
|       && !sps_ibc_enabled_flag))}} | |
|     cu_skip_flag[ x0 ][ y0 ] | ae(v) |
|     if(  cu_skip_flag[ x0 ][ y0 ]  = =  0  &&  slice_type  !=  I | |
|     && !( cbWidth = = 4 && cbHeight = = 4) {{&& modeType = = MODE_TYPE_ALL)}} | |
|     pred_mode_flag | ae(v) |
|     [[if(  (  (  slice type  = =  I  &&  cu_skip_flag[ x0 ][ y0 ] = =0  ) \|\| | |
|     (  slice_type  != I  &&  (  CuPredMode[ x0 ][ y0 ]  !=  MODE_INTRA  \|\| | |
|     ( cbWidth = = 4 && cbHeight = = 4 && cu_skip_flag[ x0 ][ y0 ] = = 0 ) ) ) ) && | |
|     sps_ibc_enabled_flag && ( cbWidth != 128 \|\| cbHeight != 128) )[[==]] | |
|     {{if(  (  (  slice type  = =  I  &&  cu_skip_flag[ x0 ][y0 ]  = =0  ) \|\| | |
|     (  slice_type  !=  I  &&  (  CuPredMode[ x0 ][ y0 ]  != MODE_INTRA  \|\| | |
|     ( cbWidth = = 4 && cbHeight = = 4 && cu_skip_flag[ x0 ][ y0 ] = = 0 ) ) ) ) && | |
|     cbWidth <= 64 && cbHeight <= 64 ) &&   modeType != MODE_TYPE_INTER ) { | |
|     if( sps_ibc_enabled_flag && treeType != DUAL_TREE_CHROMA ) | |
|       pred_mode_ibc_flag | ae(v) |
|     } | |
|     if( CuPredMode[ x0 ][ y0 ] = = MODE_INTRA \|\| (slice_type != I && !(cbWidth = = 4 | |
|     && cbHeight = = 4 ) && !sps_ibc_enabled_flag && CuPredMode[ x0 ][ y0 ] != | |
|     MODE_INTRA )) && cbWidth <= 64 && cbHeight <= 64 && sps_plt_enabled_flag | |
|     && cu_skip_flag[ x0 ][ y0 ] = = 0 && modeType != MODE_INTER) | |
|       pred_mode_plt_flag | ae(v)}} |
|   } | |
|   ... | |
| } | |

5.4 Embodiment #4

This embodiment describes the coding unit syntax. In this embodiment, the pred_mode_plt_flag is signaled after the pred_mode_ibc_flag and the pred_mode_plt_flag is signaled only when the current prediction mode is MODE_INTRA.

| 7.3.7.5 Coding unit syntax | |
|---|---|
| | Descriptor |
| coding_unit( x0, y0, cbWidth, cbHeight, treeType, {{modeType}}) { | |
|   if( slice_type != I \|\| sps_ibc_enabled flag \|\| {{sps_plt_enabled_flag}} ) { | |
|     if( treeType != DUAL_TREE_CHROMA && | |
|     !( [[cbWidth = = 4 && cbHeight = = 4 && !sps_ibc_enabled_flag ) ]] | |
|       {{ ( ( cbWidth = = 4 && cbHeight = = 4 ) \|\| modeType = = MODE_TYPE_INTRA ) | |
|       && !sps_ibc_enabled_flag))}} | |
|     cu_skip_flag[ x0 ][ y0 ] | ae(v) |
|     if( cu_skip_flag[ x0 ][ y0 ] = = 0 && slice_type != I | |
|     && !(cbWidth = = 4 && cbHeight = = 4) {{&& modeType = = MODE_TYPE_ALL)}} | |
|     pred_mode_flag | ae(v) |
|     [[if( ( ( slice_type = = I && cu_skip_flag[ x0 ][ y0 ] = =0 ) \|\| | |
|     ( slice_type != I && ( CuPredMode[ x0 ][ y0 ] != MODE_INTRA \|\| | |
|     ( cbWidth = = 4 && cbHeight = = 4 && cu_skip_flag[ x0 ][ y0 ] = = 0 ) ) ) ) && | |
|     sps_ibc_enabled_flag && ( cbWidth != 128 \|\| cbHeight != 128 ) ) ]] | |
|     {{if( ( ( slice_type = = I && cu_skip_flag[ x0 ][y0 ] = =0 ) \|\| | |
|     ( slice_type != I && ( CuPredMode[ x0 ][ y0 ] != MODE_INTRA \|\| | |
|     ( cbWidth = = 4 && cbHeight = = 4 && cu_skip_flag[ x0 ][ y0 ] = = 0 ) ) ) ) && | |
|     cbWidth <= 64 && cbHeight <= 64 ) && modeType != MODE_TYPE_INTER ) | |
| { }} | |
|     {{if( sps_ibc_enabled_flag && treeType = DUAL_TREE_CHROMA )}} | |
|     pred_mode_ibc_flag | ae(v) |
| {{ } | |
|   if(cu_skip_flag[ x0 ][ y0 ] = = 0 && CuPredMode[ x0 ][ y0] == MODE_INTRA && | |
|   cbWidth <= 64 && cbHeight <= 64 && sps_plt_enabled_flag && modeType != | |
|   MODE_TYPE_INTER ) | |
|     pred_mode_plt_flag | ae(v)}} |
|   } | |
|   ... | |
| } | |

5.5 Embodiment #5

This embodiment describes the coding unit syntax. In this embodiment, the pred_mode_ibc_flag is signaled after the pred_mode_plt_flag.

| 7.3.7.5 Coding unit syntax | |
|---|---|
| | Descriptor |
| coding_unit( x0, y0, cbWidth, cb Height, treeType, modeType) { | |
|   if( slice_type != I \|\| sps_ibc_enabled_flag \|\| {{sps_plt_enabled_flag}}) { | |
|     if( treeType != DUAL_TREE_CHROMA && | |
|     !( [[cbWidth = = 4 && cbHeight = = 4 && !sps_ibc_enabled_flag ) ]] | |
|     {( ( cbWidth = = 4 && cbHeight = = 4 ) \|\| modeType = = MODE_TYPE_INTRA ) | |
|     && !sps_ibc_enabled_flag ))}} | |
|     cu_skip_flag[ x0 ][ y0 ] | ae(v) |
|     if( cu_skip_flag[ x0 ][ y0 ] = = 0 && slice_type != I | |
|     &&!( cbWidth = = 4 && cbHeight = = 4 ) {{&& modeType == MODE_TYPE_ALL)}} | |
|     pred_mode_flag | ae(v) |
|     [[if( ( ( slice_type = = I && cu_skip_flag[ x0 ][ y0 ] = =0 ) \|\| | |
|     ( slice_type !=I && ( CuPredMode[ x0 ][ y0 ] != MODE_INTRA \|\| | |
|     ( cbWidth = = 4 && cbHeight = = 4 && cu_skip_flag[ x0 ][ y0 ] = = 0 ) ) ) ) && | |
|     sps_ibc_enabled_flag && ( cbWidth != 128 \|\| cbHeight != 128 ) ) ]] | |
|       {{ if( CuPredMode[ x0 ][ y0 ] == MODE_INTRA \|\| (slice_type !=I && !(cbWidth = = 4 | |
|     && cb Height = = 4 ) && !sps_ibc_enabled_flag && CuPredMode[ x0 ][ y0 ] != | |
|     MODE_INTRA)) && cbWidth <=64 && cbHeight <=64 && sps_plt_enabled_flag | |
|     && cu_skip_flag[ x0 ][ y0 ] = = 0 && modeType != MODE_INTER) | |
|       pred_mode_plt_flag | ae(v) |

| 7.3.7.5 Coding unit syntax | |
|---|---|
| | Descriptor |
|     if( ( ( slice_type  = =  I  &&  cu_skip_flag[ x0 ][ y0 ] = =0 )  \|\| <br>      ( slice_type != I && ( CuPredmode[ x0 ][ y0 ] != MODE_INTRA \|\| <br>    (cbWidth = = 4 && cbHeight = = 4 && cu_skip_flag[ x0 ][ y0 ] = = 0 ) ) ) ) && <br>    cbWidth <= 64 && cbHeight <= 64 ) &&  modeType !=MODE_TYPE_INTER ) { <br>    if( sps_ibc_enabled_flag && treeType != DUAL_TREE_CHROMA )}} <br>      pred_mode_ibc_flag <br>  {{ }}} <br>  } <br> } <br>... <br>} | <br><br><br><br><br>ae(v) |

5.6 Embodiment #6

This embodiment describes the coding unit syntax. In this embodiment, the pred_mode_ibc_flag is signaled after the pred_mode_plt_flag and the pred_mode_plt_flag is signaled only when the current prediction mode is MODE_INTRA.

| 7.3.7.5 Coding unit syntax | |
|---|---|
| | Descriptor |
| coding_unit( x0, y0, cbWidth, cbHeight, treeType, {{modeType}}) { <br>  if( slice_type != I \|\| sps_ibc_enabled_flag \|\| {{sps_plt_enabled_flag}}) { <br>    if( treeType != DUAL_TREE_CHROMA && <br>    !( [[cbWidth = = 4 && cbHeight = = 4 && !sps_ibc_enabled_flag) ]] <br>    {{( ( cbWidth = = 4 && cbHeight = = 4 ) \|\| modeType = = MODE_TYPE_INTRA ) <br>    && !sps_ibc_enabled_flag))}} <br>    cu_skip_flag[ x0 ][ y0 ] <br>    if( cu_skip_flag[ x0 ][ y0 ]  = =  0  &&  slice_type != I <br>    && !(cbWidth = = 4 && cbHeight = = 4) {{&& modeType = = MODE_TYPE_ALL}} <br>    pred_mode_flag <br>    {{ if cu_skip_flag[ x0 ][ y0 ] = = 0 && (CuPredMode[ x0 ][ y0 ] == MODE_INTRA && <br>    cbWidth <= 64 && cbHeight <= 64 && sps_plt_enabled_flag && modeType != <br>    MODE_TYPE_INTER ) <br>    pred_mode_plt_flag <br> } <br>[[ if( ( ( slice_type == I && cu_skip_flag[ x0 ][ y0 ] = =0 ) \|\| <br>    ( slice_type != I && ( CuPredMode[ x0 ][ y0 ] != MODE_INTRA \|\| <br>    ( cbWidth = = 4 && cbHeight = = 4 && cu_skip_flag[ x0 ][ y0 ] = = 0 ) ) ) ) && <br>    sps_ibc_enabled_flag && ( cbWidth != 128 \|\| cbHeight != 128 ) )]] <br>  {{if( ( ( slice_type  = =  I  &&  cu_skip_flag[ x0 ][ y0 ]  = =0  )  \|\| <br>    ( slice_type != I && ( CuPredMode[ x0 ][ y0 ] != MODE_INTRA \|\| <br>    ( cbWidth = = 4 && cbHeight = = 4 && cu_skip_flag[ x0 ][ y0 ] = = 0 ) ) ) ) && <br>    cbWidth <= 64 && cbHeight <= 64 ) &&  modeType != MODE_TYPE_INTER ) { <br>    if( sps_ibc_enabled_flag && treeType != DUAL_TREE_CHROMA )}} <br>    pred_mode_ibc_flag <br>  {{ }}} <br> } <br>... <br>} | <br><br><br><br><br><br><br>ae(v) <br><br><br>ae(v) <br><br><br><br>ae(v)}} <br><br><br><br><br><br><br><br><br><br>ae(v) |

5.7 Embodiment #7

This embodiment describes the coding unit syntax. In this embodiment, the pred_mode_plt_flag and pred_mode_ibc_flag are signaled when the prediction mode is MODE_INTRA.

| 7.3.7.5 Coding unit syntax | |
|---|---|
| | Descriptor |
| coding_unit( x0, y0, cbWidth, cbHeight, treeType, {{modeType}} ) { | |
|   if( slice_type != I \| \| sps_ibc_enabled flag \| \| {{sps_plt_enabled_flag}} ) { | |
|     if(   treeType   !=   DUAL_TREE_CHROMA   && | |
|     !( [[cbWidth = = 4 && cbHeight = = 4 && !sps_ibc_enabled_flag ) ]] | |
|     {{ ( ( cbWidth = = 4 && cbHeight = = 4 ) \| \| modeType = = MODE_TYPE_INTRA ) | |
|     && !sps_ibc_enabled_flag ))}} | |
|     cu_skip_flag[ x0 ][ y0 ] | ae(v) |
|     if(   cu_skip_flag[ x0 ][ y0 ]   = =   0   &&   slice_type   !=   I | |
|     && !(cbWidth = = 4 && cbHeight = = 4 ) {{&& modeType = = MODE_TYPE_ALL)}} | |
|     pred_mode_flag | ae(v) |
| [[   if(   (   (   slice_type   = =  I   &&   cu_skip_flag[ x0 ][ y0 ] = =0   )   \| \| | |
|     (   slice_type   !=   I   &&   (   CuPredMode[ x0 ][ y0 ]   !=   MODE_INTRA   \| \| | |
|     ( cbWidth = = 4 && cbHeight = = 4 && cu_skip_flag[ x0 ][ y0 ] = = 0 ) ) ) ) && | |
|     sps_ibc_enabled_flag && ( cbWidth != 128 \| \| cbHeight != 128 ) )]] | |
|     {{if(   (   (   slice_type   = =   I   &&   cu_skip_flag[ x0 ][ y0 ]   = =0   )   \| \| | |
|     (   slice_type   !=   I   &&   ( CuPredMode[ x0 ][ y0 ]   = = MODE_INTRA   \| \| | |
|     ( cbWidth = = 4 && cbHeight = = 4 && cu_skip_flag[ x0 ][ y0 ] = = 0 ) ) ) ) && | |
|     cbWidth <= 64 && cbHeight <= 64 ) &&   modeType != MODE_TYPE_INTER ) { | |
|     if( sps_ibc_enabled_flag && treeType != DUAL_TREE_CHROMA )}} | |
|     pred_mode_ibc_flag | ae(v) |
| {{ } | |
| if( CuPredMode[ x0 ][ y0 ] == MODE_INTRA && cbWidth <= 64 && cbHeight <= 64 | |
| && sps_plt_enabled_flag && cu_skip_flag[ x0 ][ y0 ] = =0 && modeType != | |
| MODE_INTER) | |
|     pred_mode_plt_flag | ae(v)}} |
|   } | |
| ... | |
| } | |

5.8 Embodiment #8

This embodiment describes the coding unit syntax. In this embodiment, the pred_mode_plt_flag and pred_mode_ibc_flag are signaled when the prediction mode is not MODE_INTRA.

| 7.3.7.5 Coding unit syntax | |
|---|---|
| | Descriptor |
| coding_unit( x0, y0, cbWidth, cbHeight, treeType, {{modeType}} ) { | |
|   if( slice_type   !=   I   \| \| sps_ibc_enabled flag \| \| {{sps_plt_enabled_flag}} ) { | |
|     if(   treeType   !=   DUAL_TREE_CHROMA   && | |
|     !( [[cbWidth = = 4 && cbHeight = = 4 && !sps_ibc_enabled_flag ) ]] | |
|     {{ ( ( cbWidth = = 4 && cbHeight = = 4 ) \| \| modeType = = MODE_TYPE_INTRA ) | |
|     && !sps_ibc_enabled_flag ))}} | |
|     cu_skip_flag[ x0 ][ y0 ] | ae(v) |
|     if(   cu_skip_flag[ x0 ][ y0 ]   = =   0   &&   slice_type   !=   I | |
|     && !(cbWidth = = 4 && cbHeight = = 4 ) {{&& modeType = = MODE_TYPE_ALL)}} | |
|     pred_mode_flag | ae(v) |
| [[   if(   (   (   slice_type   = =  I   &&   cu_skip_flag[ x0 ][ y0 ] = =0   )   \| \| | |
|     (   slice_type   !=   I   &&   (   CuPredMode[ x0 ][ y0 ]   !=   MODE_INTRA   \| \| | |
|     ( cbWidth = = 4   &&   cbHeight = = 4 && cu_skip_flag[ x0 ][ y0 ] = = 0 ) ) ) ) && | |
|     sps_ibc_enabled_flag && ( cbWidth != 128 \| \| cbHeight != 128 ) )]] | |
|     {{if(   (   (   slice_type   = =   I   &&   cu_skip_flag[ x0 ][ y0 ]   = =0   )   \| \| | |
|     (   slice_type   !=   I   &&   (   CuPredMode[ x0 ][ y0 ]   !=   MODE_INTRA   \| \| | |
|     ( cbWidth = = 4 && cbHeight = = 4 && cu_skip_flag[ x0 ][ y0 ] = = 0 ) ) ) ) && | |
|     cbWidth <= 64 && cbHeight <= 64 ) &&   modeType != MODE_TYPE_INTER ) { | |
|     if( sps_ibc_enabled_flag && treeType   !=   DUAL_TREE_CHROMA   )}} | |
|     pred_mode_ibc_flag | ae(v) |
|     } | |

-continued

| 7.3.7.5 Coding unit syntax | |
|---|---|
| | Descriptor |
| {{if( CuPredMode[ x0 ][ y0 ] != MODE_INTRA && cbWidth <= 64 && cbHeight <= 64<br>&& sps_plt_enabled_flag && cu_skip_flag[ x0 ][ y0 ] = = 0 && modeType !=<br>MODE_INTER)<br>    pred_mode_plt_flag | ae(v)}} |
| }<br>...<br>} | |

5.9 Embodiment #9

This embodiment describes the coding unit syntax. In this embodiment, the pred_mode_plt_flag and pred_mode_ibc_flag are signaled when the prediction mode is MODE_INTER.

flag==1 indicates that palette mode is applied in the current coding unit. pred_mode_plt_flag==0 indicates that palette mode is not applied for the current coding unit. When pred_mode_plt_flag is not present, it is inferred to be equal to 0.

| 7.3.7.5 Coding unit syntax | |
|---|---|
| | Descriptor |
| coding_unit( x0, y0, cbWidth, cbHeight, treeType, {{modeType}} ) {<br>  if( slice_type != I \| \| sps_ibc_enabled_flag \| \| {{sps_plt_enabled_flag}} ) {<br>    if(    treeType    !=    DUAL_TREE_CHROMA    &&<br>    !( [[cbWidth = = 4 && cbHeight = = 4 && !sps_ibc_enabled_flag ) ]]<br>    {{ ( ( cbWidth = = 4 && cbHeight = = 4 ) \| \| modeType = = MODE_TYPE_INTRA )<br>    && !sps_ibc_enabled_flag ))}}<br>    cu_skip_flag[ x0 ][ y0 ] | ae(v) |
|     if(  cu_skip_flag[ x0 ][ y0 ]    = =    0    &&    slice_type    !=    I<br>    && !( cbWidth  = =  4 &&    cbHeight  = = 4) {{&& modeType = =<br>MODE_TYPE_ALL)}}<br>    pred_mode_flag | ae(v) |
| [[ if(  (  (  slice_type  ==  I  &&  cu_skip_flag[ x0 ][ y0 ] = =0  ) \| \|<br>    (  slice_type  !=  I  &&  (  CuPredMode[ x0 ][ y0 ]  !=  MODE_INTRA \| \|<br>    ( cbWidth = = 4 && cbHeight = = 4 && cu_skip_flag[ x0 ][ y0 ] = = 0 ) ) ) &&<br>    sps_ibc_enabled_flag && ( cbWidth != 128 \| \| cbHeight != 128 ) )]]<br>    {{if(  (  (  slice_type  = =  I  &&  cu_skip_flag[ x0 ][ y0 ]  = =0  ) \| \|<br>    (  slice_type  !=  I  &&  ( CuPredMode[ x0 ][ y0 ]  == MODE_INTRA \| \|<br>    ( cbWidth = = 4 && cbHeight = = 4 && cu_skip_flag[ x0 ][ y0 ] = = 0 ) ) ) &&<br>    cbWidth <= 64 && cbHeight <= 64 ) &&    modeType != MODE_TYPE_INTER )<br>{<br>    if( sps_ibc_enabled_flag && treeType != DUAL_TREE_CHROMA )}}<br>    pred_mode_ibc_flag | ae(v) |
| {{ }<br>if( CuPredMode[ x0 ][ y0 ] == MODE_INTRA && cbWidth <= 64 && cbHeight <= 64<br>&& sps_plt_enabled_flag && cu_skip_flag[ x0 ][ y0 ] = = 0 && modeType !=<br>MODE_INTER)<br>    pred_mode_plt_flag | ae(v)}} |
| }<br>...<br>} | |

5.10 Embodiment #10

This embodiment describes the semantic of the pred_mode_plt_flag. pred_mode_plt_flag {{specifies the use of palette mode in the current coding unit. pred_mode_plt_flag==1 indicates that palette mode is applied in the current coding unit. pred_mode_plt_flag==0 indicates that palette mode is not applied for the current coding unit. When pred_mode_plt_flag is not present, it is inferred to be equal to 0.}}

5.11 Embodiment #11

This embodiment describes the semantic of the pred_mode_plt_flag. {{pred_mode_plt_flag specifics the use of palette mode in the current coding unit. pred_mode_plt_

When pred_mode_plt_flag is equal to 1, the variable CuPredMode[x][y] is set to be equal to MODE_PLT for x=x0 . . . x0+cbWidth−1 and y=y0 . . . y0+cbHeight−1.}}

5.12 Embodiment #12

This embodiment describes the boundary strength derivation.
8.8.3.5 Derivation Process of Boundary Filtering Strength
Inputs to this process are:
a picture sample array recPicture,
a location (xCb, yCb) specifying the top-left sample of the current coding block relative to the top-left sample of the current picture,
a variable nCbW specifying the width of the current coding block, a variable nCbH specifying the height of the current coding block,
a variable edgeType specifying whether a vertical (EDGE_VER) or a horizontal (EDGE_HOR) edge is filtered,
a variable cIdx specifying the colour component of the current coding block.
a two-dimensional (nCbW)×(nCbH) array edgeFlags.
Output of this process is a two-dimensional (nCbW)×(nCbH) array bS specifying the boundary filtering strength.
. . .
The variable $bS[xD_i][yD_j]$ is derived as follows:
If cIdx is equal to 0 and both samples $p_0$ and $q_0$ are in a coding block with intra_bdpcm_flag equal to 1. $bS[xD_i][yD_j]$ is set equal to 0.
Otherwise, if the sample $p_0$ or $q_0$ is in the coding block of a coding unit coded with intra prediction mode. $bS[xD_i][yD_j]$ is set equal to 2.
Otherwise, if the block edge is also a transform block edge and the sample $p_0$ or $q_0$ is in a coding block with clip_flag equal to 1, $bS[xD_i][yD_j]$ is set equal to 2.
Otherwise, if the block edge is also a transform block edge and the sample $p_0$ or $q_0$ is in a transform block which contains one or more non-zero transform coefficient levels, $bS[xD_i][yD_j]$ is set equal to 1.
{{Otherwise, if the block edge is also a transform block edge and the sample $p_0$ and $q_0$ are in two coding blocks with pred_mode_plt_flag equal to 1, $bS[xD_i][yD_j]$ is set equal to 0.}}
Otherwise, if the prediction mode of the coding subblock containing the sample $p_0$ is different from the prediction mode of the coding subblock containing the sample $q_0$, $bS[xD_i][yD_j]$ is set equal to 1.
Otherwise, if cIdx is equal to 0 and one or more of the following conditions are true, $bS[xD_i][yD_j]$ is set equal to 1:
The coding subblock containing the sample $p_0$ and the coding subblock containing the sample $q_0$ are both coded in IBC prediction mode, and the absolute difference between the horizontal or vertical component of the motion vectors used in the prediction of the two coding subblocks is greater than or equal to 4 in units of quarter luma samples.
For the prediction of the coding subblock containing the sample $p_0$ different reference pictures or a different number of motion vectors are used than for the prediction of the coding subblock containing the sample $q_0$.
NOTE 1—The determination of whether the reference pictures used for the two coding subblocks are the same or different is based only on which pictures are referenced, without regard to whether a prediction is formed using an index into reference picture list 0 or an index into reference picture list 1, and also without regard to whether the index position within a reference picture list is different.
NOTE 2—The number of motion vectors that are used for the prediction of a coding subblock with top-left sample covering (xSb, ySb), is equal to PredFlagL0[xSb][ySb]+PredFlagL1[xSb][ySb].
One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 4 in units of quarter luma samples.
Two motion vectors and two different reference pictures are used to predict the coding subblock containing the sample $p_0$, two motion vectors for the same reference pictures are used to predict the coding subblock containing the sample $q_0$ and the absolute difference between the horizontal or vertical component of the two motion vectors used in the prediction of the two coding subblocks for the same reference picture is greater than or equal to 4 in units of quarter luma samples.
Two motion vectors for the same reference picture are used to predict the coding subblock containing the sample $p_0$, two motion vectors for the same reference picture are used to predict the coding subblock containing the sample $q_0$ and both of the following conditions are true:
The absolute difference between the horizontal or vertical component of list 0 motion vectors used in the prediction of the two coding subblocks is greater than or equal to 4 in quarter luma samples, or the absolute difference between the horizontal or vertical component of the list 1 motion vectors used in the prediction of the two coding subblocks is greater than or equal to 4 in units of quarter luma samples.
The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 4 in units of quarter luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 4 in units of quarter luma samples.
Otherwise, the variable $bS[xD_i][yD_j]$ is set equal to 0.

5.13a Embodiment #13a

This embodiment describes the boundary strength derivation
8.8.3.5 Derivation Process of Boundary Filtering Strength
Inputs to this process are:
a picture sample array recPicture.
a location (xCb, yCb) specifying the top-left sample of the current coding block relative to the top-left sample of the current picture,
a variable nCbW specifying the width of the current coding block,
a variable nCbH specifying the height of the current coding block,
a variable edgeType specifying whether a vertical (EDGE_VER) or a horizontal (EDGE_HOR) edge is filtered.
a variable cIdx specifying the colour component of the current coding block.
a two-dimensional (nCbW)×(nCbH) array edgeFlags.
Output of this process is a two-dimensional (nCbW)×(nCbH) array bS specifying the boundary filtering strength.
. . .
The variable $bS[xD_i][yD_j]$ is derived as follows:
If cIdx is equal to 0 and both samples $p_0$ and $q_0$ are in a coding block with intra_bdpcm_flag equal to 1, $bS[xD_i][yD_j]$ is set equal to 0.
Otherwise, if the sample $p_0$ or $q_0$ is in the coding block of a coding unit coded with intra prediction mode, $bS[xD_i][yD_j]$ is set equal to 2.
Otherwise, if the block edge is also a transform block edge and the sample $p_0$ or $q_0$ is in a coding block with ciip_flag equal to 1, $bS[xD_i][yD_j]$ is set equal to 2.
Otherwise, if the block edge is also a transform block edge and the sample $p_0$ or $q_0$ is in a transform block which contains one or more non-zero transform coefficient levels, $bS[xD_i][yD_j]$ is set equal to 1.
{{Otherwise, if the block edge is also a transform block edge and the sample $p_0$ or $q_0$ is in a coding blocks with pred_mode_plt_flag equal to 1, $bS[xD_i][yD_j]$ is set equal to 0.}}

Otherwise, if the prediction mode of the coding subblock containing the sample pa is different from the prediction mode of the coding subblock containing the sample $q_0$, $bS[xD_i][yD_j]$ is set equal to 1.

Otherwise, if cIdx is equal to 0 and one or more of the following conditions are true, $bS[xD_i][yD_j]$ is set equal to 1:
The coding subblock containing the sample $p_0$ and the coding subblock containing the sample $q_0$ are both coded in IBC prediction mode, and the absolute difference between the horizontal or vertical component of the motion vectors used in the prediction of the two coding subblocks is greater than or equal to 4 in units of quarter luma samples.

For the prediction of the coding subblock containing the sample $p_0$ different reference pictures or a different number of motion vectors are used than for the prediction of the coding subblock containing the sample $q_0$.

NOTE 1—The determination of whether the reference pictures used for the two coding sublocks are the same or different is based only on which pictures are referenced, without regard to whether a prediction is formed using an index into reference picture list 0 or an index into reference picture list 1, and also without regard to whether the index position within a reference picture list is different.

the two coding subblocks is greater than or equal to 4 in quarter luma samples, or the absolute difference between the horizontal or vertical component of the list 1 motion vectors used in the prediction of the two coding subblocks is greater than or equal to 4 in units of quarter luma samples.

The absolute difference between the horizontal or vertical component of list 0 motion vector used in the prediction of the coding subblock containing the sample pi and the list 1 motion vector used in the prediction of the coding subblock containing the sample $q_0$ is greater than or equal to 4 in units of quarter luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 4 in units of quarter luma samples.

Otherwise, the variable $bS[xD_i][yD_j]$ is set equal to 0.

5.13b Embodiment #13b

This embodiment describes escape samples coding and reconstruction.

|  | Descriptor |
|---|---|
| {{palette_coding( x0, y0, cbWidth, cbHeight, startComp, numComps ) { <br> ... <br> {{/* Parsing escape values */ <br>   if( palette_escape_val_present_flag ) { <br>     for( cIdx = startComp; cIdx < ( startComp + numComps ); cIdx++ ) <br>       for( sPos = 0; sPos < cbWidth* cbHeight; sPos++ ) { <br>         xC = TraverseScanOrder[ cbWidth][ cbHeight ][ sPos ][ 0 ] <br>         yC = TraverseScanOrder[ cbWidth][ cbHeight ][ sPos ][ 1 ] <br>         if( PaletteIndexMap[ cIdx ] [ xC ][ yC ] = = ( MaxPaletteIndex − 1 ) ) { <br>           palette_escape_val}} <br>           {{PaletteEscapeVal[ cIdx ][ xC ][ yC ] = palette_escape_val <br>         } <br>       } <br>   } <br> }}} | [[ae(v)<br>]]{{u(v)}} |

NOTE 2—The number of motion vectors that are used for the prediction of a coding subblock with top-left sample covering (xSb, ySb), is equal to PredFlagL0[xSb][ySb]+ PredFlagL1[xSb][ySb].

One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 4 in units of quarter luma samples.

Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 4 in units of quarter luma samples.

Two motion vectors for the same reference picture are used to predict the coding subblock containing the sample $p_0$, two motion vectors for the same reference picture are used to predict the coding subblock containing the sample $q_0$ and both of the following conditions are true:
The absolute difference between the horizontal or vertical component of list 0 motion vectors used in the prediction of {{Decoding process for palette mode
Inputs to this process are:
a location (xCb, yCb) specifying the top-left luma sample of the current block relative to the top-left luma sample of the current picture,
a variable startComp specifies the first colour component in the palette table.
a variable cIdx specifying the colour component of the current block,
two variables nCbW and nCbH specifying the width and height of the current block, respectively.
Output of this process is an array recSamples[x][y], with x=0 . . . nCbW−1, y=0 . . . nCbH−1 specifying reconstructed sample values for the block.
Depending on the value of cIdx, the variables nSubWidth and nSubHeight are derived as follows:
If cIdx is equal to 0, nSubWidth is set to 1 and nSubHeight is set to 1.
Otherwise, nSubWidth is set to SubWidthC and nSubHeight is set to SubHeightC.
The (nCbW×nCbH) block of the reconstructed sample array recSamples at location (xCb, yCb) is represented by recSamples[x][y] with x=0 . . . nCTbW−1 and y=0 . . . nCbH−1, and the value of recSamples[x][y] for each x in the range of 0 to nCbW−1, inclusive, and each y in the range of 0 to nCbH−1, inclusive, is derived as follows:

The variables xL and yL are derived as follows:

$$xL = \text{palette\_transpose\_flag} ? x*n\text{SubHeight} : x*n\text{SubWidth} \quad (8\text{-}69)$$

$$yL = \text{palette\_transpose\_flag} ? y*n\text{SubWidth} : y*n\text{SubHeight} \quad (8\text{-}70)$$

The variable bIsEscapeSample is derived as follows:
If PaletteIndexMap[xCb+xL][yCb+yL] is equal to MaxPaletteIndex and palette_escape_val_present_flag is equal to 1, bIsEscapeSample is set equal to 1.
Otherwise, bIsEscapeSample is set equal to 0.
If bIsEscapeSample is equal to 0, the following applies:

$$\text{recSamples}[x][y] = \text{CurrentPaletteEntries}[cIdx][\text{PaletteIndexMap}[xCb+xL][yCb+yL]] \quad (8\text{-}71)$$

Otherwise, if cu_transquant_bypass_flag is equal to 1, the following applies:

$$\text{recSamples}[x][y] = \text{PaletteEscapeVal}[cIdx][xCb+y][yCb+yL] \quad (8\text{-}72)$$

Otherwise (bIsEscapeSample is equal to 1 and cu_transquant_bypass_flag is equal to 0), the following ordered steps apply:
The derivation process for quantization parameters as specified in clause 8.7.1 is invoked with the location (xCb, yCb) specifying the top-left sample of the current block relative to the top-left sample of the current picture.
The quantization parameter qP is derived as follows:
If cIdx is equal to 0, $$qP = \text{Max}(0, Qp'_Y) \quad (8\text{-}73)$$

Otherwise, if cIdx is equal to 1, $$qP = \text{Max}(0, Qp'_{Cb}) \quad (8\text{-}74)$$

Otherwise (cIdx is equal to 2).

$$qP = \text{Max}(0, Qp'_{Cr}) \quad (8\text{-}75)$$

The variables bitDepth is derived as follows:

$$\text{bitDepth} = (cIdx == 0) ? \text{BitDepth}_Y : \text{BitDepth}_C \quad (8\text{-}76)\}\}$$

[[The list levelScale[ ] is specified as levelScale[k]={40, 45, 51, 57, 64, 72} with k=0 ... 5.]]
The following applies:

$$[[\text{tmpVal} = (\text{PaletteEscapeVal}[cIdx][xCb+xL][yCb+yL]*\text{levelScale}[qP\%6]) << (qP/6)+32) >> 6 \quad (8\text{-}77)$$

$$\text{recSamples}[x][y] = \text{Clip3}(0,(1<<\text{bitDepth})-1,\text{tmpVal}) \quad (8\text{-}78)]]$$

$$\{\{\text{recSamples}[x][y] = \text{Clip3}(0,(1<<\text{bitDepth})-1,\text{PaletteEscapeVal}[cIdx][xCb+xL][yCb+yL]) \quad (8\text{-}78)$$

When one of the following conditions is true:
cIdx is equal to 0 and numComps is equal to 1;
cIdx is equal to 3;
the variable PredictorPaletteSize[startComp] and the array PredictorPaletteEntries are derived or modified as follows:
for (i=0; i<CurrentPaletteSize[startComp]; i++)
  for (cIdx=startComp; cIdx<(startComp+numComps); cIdx++)
    newPredictorPaletteEntries[cIdx][i]=CurrentPaletteEntries[cIdx][i]
newPredictorPaletteSize=CurrentPaletteEntries[startComp]
for (i=0; i<PredictorPaletteSize && newPredictorPaletteSize<PaletteMaxPredictorSize; i++)
  if (!PalettePredictorEntryReuseFlags[i]) {

$$\text{for }(cIdx=\text{startComp};cIdx<(\text{startComp}+\text{numComps});cIdx++) \quad (8\text{-}79)$$

newPredictorPaletteEntries[cIdx][newPredictorPaletteSize]PredictorPaletteEntries[cIdx][i]
newPredictorPaletteSize++
}
for (cIdx=startComp; cIdx<(startComp+numComps); cIdx++)
  for (i=0; i<newPredictorPaletteSize; i++)
    PredictorPaletteEntries[cIdx][i]=newPredictorPaletteEntries[cIdx][i]
PredictorPaletteSize[startComp]=newPredictorPaletteSize
It is a requirement of bitstream conformance that the value of PredictorPaletteSize[startComp] shall be in the range of 0 to PaletteMaxPredictorSize, inclusive.}}

5.14 Embodiment #14

8.4.5.3 Decoding Process for Palette Mode
Inputs to this process are:
  a location (xCb, yCb) specifying the top-left luma sample of the current block relative to the top-left luma sample of the current picture.
  a variable startComp specifies the first colour component in the palette table.
  a variable cIdx specifying the colour component of the current block.
  two variables nCbW and nCbH specifying the width and height of the current block, respectively.
Output of this process is an array recSamples[x][y], with x=0 ... nCbW−1, y=0 ... nCbH−1 specifying reconstructed sample values for the block.
Depending on the value of cIdx, the variables nSubWidth and nSubHeight are derived as follows:
  If cIdx is equal to 0, nSubWidth is set to 1 and nSubHeight is set to 1.
  Otherwise, nSubWidth is set to SubWidthC and nSubHeight is set to SubHeightC.
The (nCbW×nCbH) block of the reconstructed sample array recSamples at location (xCb, yCb) is represented by recSamples[x][y] with x=0 ... nCTbW−1 and y=0 ... nCbH−1, and the value of recSamples[x][y] for each x in the range of 0 to nCbW−1, inclusive, and each y in the range of 0 to nCbH−1, inclusive, is derived as follows:
  The variables xL and yL are derived as follows:

$$xL = \text{palette\_transpose\_flag} ? x*n\text{SubHeight} : x*n\text{SubWidth} \quad (8\text{-}234)$$

$$yL = \text{palette\_transpose\_flag} ? y*n\text{SubWidth} : y*n\text{SubHeight} \quad (8\text{-}235)$$

The variable bIsEscapeSample is derived as follows:
  If PaletteIndexMap[xCb+xL][yCb+yL] is equal to MaxPaletteIndex and palete_escape_val_present_flag is equal to 1, bIsEscapeSample is set equal to 1.
  Otherwise, bIsEscapeSample is set equal to 0.
If bIsEscapeSample is equal to 0, the following applies:

$$\text{recSamples}[x][y] = \text{CurrentPaletteEntries}[cIdx][\text{PaletteIndexMap}[xCb+xL][yCb+yL]] \quad (8\text{-}236)$$

Otherwise, if cu_transquant_bypass_flag is equal to 1, the following applies:

$$\text{recSamples}[x][y] = \text{PaletteEscapeVal}[cIdx][xCb+xL][yCb+y] \quad (8\text{-}237)$$

Otherwise (bIsEscapeSample is equal to 1 and cu_transquant_bypass_flag is equal to 0), the following ordered steps apply:
1. The derivation process for quantization parameters as specified in clause 8.7.1 is invoked with the location (xCb, yCb) specifying the top-left sample of the current block relative to the top-left sample of the current picture.

[Ed. (BB): QPs are already derived at the beginning of the intra CU decoding process so there is no need to derive them again within this subclause. Although it is like that in HEVC v4 SCC, I think this redundancy can be removed. Please confirm.]

2. {{The quantization parameter qP is derived as follows: If cIdx is equal to 0, $$qP = \text{Max}(QpPrimeTsMin, Qp'_Y) \qquad (8\text{-}238)$$

Otherwise, if cIdx is equal to 1.

$$qP = \text{Max}(QpPrimeTsMin, Qp'_{Cb}) \qquad (8\text{-}239)$$

Otherwise (cIdx is equal to 2), $$qP = \text{Max}(QpPrimeTsMin, Qp'_{Cr}) \qquad (8\text{-}240)$$

Where min_qp_prime_ts_minus4 specifies the minimum allowed quantization parameter for transform skip mode as follows:))
QpPrimeTsMin=4+min_qp_prime_ts_minus4

3. The variables bitDepth is derived as follows:

$$\text{bitDepth} = (c\text{Idx}==0)?\text{BitDepth}_Y : \text{BitDepth}_C \qquad (8\text{-}241)$$

4. The list levelScale[ ] is specified as levelScale[k]={40, 45, 51, 57, 64, 72} with k=0.5
   [Ed. (BB): For non-palette CUs, levelScale depends on rectNonTsFlag, should that be applied here too?]

5. The following applies:

$$\text{tmpVal} = (\text{PaletteEscapeVal}[c\text{Idx}][x\text{Cb}+xL][y\text{Cb}+yL]*\text{levelScale}[qP\%6]) << (qP/6)+32)>>6 \qquad (8\text{-}242)$$

$$\text{recSamples}[x][y] = \text{Clip3}(0,(1<<\text{bitDepth})-1,\text{tmpVal}) \qquad (8\text{-}243)$$

When one of the following conditions is true:
cIdx is equal to 0 and numComps is equal to 1;
cIdx is equal to 3;
the variable PredictorPaletteSize[startComp] and the array PredictorPaletteEntries are derived or modified as follows:

```
for( i = 0; i < CurrentPaletteSize startComp ]; i++ )
   for( cIdx = startComp; cIdx < (startComp + numComps); cIdx++ )
      newPredictorPalette Entries[ cIdx ][ i ] = CurrentPaletteEntries[ cIdx ][ i ]
newPredictorPaletteSize = CurrentPaletteSize startComp ]
for( i = 0; i < PredictorPaletteSize && newPredictorPalctteSize < PaletteMaxPredictorSize; i++ )
   if( !PalettePredictorEntryReuseFlags[ i ] ) {
      for ( cIdx = startComp; cIdx < (startComp + numComps); cIdx++ )
         newPredictorPaletteEntries[ cIdx ][ newPredictorPaletteSize ] =
            PredictorPaletteEntries[ cIdx ][ i ]
      newPredictorPaletteSize++
   }
for( cIdx = startComp; cIdx < (startComp + numComps ); cIdx++ )
   for( i = 0; i < newPredictorPaletteSize; i++ )
      PredictorPaletteEntries[ cIdx ][ i ] = newPredictorPaletteEntries[ cIdx ][ i ]
PredictorPaletteSize[ startComp ] = newPredictorPaletteSize
```

It is a requirement of bitstream conformance that the value of PredictorPaletteSize[startComp] shall be in the range of 0 to PaletteMaxPredictorSize, inclusive.

5.15 Embodiment #15

8.4.2 Derivation Process for Luma Intra Prediction Mode
. . .

Otherwise (skip_intra_flag[xPb][yPb] and DimFlag[xPb][yPb] are both equal to 0). IntraPredModeY[xPb][yPb] is derived by the following ordered steps:

1. The neighbouring locations (xNbA, yNbA) and (xNbB, yNbB) are set equal to (xPb−1, yPb) and (xPb, yPb−1), respectively.

2. For X being replaced by either A or B, the variables candIntraPredModeX are derived as follows:
   The availability derivation process for a block in z-scan order as specified in clause 6.4.1 is invoked with the location (xCurr, yCurr) set equal to (xPb, yPb) and the neighbouring location (xNbY, yNbY) set equal to (xNbX, yNbX) as inputs, and the output is assigned to availableX.
   The candidate intra prediction mode candIntraPredModeX is derived as follows:
      If availableX is equal to FALSE, candIntraPredModeX is set equal to INTRA_DC.
      [[Otherwise, if CuPredMode[xNbX][yNbX] is not equal to MODE_INTRA or pcm_flag[xNbX][yNbX] is equal to 1 or, candIntraPredModeX is set equal to INTRA_DC,]]
      {{Otherwise, if CuPredMode[xNbX][yNbX] is not equal to MODE_INTRA, pcm_flag[xNbX][yNbX] is equal to 1 or palette_mode_flag is equal to 1, candIntraPredModeX is set equal to INTRA_DC.}}
      Otherwise, if X is equal to B and yPb−1 is less than ((yPb>>CtbLog2SizeY)<< CtbLog2SizeY), candIntraPredModeB is set equal to INTRA_DC.
      Otherwise, if IntraPredModeY[xNbX][yNbX] is greater than 34, candIntraPredModeX is set equal to INTRA_DC.

5.16 Embodiment #16

8.4.2 Derivation Process for Luma Intra Prediction Mode
Input to this process are:
   a luma location(xCb, yCb) specifying the top-left sample of the current luma coding block relative to the top-left luma sample of the current picture.
   a variable cbWidth specifying the width of the current coding block in luma samples,
   a variable cbHeight specifying the height of the current coding block in luma samples.
In this process, the luma intra prediction mode IntraPredModeY[xCb][yCb] is derived.

1. For X being replaced by either A or B, the variables candIntraPredModeX are derived as follows:
   The availability derivation process for a block as specified in clause {{6.4.X [Ed. (BB): Neighbouring blocks availability checking process tbd]}} is invoked with the location (xCurr, yCurr) set equal to (xCb, yCb) and the neighbouring location (xNbY, yNbY) set equal to (xNbX, yNbX) as inputs, and the output is assigned to availableX.

The candidate intra prediction mode candIntraPredModeX is derived as follows:
   If one or more of the following conditions are true, candIntraPredModeX is set equal to INTRA_PLANAR.
   The variable availableX is equal to FALSE.
   CuPredMode[xNbX][yNbX] is not equal to MODE_INTRA.
   {{pred_mode_plt_flag is equal to 1}}.
   intra_mip_flag[xNbX][yNbX] is equal to 1.
   X is equal to B and yCb−1 is less than ((yCb>>CtbLog2SizeY)<<CtbLog2SizeY).
   Otherwise, candIntraPredModeX is set equal to IntraPredModeY[xNbX][yNbX].

. . .

The variable IntraPredModeY[x][y] with x=xCb . . . xCb+cbWidth−1 and y=yCb . . . yCb+cbHeight−1 is set to be equal to intraPredModeY[xCb][yCb].

5.17 Embodiment #17

8.4.3 Derivation Process for Luma Intra Prediction Mode
Input to this process are:
   a luma location(xCb, yCb) specifying the top-left sample of the current luma coding block relative to the top-left luma sample of the current picture,
   a variable cbWidth specifying the width of the current coding block in luma samples.
   a variable cbHeight specifying the height of the current coding block in luma samples.
In this process, the luma intra prediction mode IntraPredModeY[xCb][yCb] is derived.
  2. For X being replaced by either A or B, the variables candIntraPredModeX are derived as follows:
     The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.
     The candidate intra prediction mode candIntraPredModeX is derived as follows:
       If one or more of the following conditions are true, candIntraPredModeX is set equal to [[INTRA_PLANAR]]{{INTRA_DC.}}
       The variable availableX is equal to FALSE.
       CuPredMode[xNbX][yNbX]] is not equal to MODE_INTRA.
       intra_mip_flag[xNbX][yNbX] is equal to 1.
       X is equal to B and yCb−1 is less than ((yCb>>CtbLog2SizeY)<<CtbLog2SizeY).
       Otherwise, candIntraPredModeX is set equal to IntraPredModeY[xNbX][yNbX].

. . .

The variable IntraPredModeY[x][y] with x=xCb . . . xCb+cbWidth−1 and y=yCb . . . yCb+cbHeight−1 is set to be equal to IntraPredModeY[xCb][yCb].

5.18 Embodiment #18

8.4.3 Derivation Process for Luma Intra Prediction Mode
Input to this process are:
   a luma location (xCb, yCb) specifying the top-left sample of the current luma coding block relative to the top-left luma sample of the current picture,
   a variable cbWidth specifying the width of the current coding block in luma samples,
   a variable cbHeight specifying the height of the current coding block in luma samples.
In this process, the luma intra prediction mode IntraPredModeY[xCb][yCb] is derived.
  3. For X being replaced by either A or B, the variables candIntraPredModeX are derived as follows:
     The availability derivation process for a block as specified in clause {{6.4.X [Ed. (BB): Neighbouring blocks availability checking process tbd]}} is invoked with the location (xCurr, yCurr) set equal to (xCb, yCb) and the neighbouring location (xNbY, yNbY) set equal to (xNbX, yNbX) as inputs, and the output is assigned to availableX.
     The candidate intra prediction mode candIntraPredModeX is derived as follows:
       If one or more of the following conditions are true, candIntraPredModeX is set equal to [[INTRA_PLANAR]]{{INTRA_DC.}}
       The variable availableX is equal to FALSE.
       CuPredMode[xNbX][yNbX] is not equal to MODE_INTRA.
       intra_mip_flag[xNbX][yNbX] is equal to 1.
       {{pred_mode_plt_flag is equal to 1}},
       X is equal to B and yCb−1 is less than ((yCb>>CtbLog2SizeY)<<CtbLog2SizeY).
       Otherwise, candIntraPredModeX is set equal to IntraPredModeY[xNbX][yNbX].

. . .

The variable IntraPredModeY[x][y] with x=xCb . . . xCb+cbWidth−1 and y=yCb . . . yCb+cbHeight−1 is set to be equal to IntraPredModeY[xCb][yCb].

5.19 Embodiment #19

```
                                                                              Descriptor
Coding_unit( x0, y0, cbWidth, cbHeight, treeTypeCurr,    isInSCIPURegion,
SCIPUConsMode ) {
    if( slice_type != I | | sps_ibc_enabled_flag || {{sps_plt_enabled_flag}} ) {
        if(    treeTypeCurr    !=    DUAL_TREE_CHROMA    &&
           !( ( (cbWidth = = 4 && cbHeight = = 4 || SCIPUConsMode == MODE_NON_INTER)
        && !sps_ibc_enabled_flag ) )                                          ae(v)
            cu_skip_flag[ x0 ][ y0 ]
        if(    cu_skip_flag[ x0 ][ y0 ]    = =    0    &&    slice_type    !=    I
            && !(cbWidth = = 4 && cbHeight = = 4 ) && SCIPUConsMode == MODE_ALL)
            pred_mode_flag                                                    ae(v)
```

|  | Descriptor |
|---|---|
| `if(  (  ( slice_type == I && cu_skip_flag[ x0 ][ y0 ] = =0  )  ||`<br>`   ( slice_type != I && ( CuPredMode[ x0 ][ y0 ] != MODE_INTRA ||`<br>`   ( cbWidth = = 4 && cbHeight = = 4 && cu_skip_flag[ x0 ][ y0 ] = = 0 ) ) ) ) &&`<br>`   sps_ibc_enabled_flag && ( cbWidth != 128 || cbHeight != 128 ) &&`<br>`SCIPUConsMode != MODE_INTER)`<br>`  pred_mode_ibc_flag` | ae(v) |
| `{{ if( CuPredMode[ x0 ][ y0 ] == MODE_INTRA || (slice_type != I && !(cb Width = =`<br>`4    && cbHeight = = 4 ) && !sps_ibc_enabled_flag && CuPredMode[ x0 ][ y0 ] !=`<br>`   MODE_INTRA )) && cbWidth <= 64 && cbHeight <= 64 && sps_plt_enabled_flag`<br>`   && cu_skip_flag[ x0 ][ y0 ] = = 0 && SCIPUConsMode!= MODE_INTER)`<br>`  pred_mode_plt_flag` | ae(v)}} |
| `}`<br>`if(isInSCIPURegion   &&   SCIPUConsMode   ==   MODE_ALL   &&`<br>`CuPredMode[ x0 ][ y0 ] != MODE_INTER){`<br>`  treeType = DUAL_TREE_LUMA`<br>`} else {`<br>`  treeType = treeTypeCurr`<br>`}`<br>`...`<br>`}` |  |

5.20 Embodiment #20

|  | Descriptor |
|---|---|
| `Coding_unit( x0, y0, cbWidth, cbHeight, treeTypeCurr,    isInS CIPURegion,`<br>`SCIPUConsMode ) {`<br>`  if( slice_type != I || sps_ibc_enabled flag || {{sps_plt_enabled_flag}} ) {`<br>`    if(   treeType   !=   DUAL_TREE_CHROMA   &&`<br>`    !( ( (cbWidth = = 4 && cbHeight = = 4 || SCIPUCConsMode == MODE_NON_INTER)`<br>`&& !sps_ibc_enabled_flag ) )`<br>`      cu_skip_flag[ x0 ][ y0 ]` | ae(v) |
| `    if(  cu_skip_flag[ x0 ][ y0 ]  = =  0  &&  slice_type  !=  I`<br>`      && !(cbWidth = = 4 && cbHeight = = 4 ) && SCIPUConsMode == MODE_ALL)`<br>`      pred_mode_flag` | ae(v) |
| `    if(  (  ( slice_type == I && cu_skip_flag[ x0 ][ y0 ] = =0  )  ||`<br>`      ( slice_type != I && ( CuPredMode[ x0 ][ y0 ] != MODE_INTRA ||`<br>`      ( cbWidth = = 4 && cbHeight = = 4 && cu_skip_flag[ x0 ][ y0 ] = = 0 ) ) ) ) &&`<br>`      sps_ibc_enabled_flag && ( cbWidth != 128 || cbHeight != 128 ) &&`<br>`SCIPUConsMode != MODE INTER)`<br>`      pred_mode_ibc_flag` | ae(v) |
| `    {{if( CuPredMode[ x0 ][ y0 ] == MODE_INTRA && cbWidth <= 64 && cbHeight <=`<br>`64    && sps_plt_enabled_flag && cu_skip_flag[ x0 ][ y0 ] = = 0 && SCIPUConsMode!=`<br>`      MODE_INTER)`<br>`      pred_mode_plt_flag` | ae(v)}} |
| `  }`<br>`  if(isInSCIPURegion   &&   SCIPUConsMode   ==   MODE_ALL   &&`<br>`CuPredMode [ x0 ][ y0 ] != MODE_INTER){`<br>`    treeType = DUAL_TREE_LUMA`<br>`  } else {`<br>`    treeType = treeTypeCurr`<br>`  }`<br>`...`<br>`}` |  |

5.21 Embodiment #21

|  | Descriptor |
|---|---|
| `Coding_unit( x0, y0, cbWidth, cbHeight, treeTypeCurr,    isInSCIPURegion,`<br>`SCIPUConsMode ) {`<br>`  if( slice_type != I || sps_ibc_enabled flag || {{sps_plt_enabled_flag}} ) {`<br>`    if(   treeType   !=   DUAL_TREE_CHROMA   &&`<br>`    !( ( ( cbWidth = = 4 && cbHeight = = 4 || SCIPUCConsMode == MODE_NON_INTER)`<br>`&& !sps_ibc_enabled_flag ) )`<br>`      cu_skip_flag[ x0 ][ y0 ]` | ae(v) |

|  | Descriptor |
|---|---|
| if( cu_skip_flag[ x0 ][ y0 ] = = 0 && slice_type != I<br>&& !(cbWidth = = 4 && cbHeight = = 4 ) && SCIPUConsMode == MODE_ALL)<br>    pred_mode_flag | ae(v) |
| if( ( ( slice_type = = I && cu_skip_flag[ x0 ][ y0 ] = =0 ) \|\|<br>( slice_type != I && ( CuPredMode [ x0 ][ y0 ] != MODE_INTRA \|\|<br>( cbWidth = = 4 && cbHeight = = 4 && cu_skip_flag[ x0 ][ y0 ] = = 0 ) ) ) ) &&<br>sps_ibc_enabled_flag && ( cbWidth != 128 \|\| cbHeight != 128) && SCIPUConsMode != MODE INTER)<br>    pred_mode_ibc_flag | ae(v) |
| {{if((((slice_type = = I \|\| (cbWidth = = 4 && cbHeight = = 4) \|\| sps_ibc_enabled_flag ) && CuPredMode[ x0 ][ y0 ] == MODE_INTRA ) \|\| (slice_type != I && !(cbWidth = = 4 && cbHeight = = 4) && !sps_ibc_enabled_flag && CuPredMode[ x0 ][ y0 ] != MODE_INTRA ) ) && cbWidth <= 64 && cbHeight <= 64 && sps_plt _enabled_flag && cu_skip_flag[ x0 ][ y0 ] = = 0 && SCIPUConsMode != MODE_INTER)<br>    pred_mode_plt_flag | ae(v)}} |
| }<br>if(isInSCIPURegion && SCIPUConsMode == MODE_ALL && CuPredMode [ x0 ][ y0 ] != MODE_INTER){<br>  treeType = DUAL_TREE_LUMA<br>} else {<br>  treeType = treeTypeCurr<br>}<br>...<br>} | |

5.22 Embodiment #22

This embodiment describes the coding unit syntax. In this embodiment, the pred_mode_plt_flag is signaled after the pred_mode_ibc_flag.

| 7.3.7.5 Coding unit syntax |  |
|---|---|
|  | Descriptor |
| coding_unit( x0, y0, cb Width, cbHeight, treeType, {{modeType}} ) {<br>  if( slice_type != I \|\| sps_ibc_enabled flag \|\| {{sps_plt_enabled_flag}} ) {<br>    if( treeType != DUAL_TREE_CHROMA &&<br>    !( [[cbWidth = = 4 && cbHeight = = 4 && !sps_ibc_enabled_flag ) ]]<br>    {{( ( cbWidth = = 4 && cbHeight = = 4 ) \|\| modeType = = MODE_TYPE_INTRA )<br>    && !sps_ibc_enabled_flag ))}}<br>    cu_skip_flag[ x0 ][ y0 ] | ae(v) |
| if( cu_skip_flag[ x0 ][ y0 ] = = 0 && slice_type != I<br>&& !( cbWidth = = 4 && cbHeight = = 4 ) {{&& modeType = = MODE_TYPE_ALL)}}<br>  pred_mode_flag | ae(v) |
| [[ if( ( ( slice_type = = I && cu_skip_flag[ x0 ][ y0 ] = =0 ) \|\|<br>( slice_type != I && ( CuPredMode[ x0 ][ y0 ] != MODE_INTRA \|\|<br>( cbWidth = = 4 && cbHeight = = 4 && cu_skip_flag[ x0 ][ y0 ] = = 0 ) ) ) ) &&<br>sps_ibc_enabled_flag && ( cbWidth != 128 \|\| cbHeight != 128) )]]<br>{{if( ( ( slice_type == I && cu_skip_flag[ x0 ][ y0 ] = =0 ) \|\|<br>( slice_type != I && ( CuPredMode[ x0 ][ y0 ] != MODE_INTRA \|\|<br>( cbWidth = = 4 && cbHeight = = 4 && cu_skip_flag[ x0 ][ y0 ] = = 0 ) ) ) ) &&<br>cbWidth <= 64 && cbHeight <= 64 ) && modeType != MODE_TYPE_INTER )<br>{<br>  if( sps ibc enabled flag && treeType = DUAL_TREE_CHROMA )}}<br>    pred_mode_ibc_flag | ae(v) |
| {{ }<br>{{if( ( ( slice_type = = I \|\| (cbWidth = = 4 && cbHeight = = 4 ) \|\| sps_ibc_enabled_flag ) && CuPredMode [ x0 ][ y0 ] == MODE_INTRA ) \|\| (slice_type != I && !(cbWidth = = 4 && cbHeight = = 4 ) && !sps_ibc_enabled_flag && CuPredMode[ x0 ][ y0 ] != MODE_INTRA ) ) && cbWidth <= 64 && cbHeight <= 64 && sps_plt _enabled_flag && cu_skip_flag[ x0 ][ y0 ] = = 0 && modeType != MODE_INTER)<br>    pred_mode_plt_flag | ae(v)}} |
| }<br>...<br>} | |

5.23 Embodiment #23

| | Descriptor |
|---|---|
| Coding_unit( x0, y0, cbWidth, cbHeight, treeTypeCurr, isInSCIPURegion, SCIPUConsMode ) { | |
|     if( slice_type != I \|\| sps_ibc_enabled flag \|\| {{sps_plt_enabled_flag}} ) { | |
|       if(  treeType  !=  DUAL_TREE_CHROMA  && | |
| !( ( ( cbWidth = = 4 && cbHeight = = 4 \|\| SCIPUCConsMode == MODE_NON_INTER) && !sps_ibc_enabled_flag ) ) | |
|         cu_skip_flag[ x0 ][ y0 ] | ae(v) |
|       if(  cu_skip_flag[ x0 ][ y0 ]  = =  0  &&  slice_type  !=  I  && !(cbWidth = = 4 && cbHeight = = 4 ) && SCIPUConsMode == MODE_ALL) | |
|         pred_mode_flag | ae(v) |
|       if(  (  (  slice_type  = =  I  &&  cu_skip_flag[ y0 ] = =0   )  \|\| ( slice_type != I && ( CuPredMode [ x0 ][ y0 ] != MODE_INTRA \|\| ( cbWidth = = 4 && cbHeight = = 4 && cu_skip_flag[ x0 ][ y0 ] = = 0 ) ) ) ) && sps_ibc_enabled_flag && ( cbWidth != 128 \|\| cbHeight != 128 ) && SCIPUConsMode != MODE INTER) | |
|         pred_mode_ibc_flag | ae(v) |
| {{ if((((slice_type = = I \|\| (cbWidth = = 4 && cbHeight = = 4 ) \|\| sps_ibc_enabled_flag ) && CuPredMode[ x0 ][ y0 ] == MODE_INTRA ) \|\| (slice_type != I && !(cbWidth = = 4 && cbHeight = = 4) && !pred_mode_ibc_flag && CuPredMode[ x0 ][ y0 ] != MODE_INTRA ) ) && cbWidth <= 64 && cbHeight <= 64 && sps_plt enabled_flag && cu_skip_flag[ x0 ][ y0 ] = = 0 && SCIPUConsMode != MODE_INTER) | |
|         pred_mode_plt_flag | ae(v)}} |
|     { | |
|     if(isInSCIPURegion && SCIPUConsMode == MODE_ALL && CuPredMode [ x0 ][ y0 ] != MODE_INTER){ | |
|       treeType = DUAL_TREE_LUMA | |
|     } else { | |
|       treeType = treeTypeCurr | |
| } | |
| ... | |
|   } | |

5.24 Embodiment #24

This embodiment describes the coding unit syntax. In this embodiment, the pred_mode_plt_flag is signaled after the pred_mode_ibc_flag.

| 7.3.7.5 Coding unit syntax | |
|---|---|
| | Descriptor |
| coding_unit( x0, y0, cb Width, cbHeight, treeType, {{modeType}}){ | |
|   if( slicetype != I  \|\|  sps_ibc_enabled_flag \|\| {{sps_plt_enabled_flag}}){ | |
|     if(  treeType  !=  DUAL_TREE_CHROMA  && !([[cbWidth = = 4 && cbHeight = = 4 && !sps_ibc_enabled_flag ) ]] {{(( cbWidth = = 4 && cbHeight = = 4 ) \|\| modeType = = MODE_TYPE_INTRA ) && ! sps_ibc_enabled_flag ))}} | |
|       cu_skip_flag[ x0 ] [ y0 ] | ae(v) |
|     if(  cu_skip_flag[ x0 ][ y0 ]  = =  0  &&  slice_type  !=  I && !( cbWidth  = = 4  &&  cbHeight  = = 4  ) {{&&  modeType  = = MODE_TYPE_ALL)}} | |
|       pred_mode_flag | ae(v) |
| [[ if(  (  (  slice type  = =  I  &&  cu_skip_flag[ x0 ][ y0 ] = =0 )   \|\| ( slice_type != I && ( CuPredMode[ x0 ][ y0 ] != MODE_INTRA \|\| ( cbWidth = = 4 && cbHeight = = 4 && cu_skip_flag[ x0 ][ y0 ] = = 0 ) ) ) && sps_ibc_enabled_flag && ( cbWidth != 128 \|\| cbHeight != 128 ) )]] {{if(  (  (  slice_type  = =  I  &&  cu_skip_flag[ x0 ][ y0 ]  = =0 )  \|\| ( slice_typ e != I && ( CuPredMode[ x0 ][ y0 ] != MODE_INTRA \|\| ( cbWidth = = 4 && cbHeight = = 4 && cu_skip_flag[ x0 ][ y0 ] = = 0 ) ) ) ) && cbWidth <=64 && cbHeight <= 64 ) && modeType != MODE_TYPE_INTER ) { if( sps_ibc_enabled_flag && treeType != DUAL_TREE_CHROMA )}} | |
|       pred_mode_ibc_flag | ae(v) |
|   } | |

| 7.3.7.5 Coding unit syntax | |
|---|---|
| | Descriptor |
| {{if( ( ( ( slice_type = = I \|\| (cbWidth = = 4 && cbHeight = = 4 ) \| \| pred_mode_ibc_flag) && CuPredMode[ x0 ][ y0 ] == MODE_INTRA) \|\| (slice_type != I && !(cb Width = = 4 && cbHeight = = 4 ) && ! pred_mode_ibc_flag && CuPredMode[ x0 ][ y0 ] != MODE_INTRA ) ) && cbWidth <= 64 && cbHeight <= 64 && sps_plt _enabled_flag && cu_skip_flag[ x0 ][ y0 ] = = 0 && modeType != MODE_INTER)<br>    pred_mode_plt_flag | ae(v)}} |
| } | |
| ... | |
| } | |

5.25 Embodiment #25

This embodiment describes the coding unit syntax. In this embodiment, the palette syntax is signaled if the current prediction mode is MODE_PLT.

a variable cbWidth specifying the width of the current coding block in luma samples, a variable cbHeight specifying the height of the current coding block m luma samples.

| 7.3.7.5 Coding unit syntax | |
|---|---|
| | Descriptor |
| coding_unit( x0, y 0, cbWidth, cbHeight, cqtDepth, tree Type, modeType ) {<br>  chType = tree Type = = DUAL_TREE_CHROMA? 1 : 0<br>  if( slice_type != I \| \| sps_ibc_enabled_flag \| \| sps_palette_enabled_flag ) {<br>    if(    treeType    !=    DUAL_TREE_CHROMA    &&<br>      !( ( ( cbWidth = = 4 && cbHeight = = 4 ) \| \| modeType = = MODE_TYPE_INTRA )<br>      && !sps_ibc_enabled_flag ) )<br>    cu_skip_flag[ x0 ][y0 ] | ae(v) |
|     if(  cu_skip_flag[ x0 ][ y0 ]  = =  0  &&  slice_type  !=  I<br>      && !( cbWidth = = 4 && cbHeight = = 4 ) && modeType = = MODE_TYPE_ALL )<br>    pred_mode_flag | ae(v) |
|     if(  ( ( slice_type  ==  I  &&  cu_skip_flag[ x0 ][ y0 ]  = =0 )  \| \|<br>      ( slice_type != I && ( CuPredMode[ chType ][ x0 ][ y0 ] != MODE_INTRA \| \|<br>      ( cbWidth = = 4 && cbHeight = = 4 && cu_skip_flag[ x0 ][ y0 ] = = 0 ) ) ) ) &&<br>      cbWidth <= 64 && cbHeight <= 64 && modeType != MODE_TYPE_INTER &&<br>      sps_ibc_enabled_flag && treeType != DUAL_TREE_CHROMA )<br>    pred_mode_ibc_flag | ae(v) |
|     if( ( ( ( slice_type = = I \| \| ( cbWidth = = 4 && cbHeight = = 4) \| \| sps_ibc_enabled_flag ) &&<br>        CuPredMode[ x0 ][ y0 ]        = =        MODE_INTRA)    \| \|<br>      ( slice_type !=I && !( cbWidth = = 4 && cbHeight = = 4) && !sps_ibc_enabled_flag<br>      && CuPredMode[ x0 ][ y0 ] != MODE_INTRA )) && sps_palette_enabled_flag &&<br>      cbWidth <= 64  &&  cbHeight <= 64  &&  &&  cu_skip_flag[ x0 ][ y0 ] = = 0 &&<br>      modeType != MODE_INTER )<br>    pred_mode_plt_flag | ae(v) |
|     }<br>  }<br>  if([[CuPredMode[ chType ][ x0 ][ y 0 ]    = =    MODE_INTRA    \| \|]]<br>    CuPredMode[ chType ][ x0 ] [y0 ] == MODE_PLT ) {<br>    if( treeType = = SINGLE_TREE \| \| treeType = = DUAL_TREE_LUMA ) {<br>      if( pred_mode_plt_flag) {<br>        if( treeType = = DUAL_TREE_LUMA)<br>          palette_coding( x0, y0, cbWidth, cbHeight, 0, 1 )<br>        else /* SINGLE_TREE */<br>          palette_coding( x0, y0, cbWidth, cbHeight, 0, 3 )<br>    } else {<br>      ...<br>    }<br>  }<br>...<br>} | |

5.26 Embodiment #26

This embodiment describes the derivation process of chroma intra prediction mode.

Derivation Process for Chroma Intra Prediction Mode

Input to this process are:

a luma location (xCb, yCb) specifying the top-left sample of the current chroma coding block relative to the top-left luma sample of the current picture, In this process, the chroma intra prediction mode IntraPredModeC[xCb][yCb] is derived.

The corresponding luma intra prediction mode lumaIntraPredMode is derived as follows:

If intra_mip_flag[xCb][yCb] is equal to 1, lumaIntraPredMode is set equal to INTRA_PLANAR.

Otherwise, if CuPredMode[0][xCb][yCb] is equal to MODE_IBC {{or MODE_PLT}}, lumaIntraPredMode is set equal to INTRA_DC.

Otherwise, lumaIntraPredMode is set equal to intraPred-ModeY[xCb+cbWidth/2][yCb+cbHeight/2].

5.27 Embodiment #27

This embodiment describes the picture reconstruction process with mapping process for luma samples.
Picture reconstruction with mapping process for luma samples, Inputs to this process are:
- a location (xCurr, yCurr) of the top-left sample of the current block relative to the top-left sample of the current picture,
- a variable nCurrSw specifying the block width,
- a variable nCurrSh specifying the block height,
- an (nCurrSw)×(nCurrSh) array predSamples specifying the luma predicted samples of the current block.
- an (nCurrSw)×(nCurrSh) array resSamples specifying the luma residual samples of the current block.

Outputs of this process is a reconstructed luma picture sample array recSamples.
The (nCurrSw)×(nCurrSh) array of mapped predicted luma samples predMapSamples is derived as follows:
If one of the following conditions is true, predMapSamples[i][j] is set equal to predSamples[i][j] for i=0 . . . nCurrSw−1, j=0 . . . nCurrSh−1:
CuPredMode[0][xCurr][yCurr] is equal to MODE_INTRA.
CuPredMode[0][xCurr][yCurr] is equal to MODE_IBC.
{{CuPredMode[0][xCurr][yCurr] is equal to MODE_PLT.}}
CuPredMode[0][xCurr][yCurr] is equal to MODE_INTER and ciip_flag[xCurr][yCurr] is equal to 1.
Otherwise (CuPredMode[0][xCurr][yCurr] is equal to MODE_INTER and ciip_flag[xCurr][yCurr] is equal to 0), the following applies:
. . .

5.28 Embodiment #28

This embodiment describes example scanning orders corresponding to the bullet 24 in Section 4.
Input to this process is a block width blkWidth and a block height blkHeight.
Output of this process are the arrays hReverScan[sPos][sComp] and vReverScan[sPos][sComp]. The array hReverScan represents the horizontal reverse scan order and the array vReverScan represents the vertical traverse scan order. The array index sPos specifies the scan position ranging from 0 to (blkWidth*blkHeight)−1, inclusive. The array index sComp equal to 0 specifies the horizontal component and the array index sComp equal to 1 specifies the vertical component. Depending on the value of blkWidth and blkHeight, the array hTravScan and vTravScan are derived as follows:

```
i = 0
forty = 0; y < blkHeight; y++ )
{
  if( y % 2 != 0 ){
    for( x = 0; x < blkWidth; x++ ) {
      hReverScan[ i ][ 0 ] = x
      hReverScan [ i ][ 1 ] = y
      i++
    }
  }
```

```
  else
  {
    for( x = blkWidth − 1; x >= 0; x−− ) {
      hReverScan [ i ][ 0 ] = x
      hReverScan [ i ][ 1 ] = y
      i++
    }
  }
}
i = 0
for( x = 0; x < blkWidth; x++)
{
  if( x % 2 != 0)
  {
    for( y = 0; y < blkHeight; y++ ) {
      vReverScan[ i ][ 0 ] = x
      vReverScan [ i ][ 1 ] = y
      i++
    }
  }
  else
  {
    for( y = blkHeight − 1; y >= 0; y−− ) {
      vReverScan [ i ][ 0 ] = x
      vReverScan [ i ][ 1 ] = y
      i++
    }
  }
}
```

Figure 6:
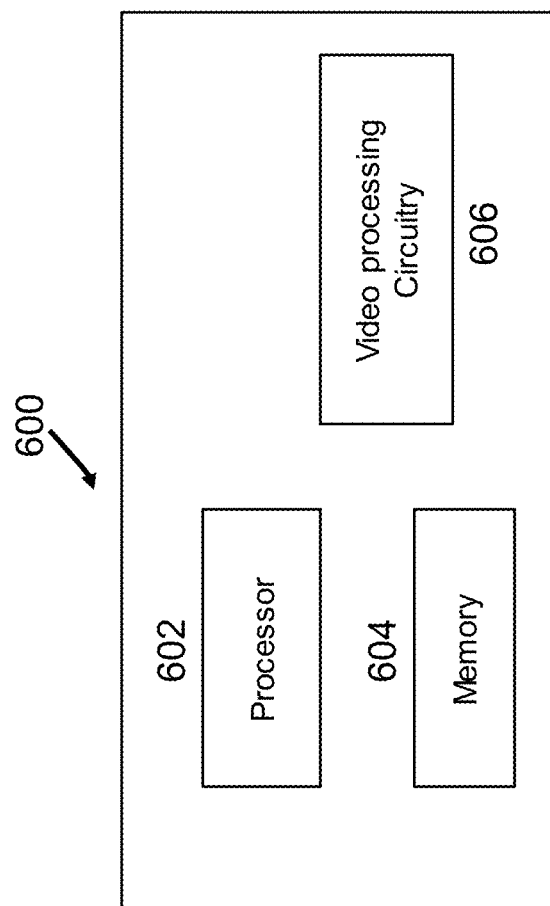
FIG. 6 is a block diagram of an example of a video processing apparatus.

FIG. 6 is a block diagram of a video processing apparatus 600. The apparatus 600 may be used to implement one or more of the methods described herein. The apparatus 600 may be embodied in a smartphone, tablet, computer, Internet of Things (IoT) receiver, and so on. The apparatus 600 may include one or more processors 602, one or more memories 604 and video processing hardware 606. The processor(s) 602 may be configured to implement one or more methods described in the present document. The memory (memories) 604 may be used for storing data and code used for implementing the methods and techniques described herein. The video processing hardware 606 may be used to implement, in hardware circuitry, some techniques described in the present document. In some embodiments, the hardware 606 may be at least partly internal to the processors 602 (e.g., a graphics co-processor).

Figure 8:
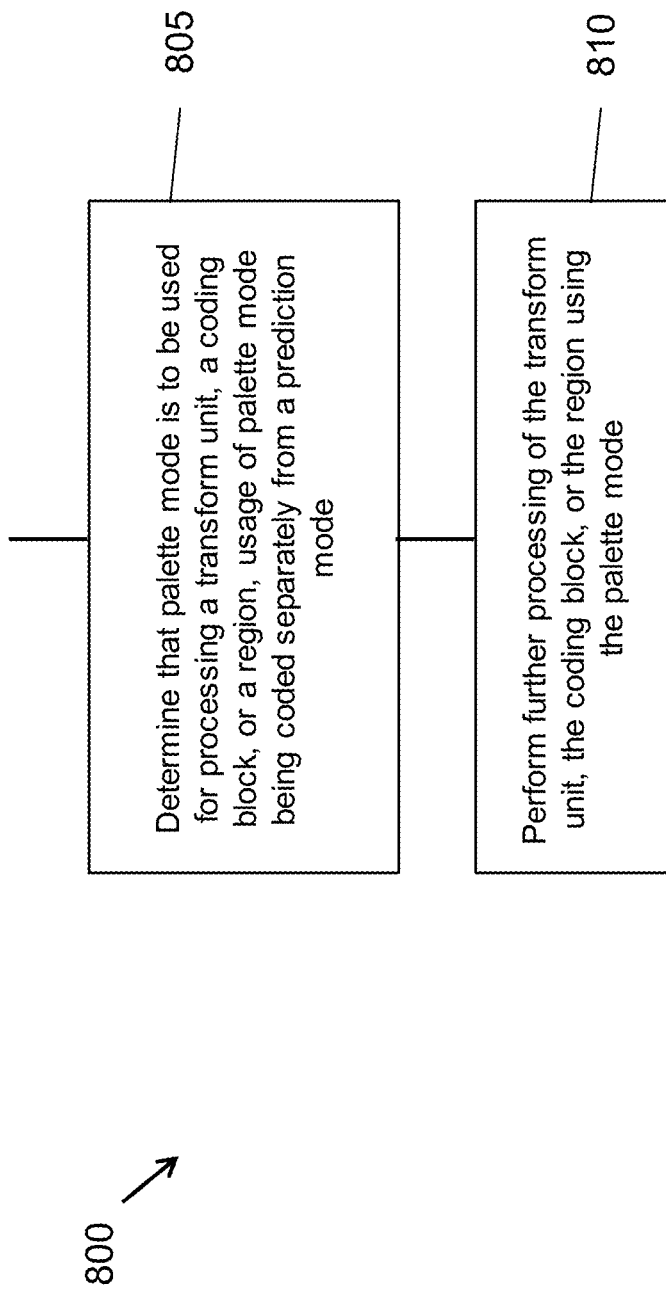
FIG. 8 is a flowchart for an example of a video processing method.

FIG. 8 is a flowchart for a method 800 of processing a video. The method 800 includes determining (805) that palette mode is to be used for processing a transform unit, a coding block, or a region, usage of palette mode being coded separately from a prediction mode, and performing (810) further processing of the transform unit, the coding block, or the region using the palette mode.

With reference to method 800, some examples of palette mode coding and its use are described in Section 4 of the present document.

With reference to method 800, a video block may be encoded in the video bitstream in which bit efficiency may be achieved by using a bitstream generation rule related to palette mode coding.

The methods can include wherein the prediction mode is coded before indication of the usage of the palette mode.

The methods can include wherein the usage of palette mode is conditionally signaled based on the prediction mode.

The methods can include wherein the prediction mode is intra block copy mode, and signaling of the indication of the usage of palette mode is skipped.

The methods can include wherein the indication of the usage of palette mode is determined to be false based on a current prediction mode being intra block copy mode.

The methods can include wherein the prediction mode is inter mode, and signaling of the indication of the usage of palette mode is skipped.

The methods can include wherein the indication of the usage of palette mode is determined to be false based on a current prediction mode being inter mode.

The methods can include wherein the prediction mode is intra mode, and signaling of the indication of the usage of palette mode is skipped.

The methods can include wherein the indication of the usage of palette mode is determined to be false based on a current prediction mode being intra mode.

The methods can include wherein the prediction mode is intra mode, and signaling of the indication of the usage of palette mode is skipped.

The methods can include wherein the prediction mode is intra block copy mode, and signaling of the indication of the usage of palette mode is performed.

The methods can include wherein the indication of the usage of palette mode is signaled based on a picture, a slice, or a tile group type.

The methods can include wherein the palette mode is added as a candidate for the prediction mode.

The methods can include wherein the prediction mode includes one or more of: intra mode, intra block copy mode, or palette modes for intra slices, inter slices, I pictures, P pictures, B pictures, or intra tile groups.

The methods can include wherein the prediction mode includes two or more of: intra mode, inter mode, intra block copy mode, or palette mode.

The methods can include wherein the usage of palette mode is indicated via signaling or derived based on a condition.

The methods can include wherein the condition includes one or more of: a block dimension of a current block, a prediction mode of the current block, a quantization parameter (QP) of the current block, a palette flag of neighboring blocks, an intra block copy flag of neighboring blocks, an indication of a color format, a separate or a dual coding tree structure, or a slice type or a group type or a picture type.

The methods can include wherein the usage of palette mode is signaled or derived based on a slice level flag, a tile group level flag, or a picture level flag.

The methods can include wherein indication of usage of intra block copy mode is signaled or derived based on a slice level flag, a tile group level flag, or a picture level flag.

With reference to items 6 to 9 disclosed in the previous section, some embodiments may preferably use the following solutions.

One solution may include a method of video processing, comprising performing a conversion between a current video block of a picture of a video and a bitstream representation of the video in which information about whether or not an intra block copy mode is used in the conversion is signaled in the bitstream representation or derived based on a coding condition of the current video block; wherein the intra block copy mode comprises coding the current video block from another video block in the picture. The following features may be implemented in various embodiments wherein the coding condition includes block dimensions of the current video block.

wherein the coding condition includes a prediction mode of the current video block or a quantization parameter used in the conversion for the current video block.

With reference to items 13-15 disclosed in the previous section, some embodiments may preferably implement the following solutions.

A solution may include a method for determining whether or not a deblocking filter is to be applied during a conversion of a current video block of a picture of video, wherein the current video block is coded using a palette mode coding in which the current video block is represented using representative sample values that are fewer than total pixels of the current video block; and performing the conversion such that the deblocking filter is applied in case the determining is that the deblocking filter is to be applied.

Another solution may include a method of video processing, comprising determining a quantization or an inverse quantization process for use during a conversion between a current video block of a picture of a video and a bitstream representation of the video, wherein the current video block is coded using a palette mode coding in which the current video block is represented using representative sample values that are fewer than total pixels of the current video block; and performing the conversion based on the determining the quantization or the inverse quantization process. Additional features may include:

wherein the quantization or the inverse quantization process determined for the current video block is different from another quantization or another inverse quantization process applied to another video block that is coded differently from the palette coding mode.

wherein the conversion includes encoding the current video block into the bitstream representation.

wherein the conversion includes decoding the bitstream representation to generate the current video block of the video.

wherein the determining uses a decision process that is identical to another decision process used for conversion of another video block that is intra coded.

It will be appreciated that the disclosed techniques may be embodied in video encoders or decoders to improve compression efficiency using enhanced coding tree structures.

With reference to items 16 to 21 in the previous section, some solutions may be as follows:

A method of video processing, comprising: determining, for a conversion between a current video block of a video comprising multiple video blocks and a bitstream representation of the video, that the current video block is a palette-coded block; based on the determining, performing a list construction process of most probable mode by considering the current video block to be an intra coded block, and performing the conversion based on a result of the list construction process; wherein the palette-coded block is coded or decoded using a palette or representation sample values.

The above method, wherein the list construction process treats a neighboring palette-coded block as an intra block with a default mode.

A method of video processing, comprising: determining, for a conversion between a current video block of a video comprising multiple video blocks and a bitstream representation of the video, that the current video block is a palette-coded block; based on the determining, performing a list construction process of most probable mode by considering the current video block to be a non-intra coded block, and performing the conversion based on a result of the list construction process; wherein the palette-coded block is coded or decoded using a palette or representation sample values.

The above method, wherein the list construction process treats a neighboring palette-coded block as an inter-coded block when fetching an intra mode of the neighboring palette coded block.

A method of video processing, comprising: determining, for a conversion between a current video block of a video comprising multiple video blocks and a bitstream representation of the video, that the current video block is a palette-coded block; based on the determining, performing a list construction process by considering the current video block to be an unavailable block, and performing the conversion based on a result of the list construction process; wherein the palette-coded block is coded or decoded using a palette or representation sample values.

The above method, wherein the list construction process is for a history based motion vector prediction.

The above method, wherein the list construction process is for a MERGE or an advanced motion vector prediction mode.

The above methods, wherein the determining further includes determining based on content of the video.

The above methods, wherein the determining corresponds to a filed in the bitstream representation.

A method of video processing, comprising: determining, during a conversion between a current video block and a bitstream representation of the current video block, that the current video block is a palette coded block, determining, based on the current video block being the palette coded block, a range of context coded bins used for the conversion; and performing the conversion based on the range of context coded bins.

The above method, wherein bins of the current video block that fall outside the range are coded using bypass coding technique or decoded using a bypass decoding technique during the conversion.

The above methods, wherein the conversion comprises encoding the video into the bitstream representation.

The above methods, wherein the conversion comprises decoding the bitstream representation to generate the video.

Figure 24:
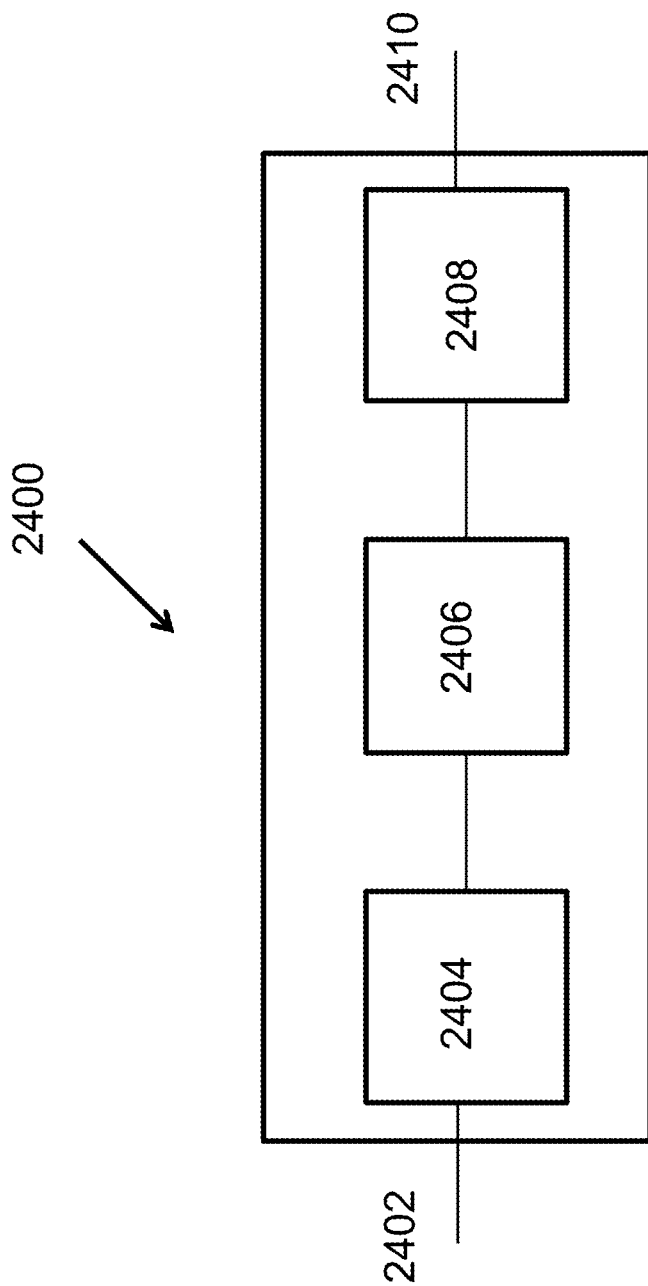
FIG. 24 is a block diagram showing an example video processing system 2400 in which various techniques disclosed herein may be implemented.

FIG. 24 is a block diagram showing an example video processing system 2400 in which various techniques disclosed herein may be implemented. Various implementations may include some or all of the components of the system 2400. The system 2400 may include input 2402 for receiving video content. The video content may be received in a raw or uncompressed format, e.g., 8 or 10 bit multi-component pixel values, or may be in a compressed or encoded format. The input 1902 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 2400 may include a coding component 2404 that may implement the various coding or encoding methods described in the present document. The coding component 2404 may reduce the average bitrate of video from the input 2402 to the output of the coding component 2404 to produce a coded representation of the video. The coding techniques are therefore sometimes called video compression or video transcoding techniques. The output of the coding component 2404 may be either stored, or transmitted via a communication connected, as represented by the component 2406. The stored or communicated bitstream (or coded) representation of the video received at the input 2402 may be used by the component 2408 for generating pixel values or displayable video that is sent to a display interface 2410. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 25:
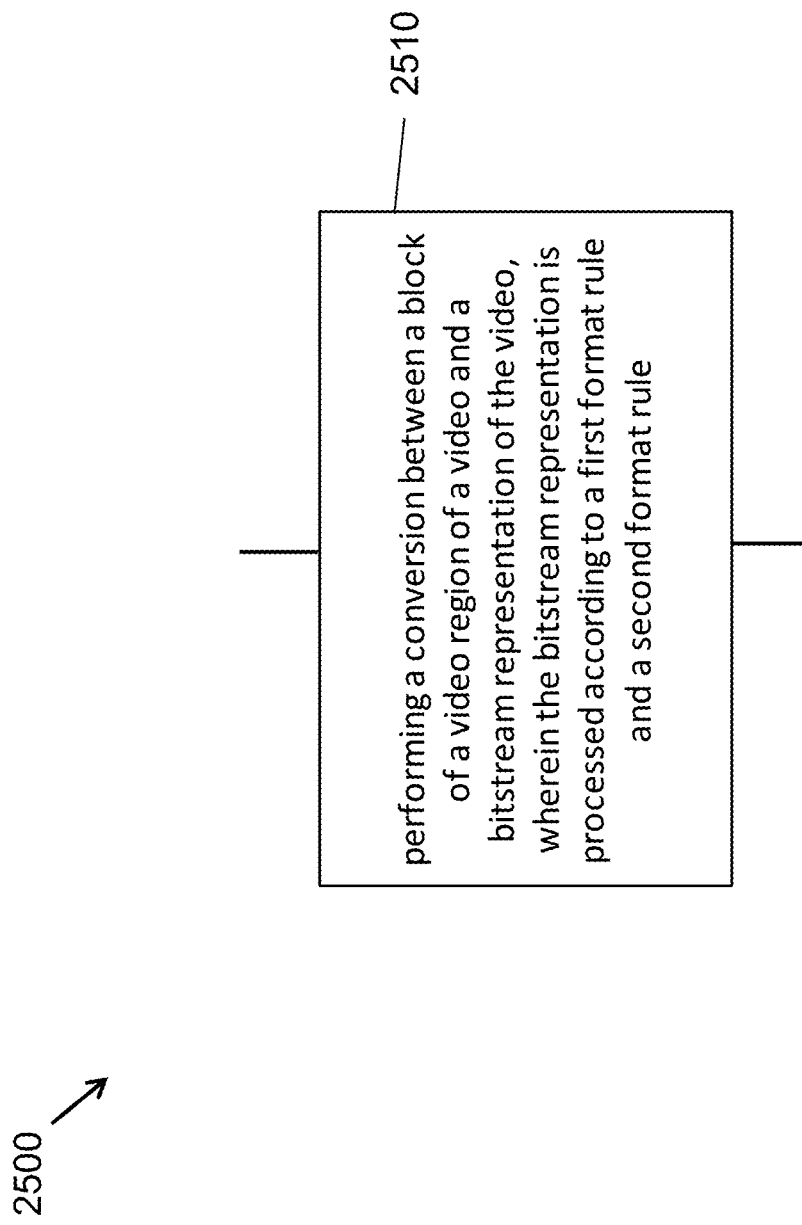
FIG. 25 is a flowchart representation of another method for video processing in accordance with the present technology.

FIG. 25 is a flowchart representation of a method 2500 for video processing in accordance with the present technology. The method 2500 includes, at operation 2510, performing a conversion between a block of a video region of a video and a bitstream representation of the video. The bitstream representation is processed according to a first format rule that specifies whether a first indication of usage of a palette mode is signaled for the block and a second format rule that specifies a position of the first indication relative to a second indication of usage of a prediction mode for the block.

In some embodiments, the video region comprises a transform unit, a coding unit, a prediction unit, or a region of the video. In some embodiments, the second indication of usage of the prediction mode is positioned prior to the first indication of usage of the palette mode in the bitstream representation.

In some embodiments, the first indication of usage of the palette mode is conditionally included in the bitstream representation based on the second indication of usage of the prediction mode. In some embodiments, the first indication of usage of the palette mode is skipped in the bitstream representation in case the second indication of usage of the prediction mode indicates an intra block copy (IBC) prediction mode. In some embodiments, the first indication of usage of the palette mode is skipped in the bitstream representation in case the second indication of usage of the prediction mode indicates an inter prediction mode. In some embodiments, the first indication of usage of the palette mode is skipped in the bitstream representation in case the second indication of usage of prediction mode indicates an intra prediction mode. In some embodiments, the first indication of usage of the palette mode is skipped in the bitstream representation in case the second indication of usage of prediction mode indicates a skip mode. In some embodiments, skipping the first indication of usage of the palette mode in the bitstream representation indicates that the palette mode is not used.

In some embodiments, the first indication of usage of the palette mode is coded in the bitstream in case the second indication of usage of prediction mode indicates an IBC prediction mode. In some embodiments, the first indication of usage of the palette mode is coded in the bitstream in case the second indication of usage of prediction mode indicates an intra prediction mode. In some embodiments, the prediction mode is not a Pulse-Code Modulation (PCM) mode. In some embodiments, the first indication of usage of the palette mode is coded prior to an indication of usage of a PCM mode in the bitstream representation. In some embodiments, an indication of usage of a PCM mode is skipped in the bitstream representation. In some embodiments, an indication of the IBC mode is coded in the bitstream representation. In some embodiments, in case an intra prediction mode is used, a flag in the bitstream representations indicates whether the palette mode or the IBC mode is signaled in the bitstream representation. In some embodiments, the flag is skipped based on a condition of the block, the condition comprising a dimension of the block, whether the IBC mode is enabled for a region associated with the block, or whether the palette mode is enabled for the region associated with the block.

In some embodiments, the first indication of usage of the palette mode is coded in the bitstream in case the second indication of usage of prediction mode indicates an inter prediction mode. In some embodiments, the first indication of usage of the palette mode is coded after at least one of: an indication of a skip mode, the prediction mode, or an indication of usage of a PCM mode. In some embodiments, the first indication of usage of the palette mode is coded after an indication of a skip mode or the prediction mode and is coded before an indication of usage of a PCM mode.

In some embodiments, the first indication of usage of the palette mode is positioned prior to the second indication of usage of the prediction mode in the bitstream representation. In some embodiments, the first indication of usage of the palette mode is positioned after the second indication of usage of the prediction mode, the second indication of usage of the prediction mode indicating an intra or an inter prediction mode in the bitstream representation. In some embodiments, the first indication of usage of the palette mode is signaled based on a picture, a slice, or a tile group type. In some embodiments, the first indication of usage of the palette mode comprises a first flag indicating that the palette mode is enabled for the block. In some embodiments, the first indication of usage of the palette mode is conditionally included in the bitstream representation based on a first flag indicating that the palette mode is enabled in a sequence level, a picture level, a tile group level, or a tile level. In some embodiments, another flag indicating a PCM mode of the block is included in the bitstream representation in case the palette mode is disabled for the block. In some embodiments, the first flag is context coded based on information of one or more neighboring blocks of the current block. In some embodiments, the first flag is coded without context information from one or more neighboring blocks of the current block.

In some embodiments, the second indication of usage of a prediction mode comprises a second flag indicating the prediction mode. In some embodiments, in case the second flag in the bitstream representation indicates that the prediction mode is an inter mode, the bitstream representation further comprising a third flag indicating whether an intra block copy mode is enabled. In some embodiments, in case the second flag in the bitstream representation indicates that the prediction mode is an intra mode, the bitstream representation further comprising a third flag indicating whether an intra block copy mode is enabled. In some embodiments, the third flag is conditionally included in the bitstream representation based on a dimension of the block.

In some embodiments, the block is a coding unit, and the second flag in the bitstream representation indicates that the prediction mode is an intra mode. In some embodiments, the first flag is conditionally included in the bitstream representation based on a dimension of the block.

Figure 26:
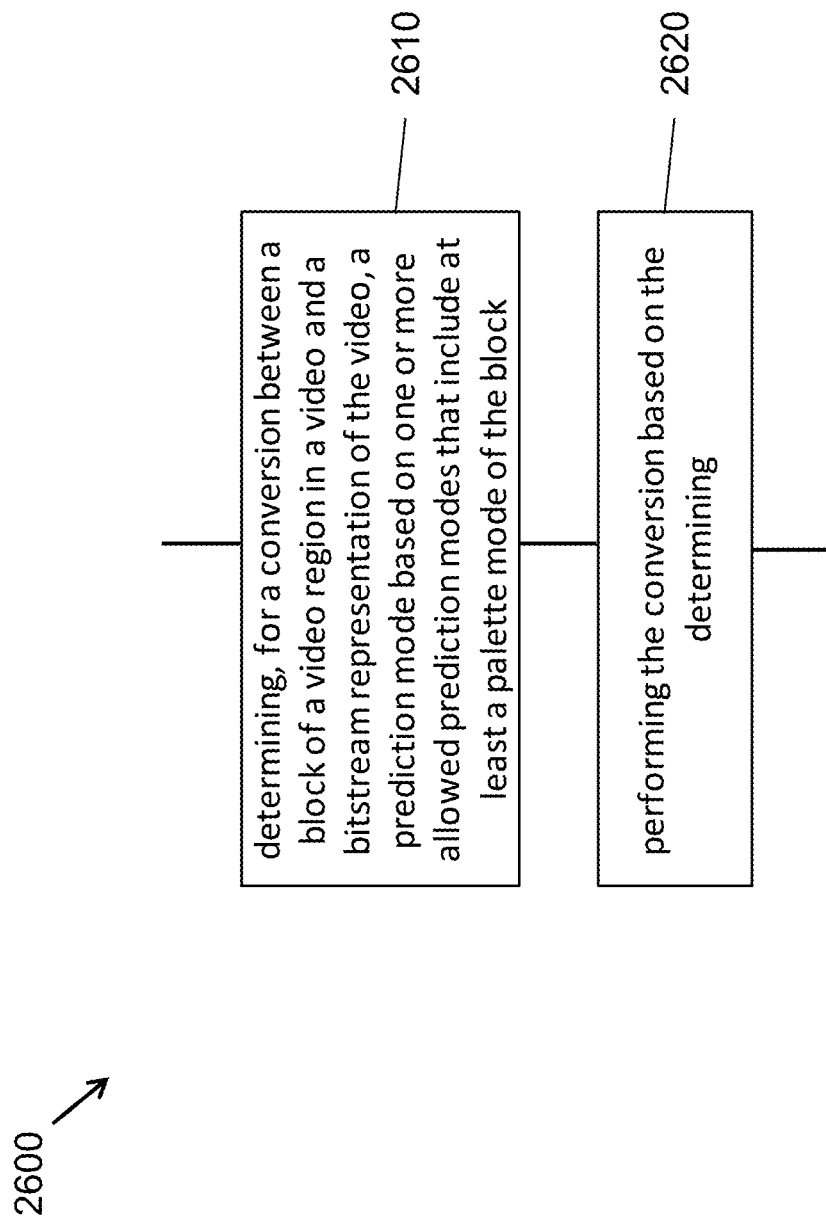
FIG. 26 is another flowchart representation of another method for video processing in accordance with the present technology.

FIG. 26 is a flowchart representation of a method 2600 for video processing in accordance with the present technology. The method 2600 includes, at operation 2610, determining, for a conversion between a block of a video region in a video and a bitstream representation of the video, a prediction mode based on one or more allowed prediction modes that include at least a palette mode of the block. An indication of usage of the palette mode is determined according to the prediction mode. The method 2600 includes, at operation 2620, performing the conversion based on the determining.

In some embodiments, the one or more allowed prediction modes comprise an intra mode. In some embodiments, the one or more allowed prediction modes comprise an intra block copy (IBC) mode. In some embodiments, the one or more allowed prediction modes comprise an inter mode.

In some embodiments, the video region includes an intra slice, an intra picture, or an intra tile group. In some embodiments, the one or more allowed prediction modes comprise the intra mode, the intra block copy mode, and the palette mode.

In some embodiments, the video region includes an inter slice, an inter picture, an inter tile group, a P slice, a B slice, a P picture, or a B picture. In some embodiments, the one or more allowed prediction modes comprise the intra mode, the intra block copy mode, the palette mode, and the inter mode.

In some embodiments, the block has a dimension of 4×4. In some embodiments, the one or more allowed prediction modes exclude the inter mode in case the block has a dimension of 4×4.

In some embodiments, the bitstream representation includes at least a prediction mode index representing the one or more allowed prediction modes in case the block is not coded in a skip mode, wherein the prediction mode index is represented using one or more binary bins.

In some embodiments, the prediction mode index is represented using three binary bins, wherein a first bin value of '1' indicates an intra mode, wherein the first bin value of '0' and a second bin value of '0' indicate an inter mode, wherein the first bin value of '0', the second bin value of '1', and a third bin value of '0' indicate an IBC mode, and wherein the first bin value of '0', the second value of '1', and the third bin value of '1' indicate a palette mode.

In some embodiments, the prediction mode index is represented using two binary bins, wherein a first bin value of '1' and a second bin value of '0' indicate an intra mode, wherein the first bin value of '0' and the second bin value of '0' indicate an inter mode, wherein the first bin value of '0' and the second bin value of '1' indicate an IBC mode, and wherein the first bin value of '1' and the second bin value of '1' indicate a palette mode.

In some embodiments, the prediction mode index is represented using one binary bin in case a current slice of the video is an intra slice and an IBC mode is disabled, a first bin value of '0' indicating an intra mode, and a second bin value of '1' indicating a palette mode.

In some embodiments, the prediction mode index is represented using two binary bins in case a current slice of the video is not an intra slice and an IBC mode is disabled, wherein a first bin value of '1' indicates an intra mode, wherein the first bin value of '0' and a second bin value of '0' indicate an inter mode, and wherein the first bin value of '0' and the second bin value of '1' indicate a palette mode. In some embodiments, the prediction mode index is represented using two binary bins in case a current slice of the video is an intra slice and an IBC mode is enabled, wherein a first bin value of '1' indicates the IBC mode, wherein the first bin value of '0' and a second bin value of '1' indicate a palette mode, and wherein the first bin value of '0' and the second bin value of '0' indicate an intra mode. In some embodiments, the indication of the usage of the IBC mode signaled in a Sequence Parameter Set (SPS) of the bitstream representation.

In some embodiments, the prediction mode index is represented using three binary bins, wherein a first bin value of '1' indicates an inter mode, wherein the first bin value of '0' and a second bin value of '1' indicate an intra mode, wherein the first bin value of '0', the second bin value of '0', and a third bin value of '1' indicate an IBC mode, and wherein the first bin value of '0', the second bin value of '0', and the third bin value of '0' indicate a palette mode.

In some embodiments, the prediction mode index is represented using three binary bins, wherein a first bin value of '1' indicates an intra mode, wherein the first bin value of '0' and a second bin value of '1' indicate an inter mode, wherein the first bin value of '0', the second bin value of '0', and a third bin value of '1' indicate an IBC mode, and wherein the first bin value of '0', the second bin value of '0', and the third bin value of '0' indicate a palette mode.

In some embodiments, the prediction mode index is represented using three binary bins, wherein a first bin value of '0' indicates an inter mode, wherein the first bin value of '1' and a second bin value of '0' indicate an intra mode, wherein the first bin value of '1', the second bin value of '1', and a third bin value of '1' indicate an IBC mode, and wherein the first bin value of '1', the second bin value of '1', and the third bin value of '0' indicate a palette mode.

In some embodiments, signaling of one of the one or more binary bins is skipped in the bitstream representation in case a condition is satisfied. In some embodiments, the condition comprises a dimension of the block. In some embodiments, the condition comprises a prediction mode being disabled, and wherein a binary bin corresponding to the prediction mode is skipped in the bitstream representation.

Figure 27:
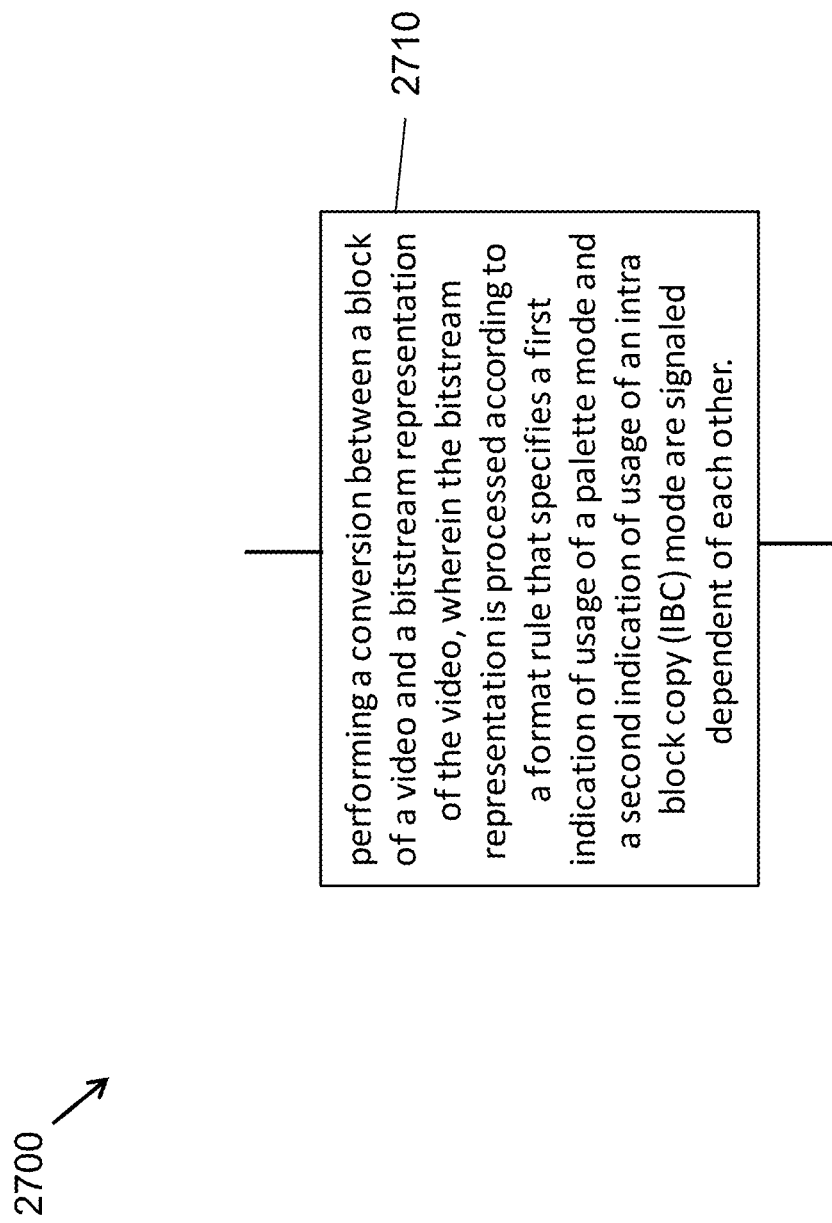
FIG. 27 is another flowchart representation of another method for video processing in accordance with the present technology.

FIG. 27 is a flowchart representation of a method 2700 for video processing in accordance with the present technology. The method 2700 includes, at operation 2710, performing a conversion between a block of a video and a bitstream representation of the video. The bitstream representation is processed according to a format rule that specifies a first indication of usage of a palette mode and a second indication of usage of an intra block copy (IBC) mode are signaled dependent of each other.

In some embodiments, the format rule specifies that the first indication is signaled in the bitstream representation in case a prediction mode of the block is equal to a first prediction mode that is not the IBC mode. In some embodiments, the format rule specifies that the second indication is signaled in the bitstream representation in case a prediction mode of the block is equal to a first prediction mode that is not the palette mode. In some embodiments, the first prediction mode is an intra mode.

Figure 28:
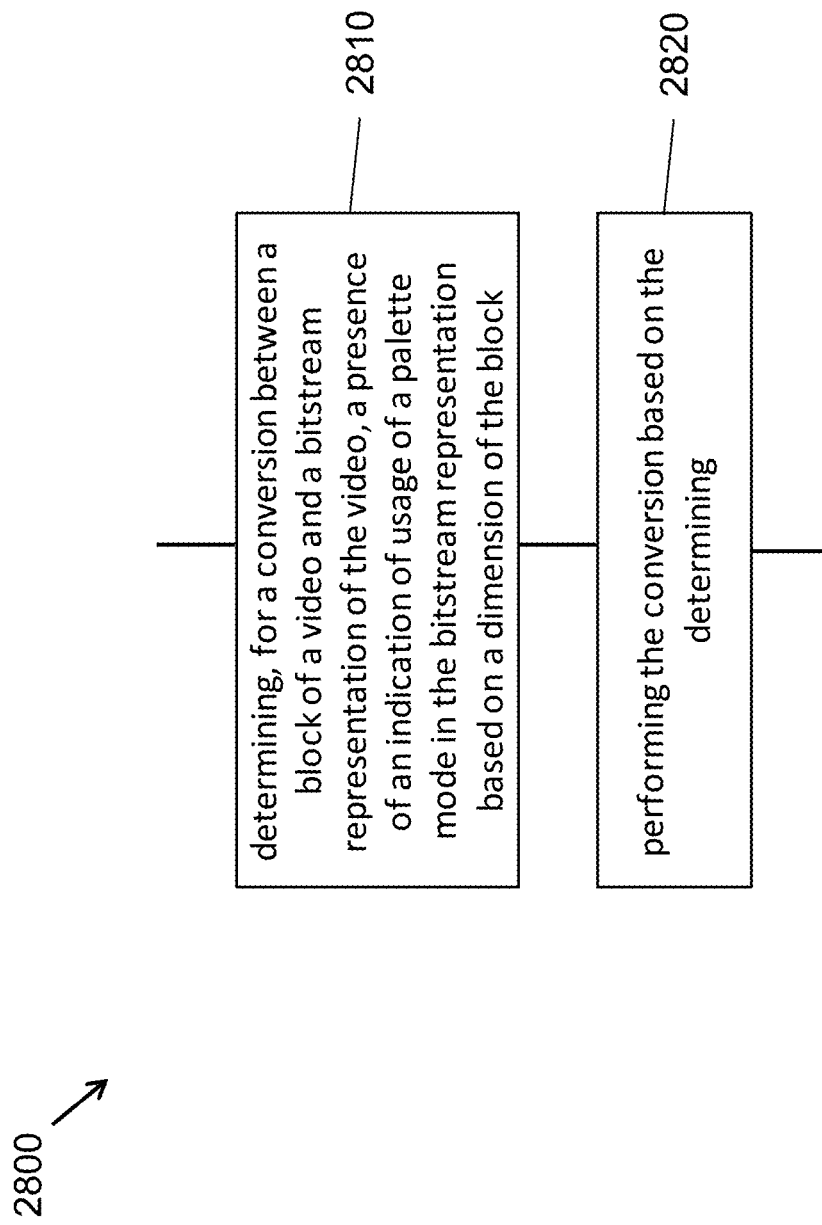
FIG. 28 is another flowchart representation of another method for video processing in accordance with the present technology.

FIG. 28 is a flowchart representation of a method 2800 for video processing in accordance with the present technology. The method 2800 includes, at operation 2810, determining, for a conversion between a block of a video and a bitstream representation of the video, a presence of an indication of usage of a palette mode in the bitstream representation based on a dimension of the block. The method 2800 includes, at operation 2820, performing the conversion based on the determining.

Figure 29:
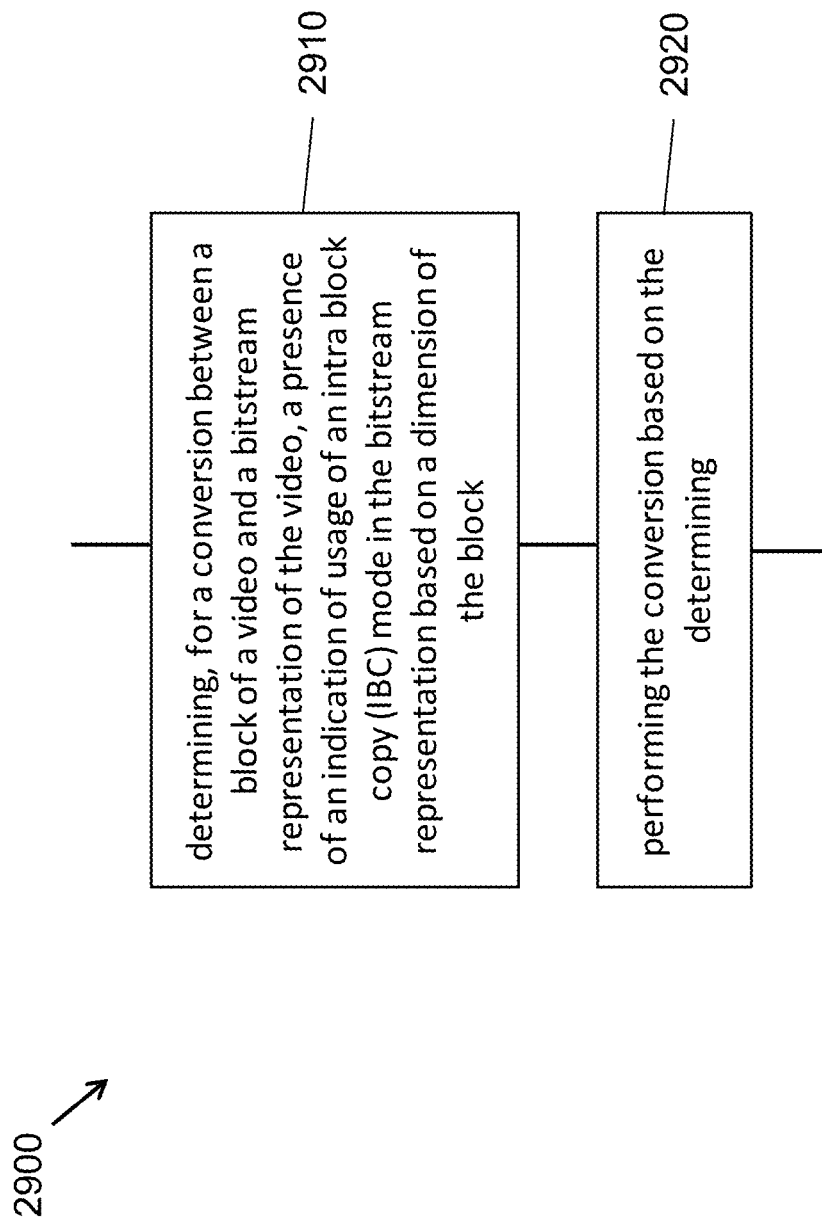
FIG. 29 is another flowchart representation of another method for video processing in accordance with the present technology.

FIG. 29 is a flowchart representation of a method 2900 for video processing in accordance with the present technology. The method 2900 includes, at operation 2910, determining, for a conversion between a block of a video and a bitstream representation of the video, a presence of an indication of usage of an intra block copy (IBC) mode in the bitstream representation based on a dimension of the block. The method 2900 includes, at operation 2920, performing the conversion based on the determining. In some embodiments, the dimension of the block comprises at least one of: a number of samples in the block, a width of the block, or a height of the block.

In some embodiments, the indication is signaled in the bitstream representation in case the width of the block is equal to or smaller than a threshold. In some embodiments, the indication is signaled in the bitstream representation in case the height of the block is equal to or smaller than a threshold. In some embodiments, the threshold is 64.

In some embodiments, the indication is signaled in the bitstream representation in case the width and the height of the block is larger than a threshold. In some embodiments, the threshold is 4. In some embodiments, the indication is signaled in the bitstream representation in case the number of samples in the block is larger than a threshold. In some embodiments, the threshold is 16. In some embodiments, the indication is signaled in the bitstream representation in case a width of the block is equal to a height of the block.

In some embodiments, the indication is not present in the bitstream representation in case (1) the width of the block is greater than a first threshold, (2) the height of the block is greater than a second threshold, or (3) the number of samples in the block is equal to or smaller than a third threshold. In some embodiments, the first threshold and the second threshold are 64. In some embodiments, the third threshold is 16.

In some embodiments, the determining is further based on a characteristic associated with the block. In some embodiments, the characteristic comprises a prediction mode of the block. In some embodiments, the characteristic comprises a quantization parameter of the block. In some embodiments, the characteristic comprises a palette flag of a neighboring block of the block. In some embodiments, the characteristic comprises an IBC flag of a neighboring block of the block. In some embodiments, the characteristic comprises an indication of a color format of the block. In some embodiments, the characteristic comprises a coding tree structure of the block. In some embodiments, the characteristic comprises a slice group type, a tile group type, or a picture type of the block.

Figure 30:
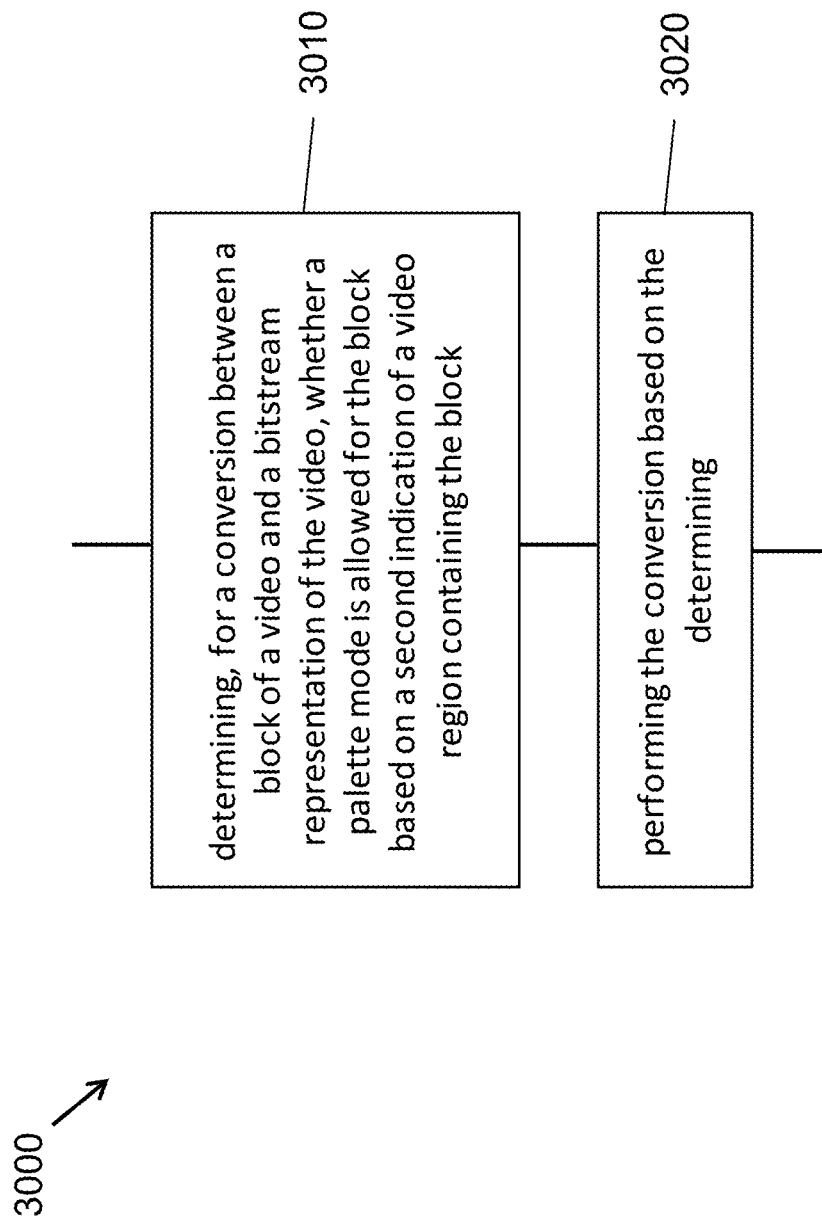
FIG. 30 is another flowchart representation of another method for video processing in accordance with the present technology.

FIG. 30 is a flowchart representation of a method 3000 for video processing in accordance with the present technology. The method 3000 includes, at operation 3010, determining, for a conversion between a block of a video and a bitstream representation of the video, whether a palette mode is allowed for the block based on a second indication of a video region containing the block. The method 3000 also includes, at operation 3020, performing the conversion based on the determining.

In some embodiments, the video region comprises a slice, a tile group, or a picture. In some embodiments, the bitstream representation excludes an explicit indication of whether the palette mode is allowed in case the second indication indicates that a fractional motion vector difference is enabled. In some embodiments, the second indication is represented as a flag that is present in the bitstream representation. In some embodiments, the second indication indicates whether the palette mode is enabled for the video region. In some embodiments, the bitstream representation excludes an explicit indication of whether the palette mode is allowed in case the second indication indicates the palette mode is disabled for the video region. In some embodiments, the palette mode is disallowed for the block in case the bitstream representation excludes an explicit indication of whether the palette mode is allowed.

Figure 31:
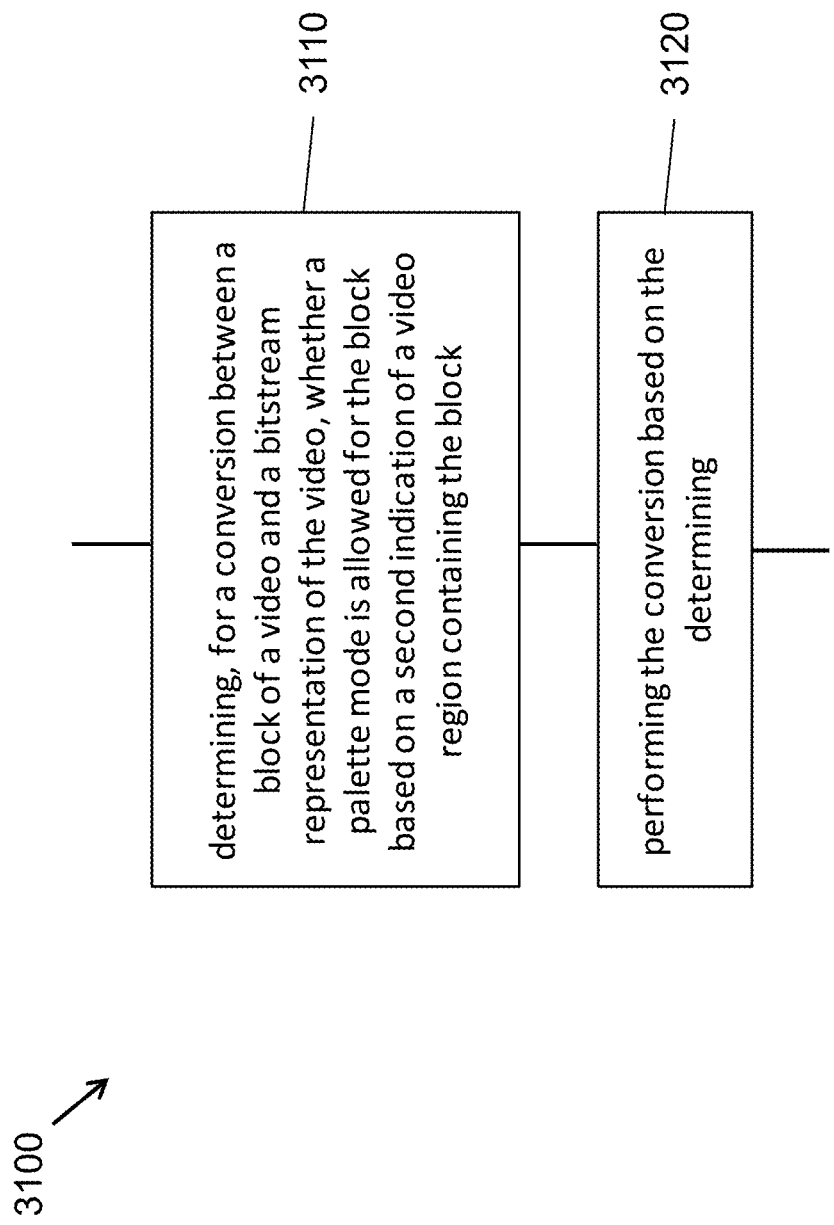
FIG. 31 is another flowchart representation of another method for video processing in accordance with the present technology.

FIG. 31 is a flowchart representation of a method 3100 for video processing in accordance with the present technology.

The method 3100 includes, at operation 3110, determining, for a conversion between a block of a video and a bitstream representation of the video, whether an intra block copy (IBC) mode is allowed for the block based on a second indication of a video region containing the block. The method 3100 also includes, at operation 3120, performing the conversion based on the determining.

In some embodiments, the video region comprises a slice, a tile group, or a picture. In some embodiments, the bitstream representation excludes an explicit indication of whether the IBC mode is allowed in case the second indication indicates that a fractional motion vector difference is enabled. In some embodiments, the second indication is represented as a flag that is present in the bitstream representation. In some embodiments, the second indication indicates whether the IBC mode is enabled for the video region. In some embodiments, the bitstream representation excludes an explicit indication of whether the IBC mode is allowed in case the second indication indicates the IBC mode is disabled for the video region. In some embodiments, the IBC mode is disallowed for the block in case the bitstream representation excludes an explicit indication of whether the IBC mode is allowed.

Figure 32:
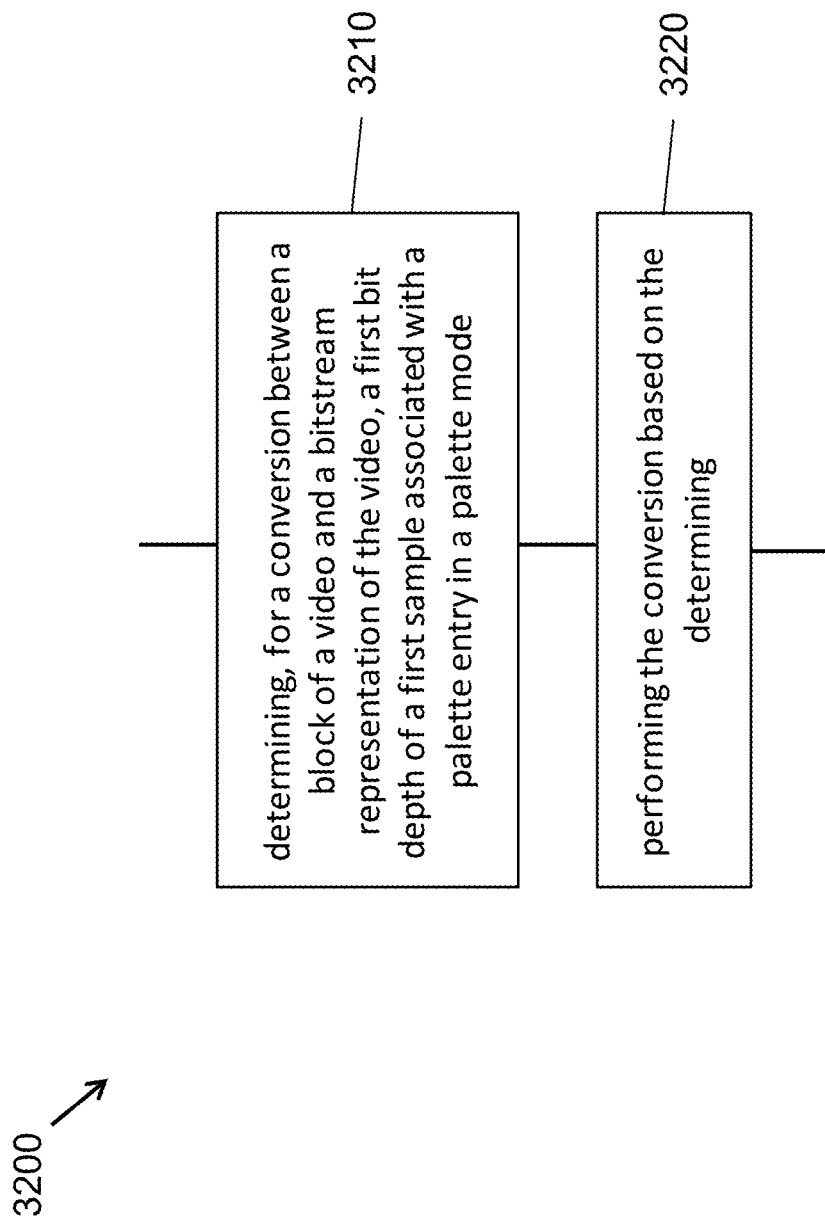
FIG. 32 is another flowchart representation of another method for video processing in accordance with the present technology.

FIG. 32 is a flowchart representation of a method 3200 for video processing in accordance with the present technology. The method 3200 includes, at operation 3210, determining, for a conversion between a block of a video and a bitstream representation of the video, a first bit depth of a first sample associated with a palette entry in a palette mode. The first bit depth is different from a second bit depth associated with the block. The method 3200 also includes, at operation 3220, performing the conversion based on the determining.

In some embodiments, the second bit depth comprises an internal bit depth for the block. In some embodiments, the second bit depth comprises a bit depth associated with an original sample of the block. In some embodiments, the second bit depth comprises a bit depth associated with a reconstructed sample of the block. In some embodiments, the first bit depth is a positive integer. In some embodiments, the first bit depth is equal to 8. In some embodiments, the first bit depth is larger than the second bit depth. In some embodiments, the first bit depth is smaller than the second bit depth. In some embodiments, the first bit depth is determined based on a dimension of the block. In some embodiments, the first bit depth is determined based on a quantization parameter of the block. In some embodiments, the first bit depth is determined based on an indication of a color format of the block. In some embodiments, the first bit depth is determined based on a coding tree structure of the block. In some embodiments, the first bit depth is determined based on a slice group type, a tile group type, or a picture type of the block.

In some embodiments, the first bit depth is determined based on a number of palette entries associated with the block. In some embodiments, the first bit depth is determined based on a number of entries in a palette predictor associated with the block. In some embodiments, the first bit depth is determined based on one or more indices of a color component of the block.

In some embodiments, a second sample is associated with another palette entry in the palette mode, the second sample having a third bit depth that is different than the first bit depth. In some embodiments, the third bit depth is larger than the second bit depth. In some embodiments, the third bit depth is smaller than the second bit depth In some embodiments, a third sample of the block is reconstructed based on shifting a value of the first sample by M bits, M being a positive integer. In some embodiments, shifting the value of the first sample comprises left shifting the first sample by M bits. In some embodiments, the first sample has a value of C, and wherein the reconstructed second sample has a value of $(C<<M)+(1<<(M-1))$. In some embodiments, shifting the value of the first sample comprises right shifting the first sample by M bits. In some embodiments, the first sample has a value of C, and wherein the reconstructed second sample has a value that is determined based on $(C+(1<<(M-1)))>>M$, the value being limited by a minimal value of 0 and a maximum value of $(1<<N)-1$. In some embodiments, M is determined based on a difference between the first bit depth and the second bit depth. In some embodiments, M is equal to the second bit depth minus the first bit depth. In some embodiments, M is equal to the first bit depth minus the second bit depth. In some embodiments, M is equal to 2. In some embodiments, M is determined based on a dimension of the block. In some embodiments, M is determined based on a quantization parameter of the block. In some embodiments, M is determined based on an indication of a color format of the block. In some embodiments, M is determined based on a coding tree structure of the block. In some embodiments, M is determined based on a slice group type, a tile group type, or a picture type of the block. In some embodiments, M is determined based on a number of palette entries associated with the block. In some embodiments, M is determined based on a number of prediction palette entries associated with the block. In some embodiments, M is determined based on a position of the first sample and the third sample in the block. In some embodiments, M is determined based on an index of a color component of the block.

In some embodiments, the method comprises determining the first sample associated with the palette entry based on a look-up operation performed on a table of samples. In some embodiments, values of the table of samples are signaled in a Sequence Parameter Set (SPS), a Video Parameter Set (VPS), a Picture Parameter Set (PPS), a picture header, a slice header, a tile group header, a row of a Largest Coding Unit (LCU), or a group of LCUs in the bitstream representation. In some embodiments, values of the table of samples are derived based on information in a Sequence Parameter Set (SPS), a Video Parameter Set (VPS), a Picture Parameter Set (PPS), a picture header, a slice header, a tile group header, a row of a Largest Coding Unit (LCU), or a group of LCUs in the bitstream representation.

Figure 33:
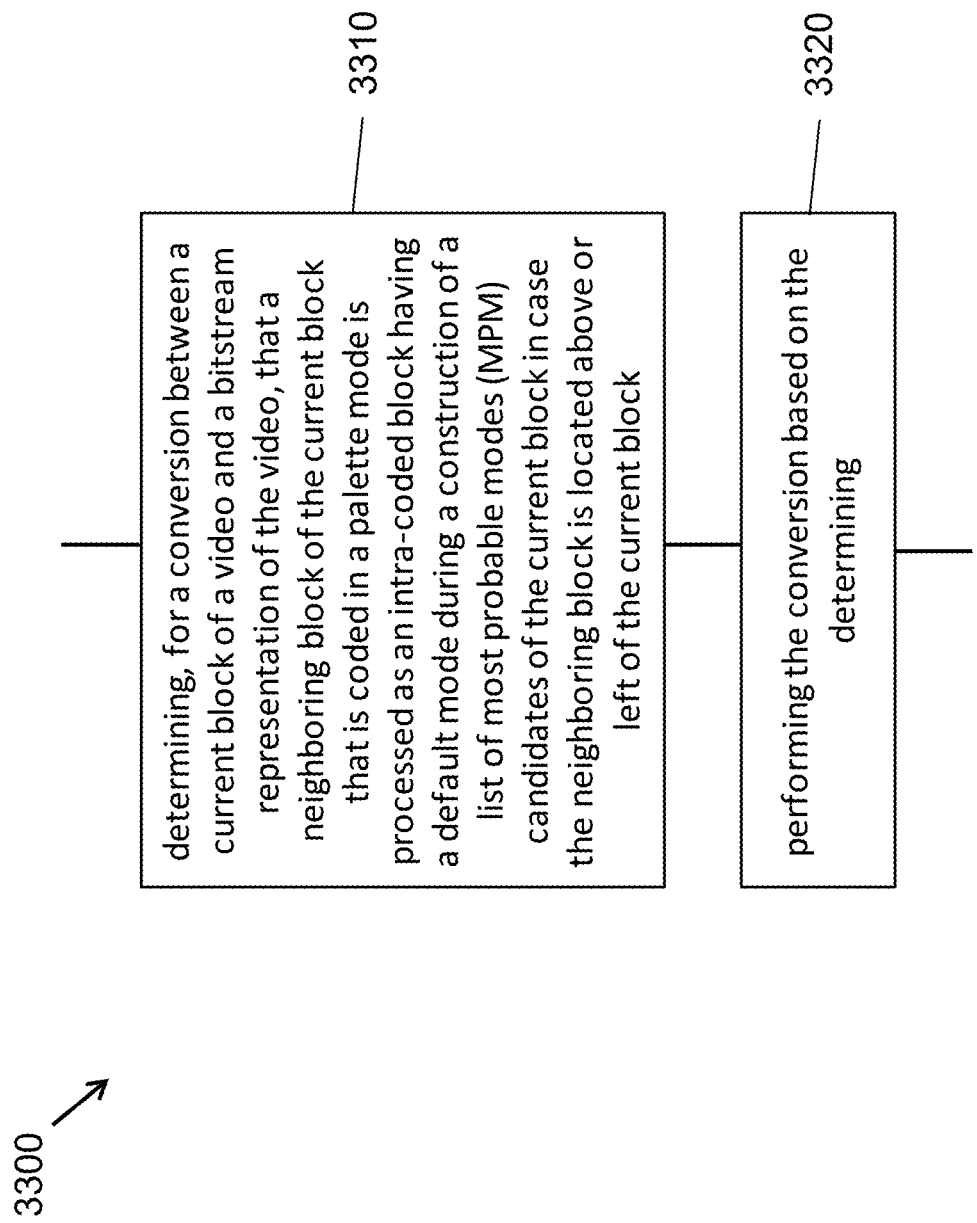
FIG. 33 is another flowchart representation of another method for video processing in accordance with the present technology.

FIG. 33 is a flowchart representation of a method 3300 for video processing in accordance with the present technology. The method 3300 includes, at operation 3310, determining, for a conversion between a current block of a video and a bitstream representation of the video, that a neighboring block of the current block that is coded in a palette mode is processed as an intra-coded block having a default mode during a construction of a list of most probable modes (MPM) candidates of the current block in case the neighboring block is located above or left of the current block. The method 3300 includes, at operation 3320, performing the conversion based on the determining.

In some embodiments, the default mode comprises a planar mode. In some embodiments, the default mode comprises a DC mode, a vertical mode, or a horizontal mode. In some embodiments, the default mode is signaled in a Dependency Parameter Set, a Sequence Parameter Set, a Video Parameter Set, a Picture Parameter Set (PPS), a picture header, a slice header, a tile group header, a Largest Coding Unit (LCU), a Coding Unit (CU), a LCU row, a group of LCUs, a Transform Unit (TU), a Prediction Unit (PU) block, or a video coding unit in the bitstream representation.

Figure 34:
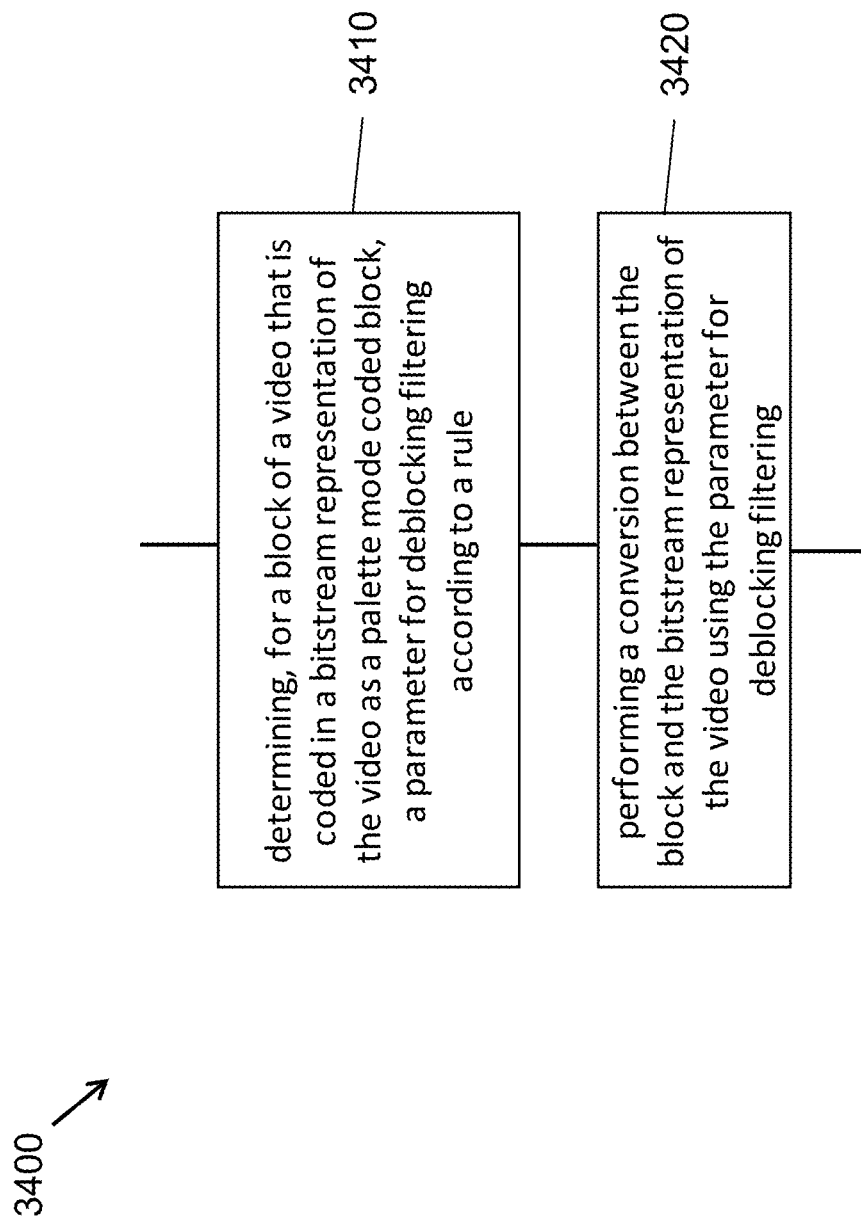
FIG. 34 is another flowchart representation of another method for video processing in accordance with the present technology.

FIG. 34 is a flowchart representation of a method 3400 for video processing in accordance with the present technology. The method 3400 includes, at operation 3410, determining, for a block of a video that is coded in a bitstream representation of the video as a palette mode coded block, a parameter for deblocking filtering according to a rule. The method 3400 also includes, at operation 3420, performing a conversion between the block and the bitstream representation of the video using the parameter for deblocking filtering.

In some embodiments, the rule specifies that, for the determining the parameter for deblocking filtering, the block is treated as an intra code block of the video.

In some embodiments, a boundary strength for the deblocking filtering is 2 in case a first side of a boundary of the block or a second side of the boundary of the block is coded in the palette mode. In some embodiments, a boundary strength for the deblocking filtering is determined to be 2 in case a first side of a boundary of the block and a second side of the boundary of the block are coded in the palette mode. In some embodiments, the rule specifies that, for the determining the parameter for deblocking filtering, the block is treated as an inter coded block of the video.

In some embodiments, the rule specifies that, for the determining the parameter for deblocking filtering, the palette mode is treated separately from other modes in the deblocking filtering. In some embodiments, a boundary strength for the deblocking filtering is determined to be 0 in case a first side of a boundary of the block or a second side of the boundary of the block is coded in the palette mode. In some embodiments, a boundary strength for the deblocking filtering is 1 in case a first side of a boundary of the block is coded in the palette mode and a second side of the boundary of the block is coded in an intra block copy (IBC) mode. In some embodiments, a boundary strength for the deblocking filtering is 2 in case a first side of a boundary of the block is coded in the palette mode and a second side of the boundary of the block is coded in an intra mode.

In some embodiments, the rule specifies that, for the determining the parameter for deblocking filtering, the palette mode is treated as a transform-skip mode in the deblocking filtering. In some embodiments, the rule specifies that, for the determining the parameter for deblocking filtering, the palette mode is treated as a block-based delta pulse code modulation (BDPCM) mode in the deblocking filtering.

Figure 35:
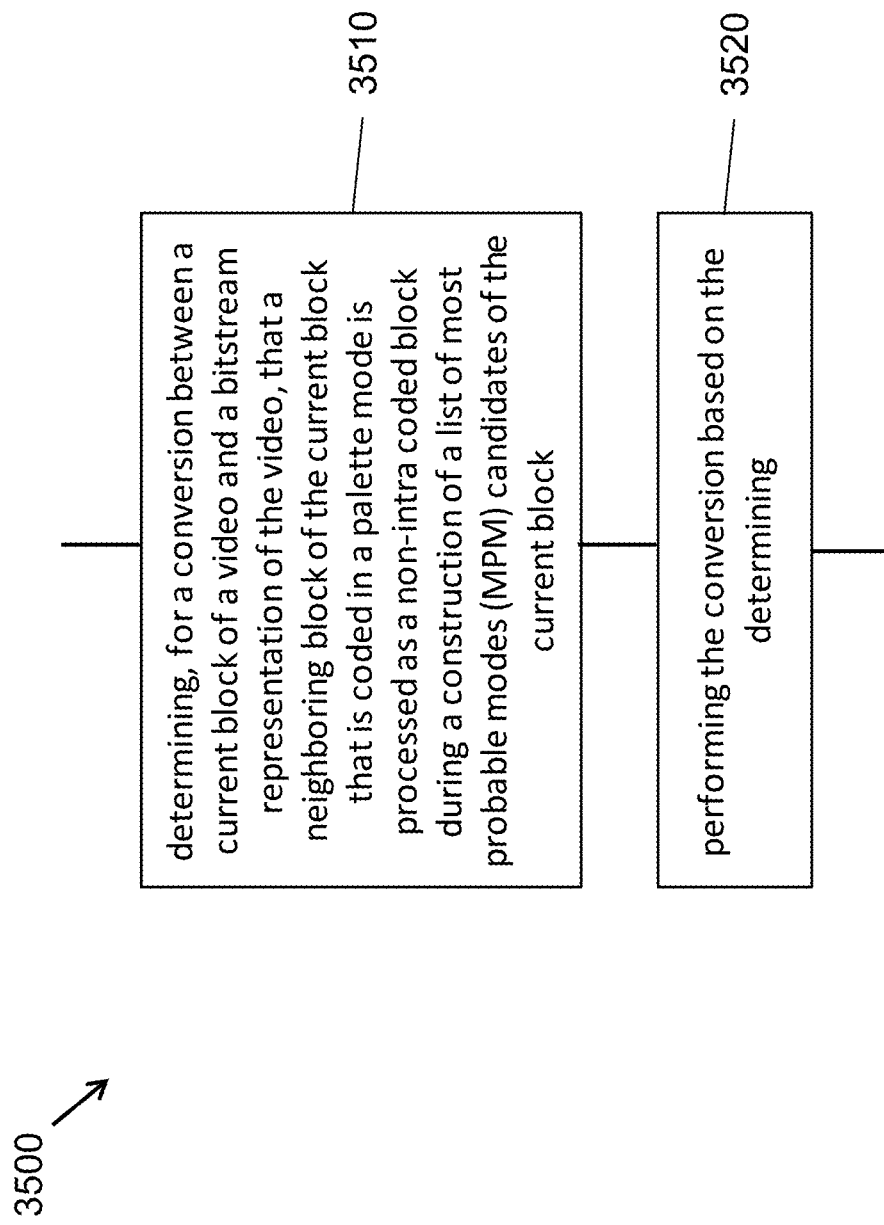
FIG. 35 is another flowchart representation of another method for video processing in accordance with the present technology.

FIG. 35 is a flowchart representation of a method 3500 for video processing in accordance with the present technology. The method 3500 includes, at operation 3410, determining, for a conversion between a current block of a video and a bitstream representation of the video, that a neighboring block of the current block that is coded in a palette mode is processed as a non-intra coded block during a construction of a list of most probable modes (MPM) candidates of the current block. The method 3500 also includes, at operation 3520, performing the conversion based on the determining.

In some embodiments, the neighboring block is processed as an inter-coded block in case the neighboring block is located above or left of the current block. In some embodiments, the neighboring block is processed as an intra block copy (IBC) coded block in case the neighboring block is located above or left of the current block.

FIG. 36A is a flowchart representation of a method 3600 for video processing in accordance with the present technology. The method 3600 includes, at operation 3610, determining, for a block of a video, a quantization parameter associated with the block. The method 3600 includes, at operation 3620, coding the block of the video into a bitstream representation of the video as a palette coded block in part based on a modified value of the quantization parameter. The method also includes, at operation 3630, signaling coded information related to the quantization parameter in the bitstream representation.

Figure 36B:
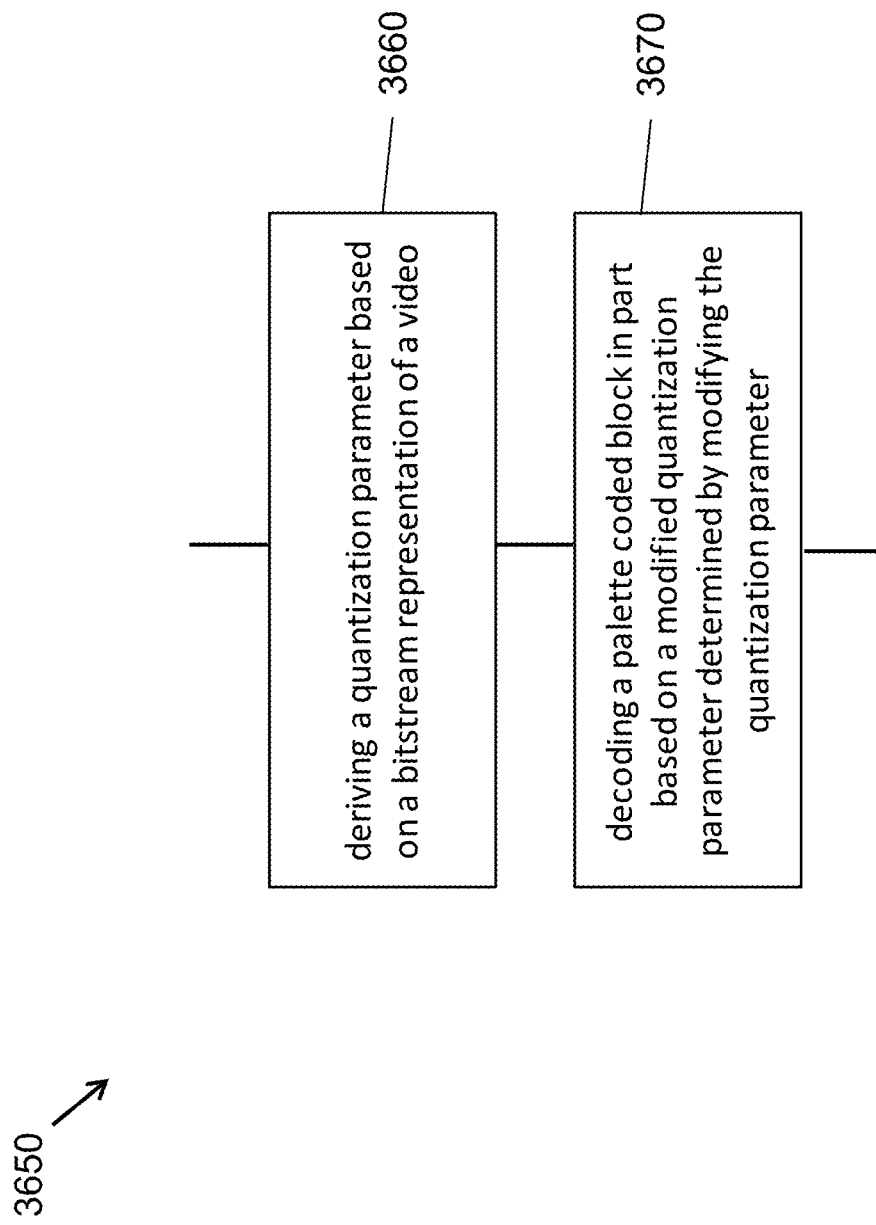
FIG. 36B is another flowchart representation of another method for video processing in accordance with the present technology.

FIG. 36B is a flowchart representation of a method 3650 for video processing in accordance with the present technology. The method 3650 includes, at operation 3660, deriving a quantization parameter based on a bitstream representation of a video. The method 3650 also includes, at operation 3670, decoding a palette coded block in part based on a modified quantization parameter determined by modifying the quantization parameter.

In some embodiments, the quantization parameter is modified based on setting a highest limit for the quantization parameter. In some embodiments, the quantization parameter is modified based on setting a lowest limit for the quantization parameter. In some embodiments, the quantization parameter is modified in a same manner as a second quantization parameter associated with a block coded in a transform skip mode. In some embodiments, the quantization parameter is modified in a same manner as a third quantization parameter associated with a block coded in a block-based delta pulse code modulation (BDPCM) mode.

In some embodiments, the quantization parameter is denoted as Qp, and wherein modifying the quantization parameter comprises revising a value of Qp to be max (Qp, 4+T), T being a non-negative integer value. In some embodiments, T is based on a predefined threshold. In some embodiments, T is 4+Ts, and Ts is signaled in the bitstream representation. In some embodiments, Ts is signaled in a syntax element min_qp_prime_ts_minus4 in the bitstream representation.

FIG. 37 is a flowchart representation of a method 3700 for video processing in accordance with the present technology. The method 3700 includes, at operation 3710, determining, for a block of a video that is coded in a bitstream representation of the video as a palette coded block, a representation of an escape sample of the block in the bitstream representation regardless of whether a bypass mode is enabled for the block. The method 3700 also includes, at operation 3720, performing a conversion between the block and the bitstream representation based on the determining.

In some embodiments, the escape sample is represented in the bitstream representation using a fixed length. In some embodiments, the fixed length comprises N bits, N being a positive integer. In some embodiments, N is 8 or 10.

In some embodiments, the escape sample is represented in the bitstream representation using a length determined based on an internal bit depth of the block. In some embodiments, the escape sample is represented in the bitstream representation using a length determined based on an input bit depth of the block. In some embodiments, the escape sample is represented in the bitstream representation using a length determined based on a quantization parameter of the block. In some embodiments, the length is defined as a function of the quantization parameter denoted as f(Qp). In some embodiments, an internal bit depth of the block is d, and wherein t(Qp)=(d−(Qp−4)/6).

Figure 38:
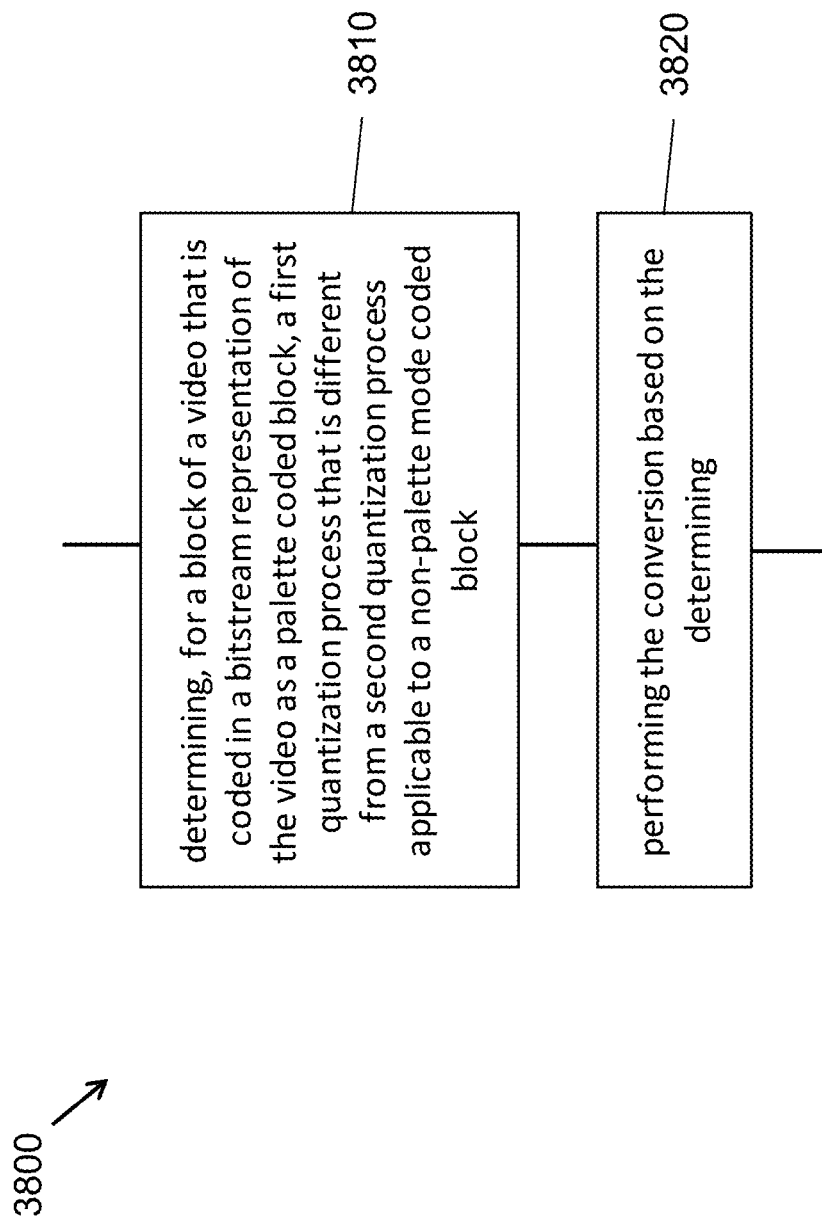
FIG. 38 is another flowchart representation of another method for video processing in accordance with the present technology.

FIG. 38 is a flowchart representation of a method 3800 for video processing in accordance with the present technology. The method 3800 includes, at operation 3810, determining, for a block of a video that is coded in a bitstream representation of the video as a palette coded block, a first quantization process. The first quantization process is different from a second quantization process applicable to a non-palette mode coded block. The method 3800 also includes, at operation 3820, performing a conversion between the block and the bitstream representation based on the determining.

In some embodiments, the first quantization process comprises right bit-shifting an escape sample of the block for quantizing the escape sample. In some embodiments, the first quantization process comprises left bit-shifting an escape sample of the block for inverse quantizing the escape sample. In some embodiments, a sample is denoted as p and a quantization sample is denoted as Qp, and wherein a value of the escape sample is coded as a function of p and Qp denoted as f(p, Qp). In some embodiments, f(p, Qp)=p>>((Qp−4)/6). In some embodiments, a sample is denoted as p and a value of the escape sample is coded as p>>N, N being an integer. In some embodiments, N is 2. In some embodiments, N is determined based on a characteristic associated with the block.

In some embodiments, the characteristic comprises a value signaled in a Sequence Parameter Set, a Video Parameter Set, a Picture Parameter Set, a picture header, a slice header, a tile group header, a row of Largest Coding Unit (LCU), or a group of LCUs. In some embodiments, the characteristic comprises an internal bit depth of the block. In some embodiments, the characteristic comprises an input bit depth of the block. In some embodiments, the characteristic comprises a dimension of the block. In some embodiments, the characteristic comprises a quantization parameter of the block. In some embodiments, the characteristic comprises an indication of a color format of the block. In some embodiments, the characteristic comprises a coding tree structure of the block. In some embodiments, the characteristic comprises a slice type, a tile group type, or a picture type associated with the block.

In some embodiments, a sample is denoted as p, a bit depth associated with the block is denoted as bd, and a quantization sample is denoted as Qp, and wherein a value of the escape sample is signaled as a function of bd, p and, Qp denoted as f(bd, p, Qp). In some embodiments, f(bd, p, Qp)=clip (0, (1<<(bd−(Qp−4)/6))−1, (p+(1<<(bd−1)))>((Qp−4)/6)). In some embodiments, f(bd, p, Qp)=clip(0, (1<<bd)−1, p<<((Qp−4)/6)). In some embodiments, clip is defined as clip(a, i, b)=(i<a?a: (i>b?b: i)). In some embodiments, clip is defined as clip(a, i, b)=(i<=a?a: (i>=b?b: i)). In some embodiments, the bit depth comprises an internal bit depth or an input bit depth.

Figure 39:
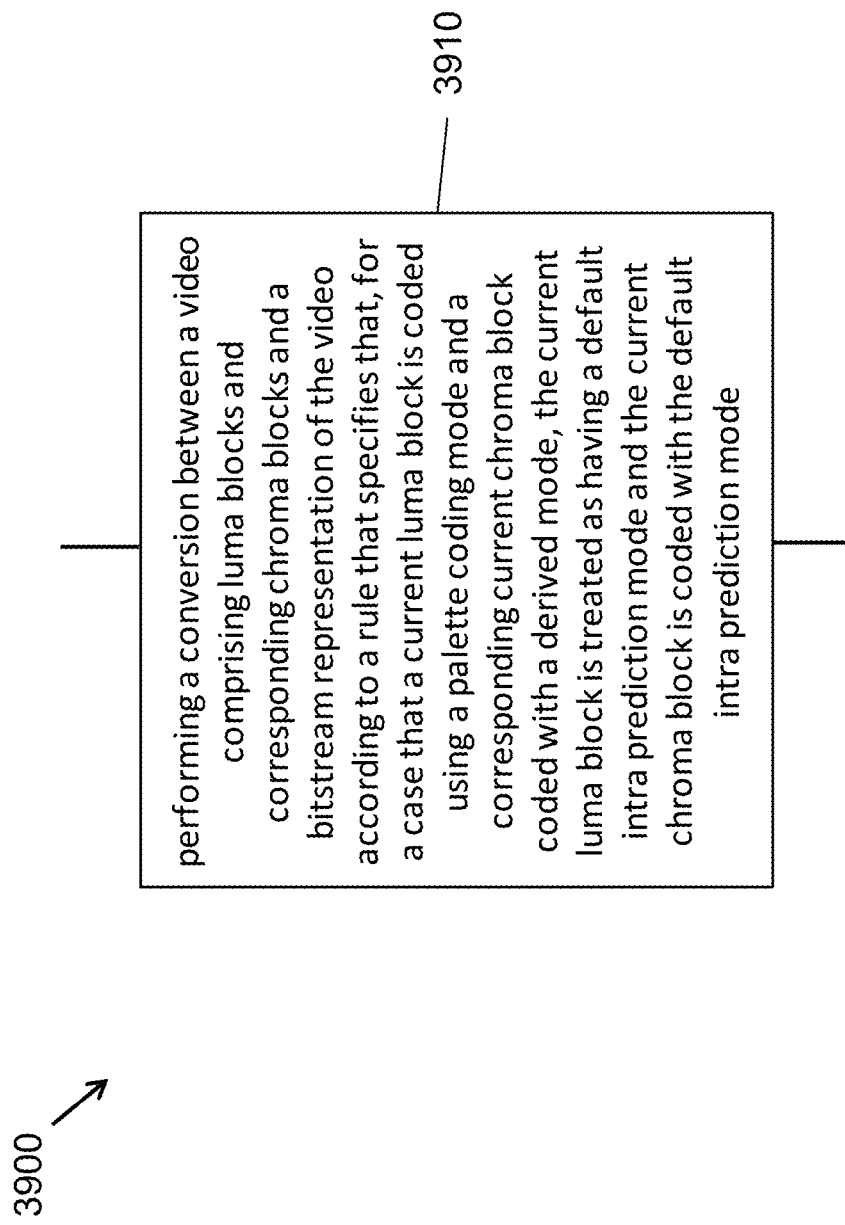
FIG. 39 is another flowchart representation of another method for video processing in accordance with the present technology.

FIG. 39 is a flowchart representation of a method 3900 for video processing in accordance with the present technology. The method 3900 includes, at operation 3910, performing a conversion between a video comprising luma blocks and corresponding chroma blocks and a bitstream representation of the video according to a rule. The rule specifies that, for a case that a current luma block is coded using a palette coding mode and a corresponding current chroma block coded with a derived mode, the current luma block is treated as having a default intra prediction mode and the current chroma block is coded with the default intra prediction mode. The palette coding mode comprises coding the current luma block using a palette of representative sample values.

In some embodiments, the current luma block coded using the palette coding mode is processed as an intra block. In some embodiments, the current luma block coded using the palette coding mode is processed as a palette block. In some embodiments, the default intra prediction mode comprises a IC mode, a planar mode, a vertical mode, or a horizontal mode. In some embodiments, the default intra prediction mode comprises any intra prediction mode. In some embodiments, the default intra prediction mode is signaled in a Dependency Parameter Set, a Sequence Parameter Set, a Video Parameter Set, a Picture Parameter Set, a Adaptation Parameter Set, a picture header, a slice header, a tile group header, a Largest Coding Unit (LCU), a Coding Unit (CU), an LCU row, a group of LCUs, a Transform Unit (TU), a Prediction Unit (PU) block, or a video coding unit.

Figure 40:
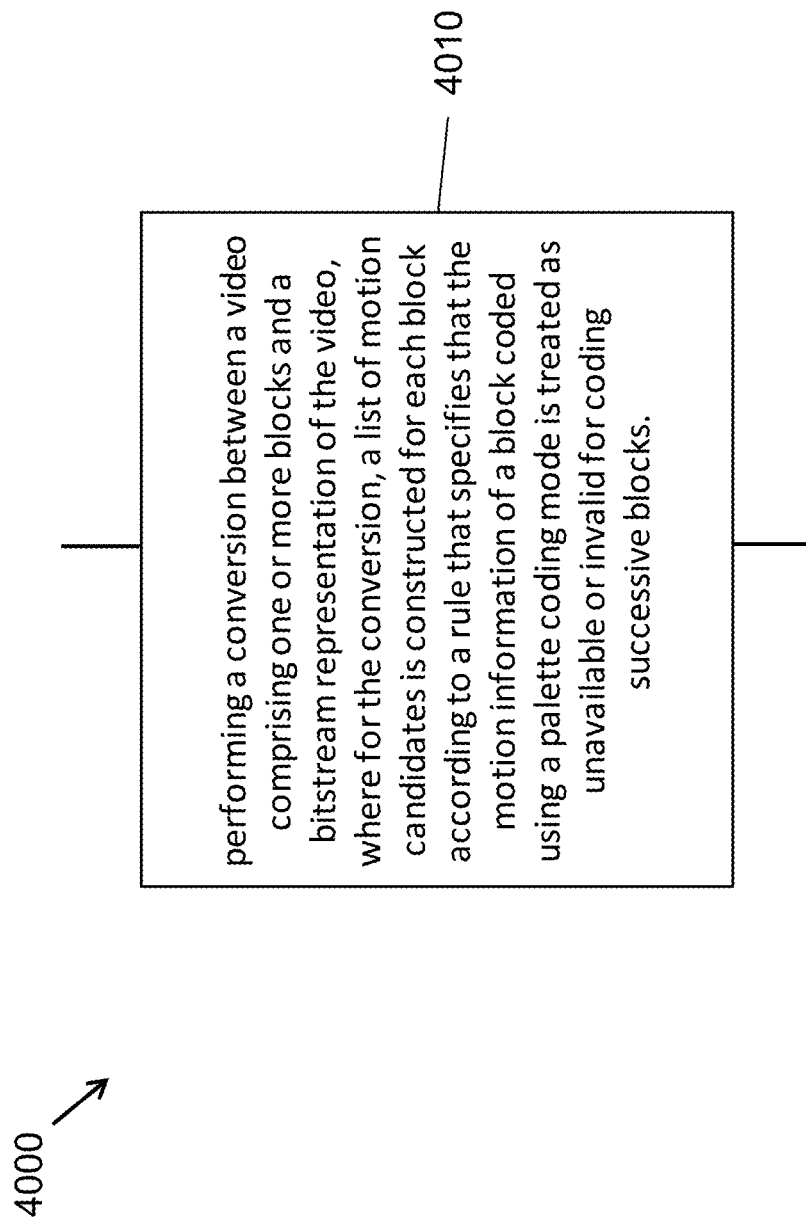
FIG. 40 is another flowchart representation of another method for video processing in accordance with the present technology.

FIG. 40 is a flowchart representation of a method 4000 for video processing in accordance with the present technology. The method 4000 includes, at operation 4010, performing a conversion between a video comprising one or more blocks and a bitstream representation of the video. For the conversion, a list of motion candidates is constructed for each block according to a rule. The rule specifies that the motion information of a block coded using a palette coding mode is treated as unavailable or invalid for coding successive blocks.

In some embodiments, the list of motion candidates comprises a history-based motion vector prediction candidate list. In some embodiments, the list of motion candidates comprises a merge candidate list. In some embodiments, the list of motion candidates comprises a motion vector prediction candidate.

In some embodiments, the block is treated as having an invalid reference index. In some embodiments, the block is treated as having a reference index of 0. In some embodiments, the block is treated as having a zero-motion vector.

In some embodiments, whether the rule is applicable is based on a characteristic associated with the block. In some embodiments, the characteristic comprises a video content in the block. In some embodiments, the characteristic comprises a message signaled in a Dependency Parameter Set, a Sequence Parameter Set, a Video Parameter Set, a Picture Parameter Set, a Adaptation Parameter Set, a picture header, a slice header, a tile group header, a Largest Coding Unit (LCU), a Coding Unit (CU), an LCU row, a group of LCUs, a Transform Unit (TU), a Prediction Unit (PU) block, or a video coding unit associated with the block. In some embodiments, the characteristic comprises a position of a video region associated with the block, the video region comprising a CU, a PU, a TU, or a video coding unit. In some embodiments, the characteristic comprises a dimension of the block or a neighboring block. In some embodiments, the characteristic comprises a shape of the block or a neighboring block. In some embodiments, the characteristic comprises an indication of a color format of the block. In some embodiments, the characteristic comprises a coding tree structure of the block. In some embodiments, the characteristic comprises a slice type, a tile group type, or a picture type of the block. In some embodiments, the characteristic comprises a color component of the block. In some embodiments, the characteristic comprises a temporal layer identifier of the block.

Figure 41:
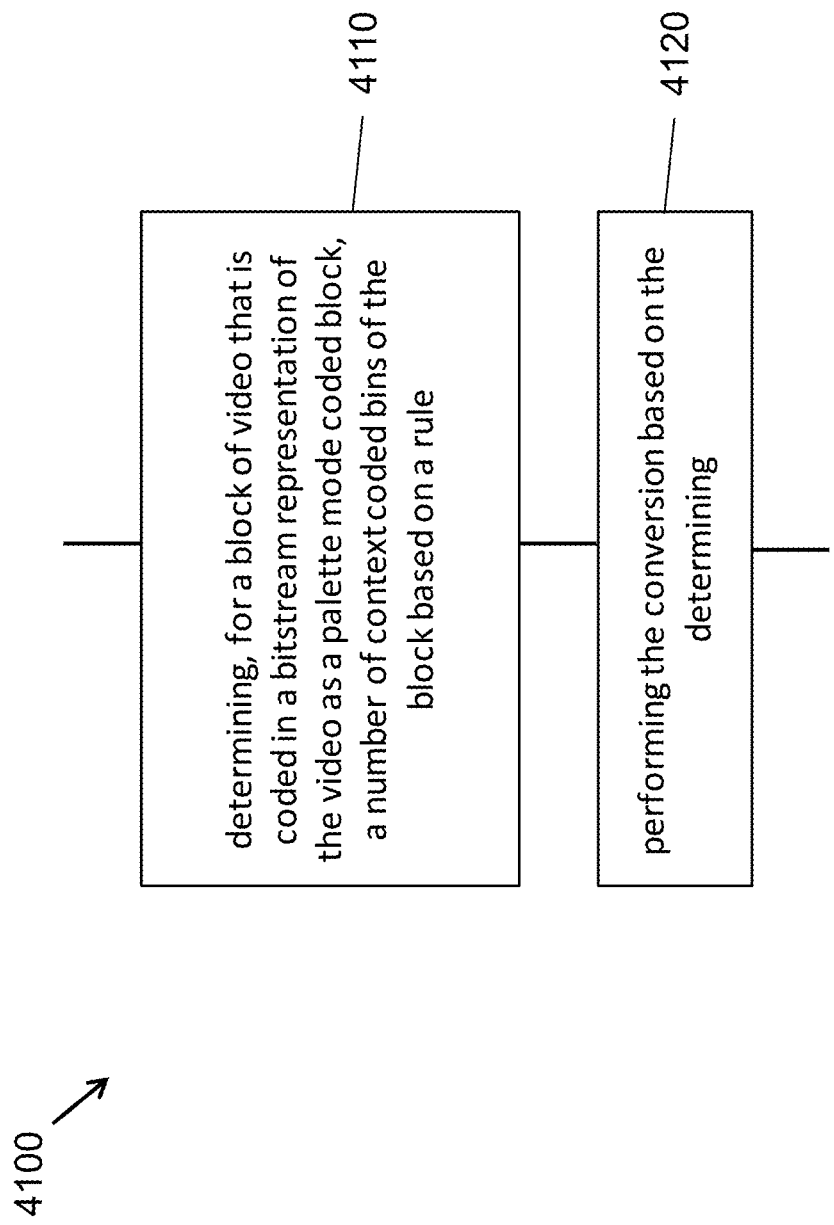
FIG. 41 is another flowchart representation of another method for video processing in accordance with the present technology.

FIG. 41 is a flowchart representation of a method 4100 for video processing in accordance with the present technology. The method 4100 includes, at operation 4110, determining, for a block of video that is coded in a bitstream representation of the video as a palette mode coded block, a number of context coded bins of the block based on a rule. The method 4100 also includes, at operation 4120, performing a conversion between the block of the video and the bitstream representation of the video based on the determining.

In some embodiments, determining the number of context coded bins comprises assigning a counter to the block to track the number of context coded bins. In some embodiments, the counter comprises a counter for tracking a number of components to be coded in the block. In some embodiments, the counter is initialized to 0 and incremented by one for each bin coded using context coding. In some embodiments, the counter is initialized to N, N being a positive integer. The counter is decremented by one for each bin coded using context coding.

In some embodiments, the rule specifies a threshold, the method further comprises applying bypass coding to additional number of bins that exceeds or falls short of the threshold. In some embodiments, the threshold is 0 or 1. In some embodiments, the threshold is determined based on a number of coding passes for the block or decoded information of the block In some embodiments, the threshold is determined based on a second threshold associated with a number of context coded bins for transport stream (TS) coded blocks or non-TS coded blocks. In some embodiments, the second threshold is denoted as T, T being a positive number. The rule specifies that the threshold is W×H×T, W being a width of the block, H being a height of the block. In some embodiments, the second threshold is denoted as T, T being a positive number. The rule specifies that the threshold is W×H×C-T, W being a width of the block, H being a height of the block, and C being a number of color components to be coded in the block. In some embodiments, T is 1.75 or 2. In some embodiments, the threshold is smaller than the second threshold. In some embodiments, the threshold is larger than the second threshold.

Figure 42:
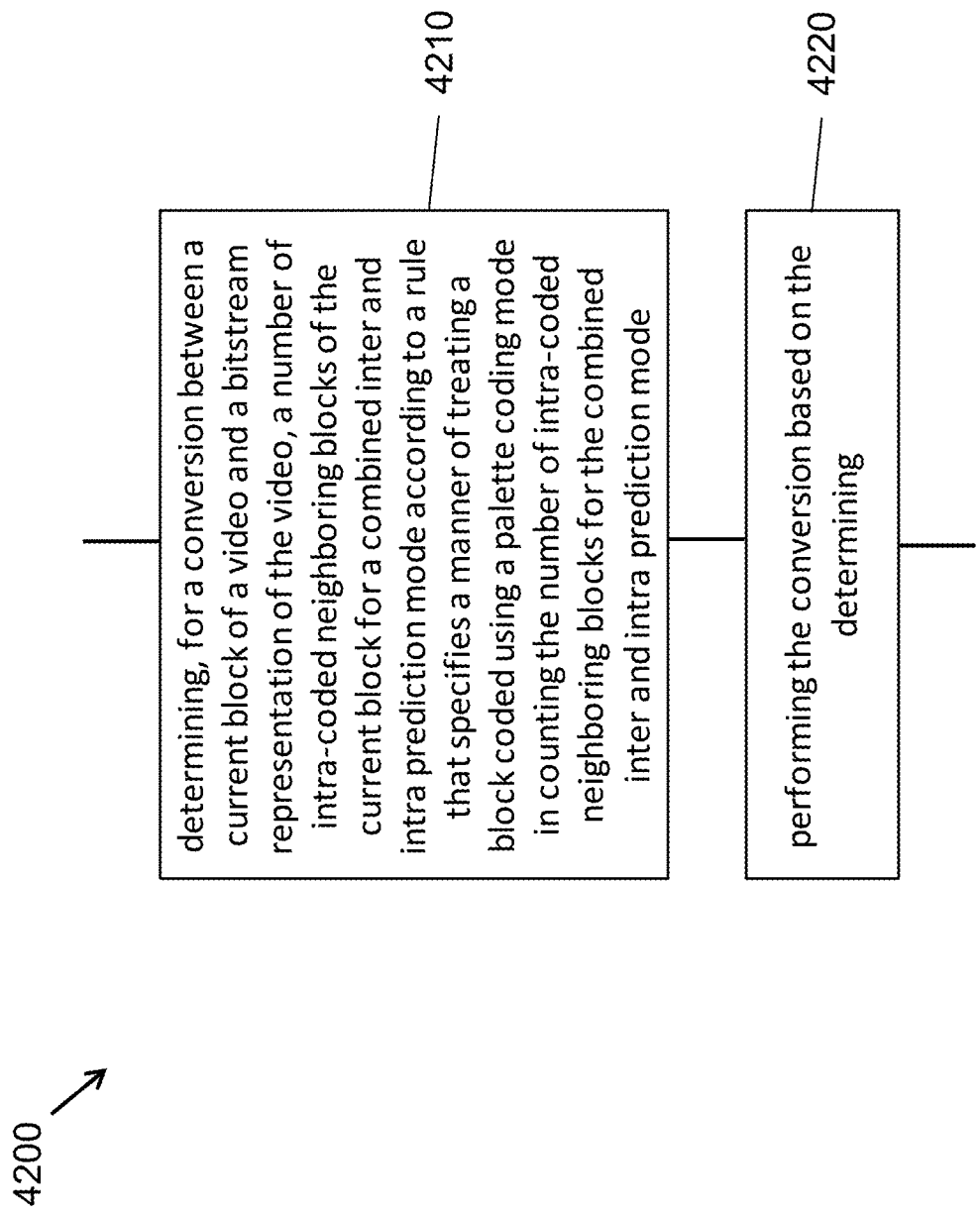
FIG. 42 is another flowchart representation of another method for video processing in accordance with the present technology.

FIG. 42 is a flowchart representation of a method 4200 for video processing in accordance with the present technology. The method 4200 includes, at operation 4210, determining, for a conversion between a current block of a video and a bitstream representation of the video, a number of intra-coded neighboring blocks of the current block for a combined inter and intra prediction mode according to a rule. The rule specifies a manner of treating a block coded using a palette coding mode in counting the number of intra-coded neighboring blocks for the combined inter and intra prediction mode, where using the palette coding mode comprises coding a block using a palette of representative sample values. The method 4200 also includes, at operation 4220, performing the conversion based on the determining.

In some embodiments, the manner specifies that a block coded using the palette coding mode is treated as a non-intra-coded block to be excluded from the counting of the number of intra-coded neighboring blocks. In some embodiments, the block coded using the palette coding mode is treated as a block having a prediction mode of MODE_PLT. In some embodiments, the block coded using the palette coding mode is treated as an inter-coded block. In some embodiments, the block coded using the palette coding mode is treated as a block coded in an intra-block copy (IBC) coding mode in which the current block is coded with samples from a current picture of the current block. In some embodiments, the block coded using the palette coding mode is a neighboring block above the current block or to the left of the current block.

In some embodiments, the manner specifies that a block coded using the palette coding mode is treated as an intra coded block to be included in the counting of the intra-coded neighboring blocks.

Figure 43:
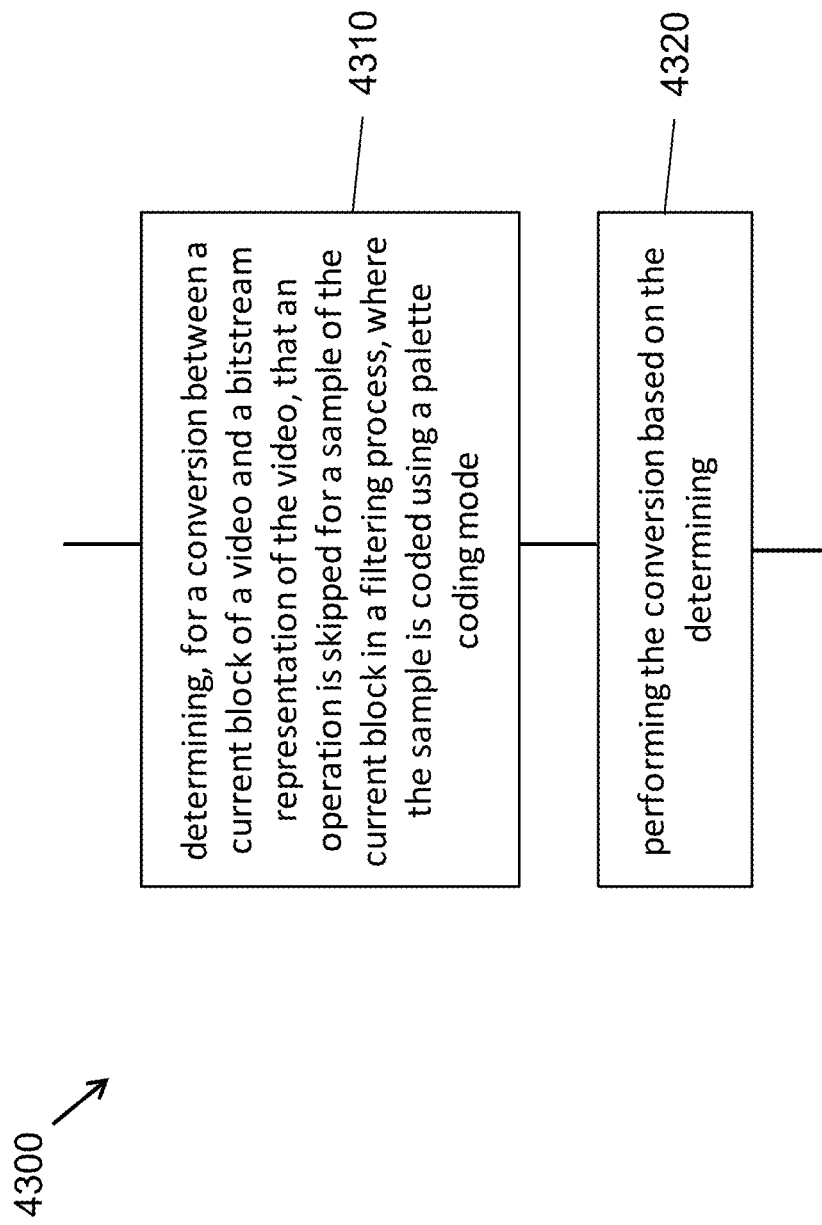
FIG. 43 is another flowchart representation of another method for video processing in accordance with the present technology.

FIG. 43 is a flowchart representation of a method 4300 for video processing in accordance with the present technology. The method 4300 includes, at operation 4310, determining, for a conversion between a current block of a video and a bitstream representation of the video, that an operation is skipped for a sample of the current block in a filtering process. The sample is coded using a palette coding mode, where using the palette coding mode comprises coding a block using a palette of representative sample values. The method 4300 also includes, at operation 4320, performing the conversion based on the determining.

In some embodiments, the operation comprises a deblock operation that smooths one or more boundaries of the current block. In some embodiments, the operation comprises compensating an offset in a sample adaptive offset process in which samples are categorized to reduce distortion. In some embodiments, the operation comprises a filtering operation in an adaptive loop filtering process. In some embodiments, the operation comprises a classification operation in an adaptive loop filtering process. In some embodiments, the operation comprises a luma mapping with chroma scaling operation in which luma samples are mapped using an adaptive piecewise linear model and chroma samples are subjected to a luma-dependent chroma residual scaling operation.

Figure 44:
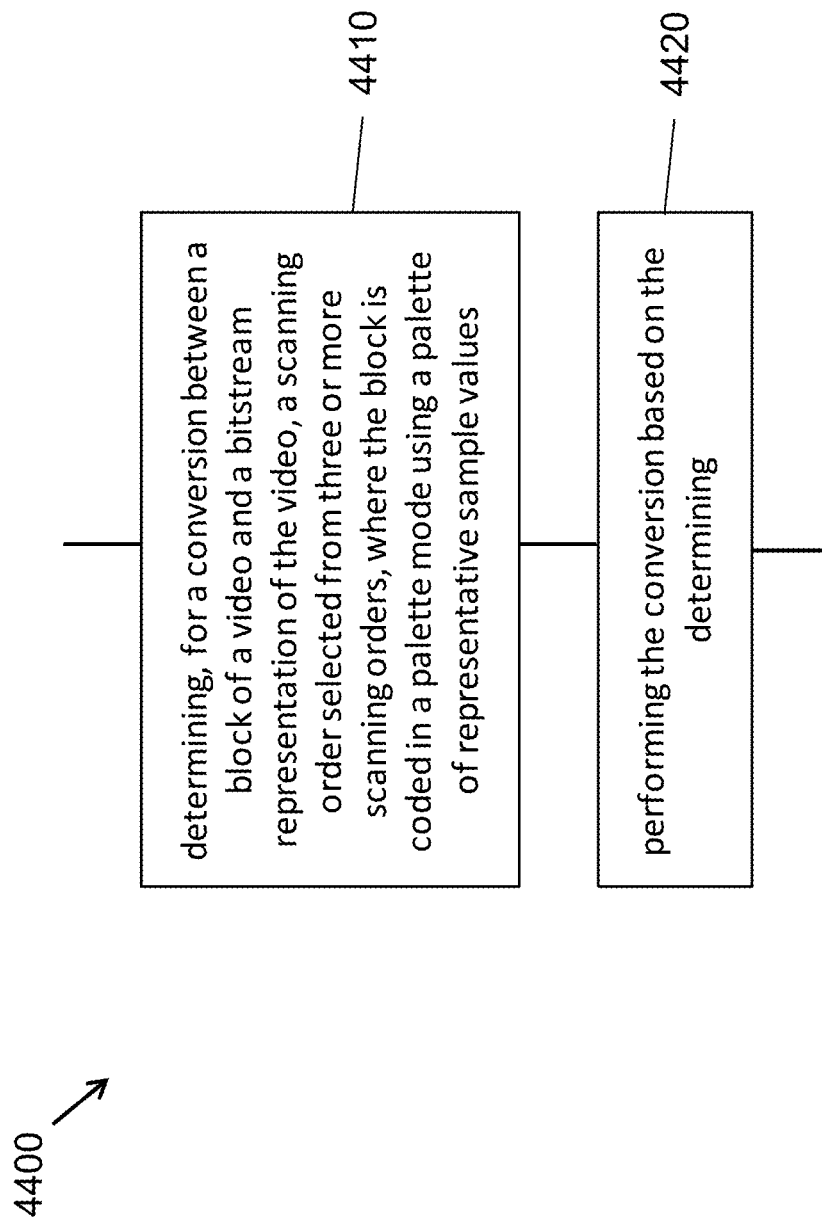
FIG. 44 is another flowchart representation of another method for video processing in accordance with the present technology.

FIG. 44 is a flowchart representation of a method 4400 for video processing in accordance with the present technology. The method 4400 includes, at operation 4410, determining, for a conversion between a block of a video and a bitstream representation of the video, a scanning order selected from three or more scanning orders. The block is coded in a palette mode using a palette of representative sample values. The method 4400 includes, at operation 4420, performing the conversion based on the determining.

In some embodiments, the three or more scanning orders comprise a reverse horizontal transverse scanning order. In some embodiments, the reverse horizontal transverse scanning order comprises scanning the block from left to right for rows having odd indices, where a first row of the block is assigned an index 0. In some embodiments, the reverse horizontal transverse scanning order comprises scanning the block from right to left for rows having even indices, where a first row of the block is assigned an index 0.

In some embodiments, the three or more scanning orders comprise a reverse vertical transverse scanning order. In some embodiments, the reverse vertical transverse scanning order comprises scanning the block from top to bottom for columns having odd indices, where a first column of the block is assigned an index 0. In some embodiments, the reverse vertical transverse scanning order comprises scanning the block from bottom to top for columns having even indices, where a first column of the block is assigned an index 0.

In some embodiments, the three or more scanning orders comprise a horizontal transverse scanning order that scans coefficients of the block from left to right for rows having even indices and from right to left for rows having odd indices. The three or more scanning orders further comprises a vertical transverse scanning order that scans the coefficients of the block from top to bottom for rows having even indices and from bottom to top for rows having odd indices, where a first row of the block is assigned an index 0 and a first column of the block is assigned an index 0.

Figure 45:
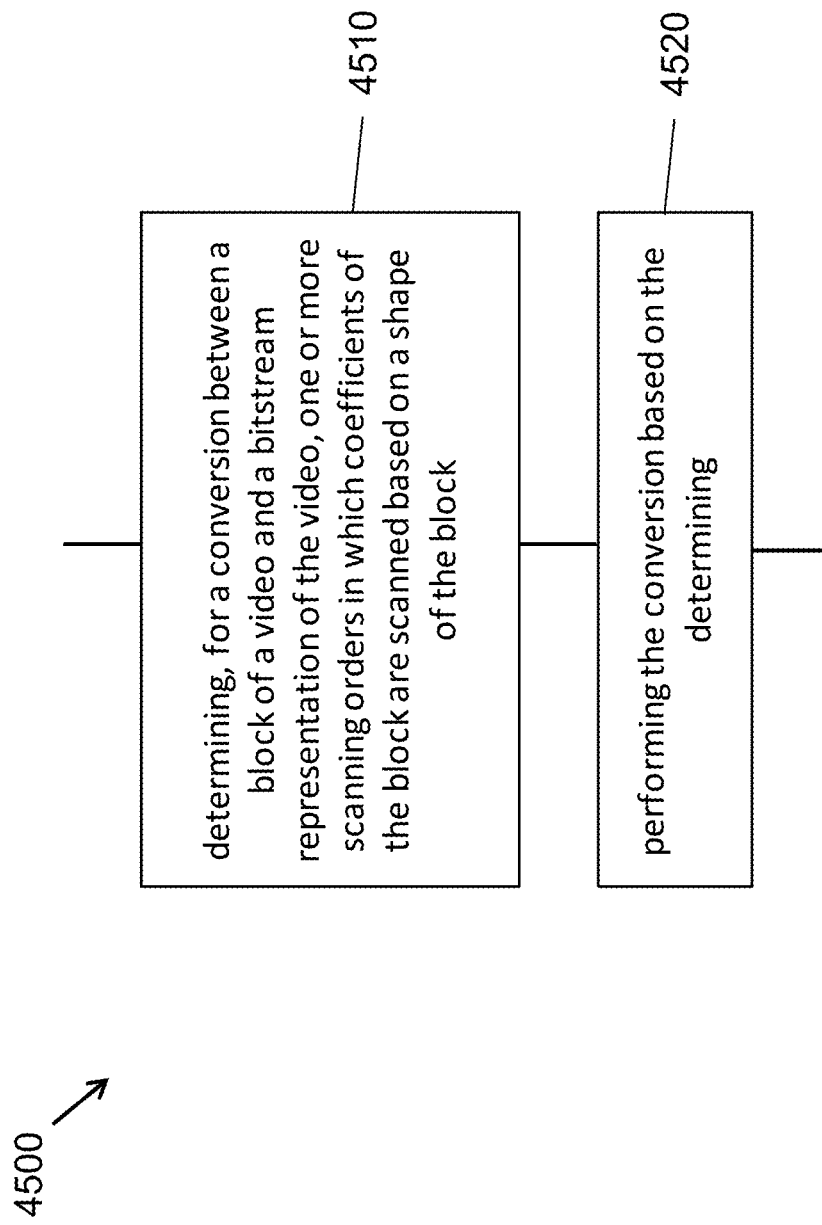
FIG. 45 is another flowchart representation of another method for video processing in accordance with the present technology.

FIG. 45 is a flowchart representation of a method 4500 for video processing in accordance with the present technology. The method 4500 includes, at operation 4510, determining, for a conversion between a block of a video and a bitstream representation of the video, one or more scanning orders in which coefficients of the block are scanned based on a shape of the block. The method 4500 also includes, at operation 4520, performing the conversion based on the determining.

In some embodiments, the one or more scanning orders are applied in case a ratio of a width over a height of the block is greater than a threshold. In some embodiments, the one or more scanning orders are applied in case a ratio of a height over a width of the block is greater than a threshold. In some embodiments, the threshold is equal to 1. In some embodiments, the threshold is equal to 4.

FIG. 46 is a flowchart representation of a method 4600 for video processing in accordance with the present technology. The method 4600 includes, at operation 4610, determining, for a conversion between a block of a video and a bitstream representation of the video, that only one scanning order in which coefficients of the block are scanned is applied to the block for a block-based quantized residual domain differential pulse coding modulation (BDPCM) process in which a difference between a quantized residual of an intra prediction of the block and a prediction of the quantized residual is represented in the bitstream representation of the block using a differential pulse coding modulation (DPCM). The method 4600 also includes, at operation 4620, performing the conversion based on the determining.

In some embodiments, the only one scanning order comprises scanning the block in a vertical direction in case a width of the block is greater than a height of the block. In some embodiments, the only one scanning order comprises scanning the block in a horizontal direction in case a width of the block is smaller than a height of the block. In some embodiments, the only one scanning order is derived based on a shape of the block.

In some embodiments, at least one scanning order is applicable in case a width of the block denoted as W and a height of the block denoted as H satisfy a condition. In some embodiments, the condition comprises W×Th≥H or H×Th≥W, Th being a threshold that is an integer. In some embodiments, Th is 4 or 8. In some embodiments, Th is determined based on a characteristic of the video. In some embodiments, the characteristic comprises a content of the video. In some embodiments, the characteristic comprises information signaled in a Decoder Parameter Set, a Slice Parameter Set, a Video Parameter Set, a Picture Parameter Set, a Adaptation Parameter Set, a picture header, a slice header, a tile group header, a largest coding unit (LCU), a Coding unit (CU), a row of a LCU, a group of LCUs, a Tree Unit (TU), a Picture Unit (PU) block, or a video coding unit of the bitstream representation. In some embodiments, the characteristic comprises a position of the block in a video picture of the video. In some embodiments, the characteristic comprises a dimension of the block or a dimension of a neighboring block of the block. In some embodiments, the characteristic comprises a shape of the block or a shape of a neighboring block of the block. In some embodiments, the characteristic comprises a color format of the block. In some embodiments, the characteristic comprises a coding tree structure of the video. In some embodiments, the characteristic comprises slice type, tile group type or a picture type of the video. In some embodiments, the characteristic comprises a color component of the block. In some embodiments, the characteristic comprises a temporal layer identity of the video. In some embodiments, the characteristic comprises a profile, a level, a tier of a standard for the video.

In some embodiments, the conversion generates the current block from the bitstream representation. In some embodiments, the conversion generates the bitstream representation from the current block.

Some embodiments of the disclosed technology include making a decision or determination to enable a video processing tool or mode. In an example, when the video processing tool or mode is enabled, the encoder will use or implement the tool or mode in the processing of a block of video, but may not necessarily modify the resulting bitstream based on the usage of the tool or mode. That is, a conversion from the block of video to the bitstream representation of the video will use the video processing tool or mode when it is enabled based on the decision or determination. In another example, when the video processing tool or mode is enabled, the decoder will process the bitstream with the knowledge that the bitstream has been modified based on the video processing tool or mode. That is, a conversion from the bitstream representation of the video to the block of video will be performed using the video processing tool or mode that was enabled based on the decision or determination.

Some embodiments of the disclosed technology include making a decision or determination to disable a video processing tool or mode. In an example, when the video processing tool or mode is disabled, the encoder will not use the tool or mode in the conversion of the block of video to the bitstream representation of the video. In another example, when the video processing tool or mode is disabled, the decoder will process the bitstream with the knowledge that the bitstream has not been modified using the video processing tool or mode that was enabled based on the decision or determination.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for processing video data, comprising:
    determining, for a conversion between a current block of a video and a bitstream of the video, a number of intra-coded neighboring blocks of the current block for a combined inter-intra prediction mode according to a rule,
    performing the conversion based on the determining,
    wherein in the combined inter-intra prediction mode, a prediction signal of the current block is generated at least based on an intra prediction signal and an inter prediction signal, and
    wherein the rule specifies that a first block coded using a first prediction mode is treated as a non-intra block to be excluded from counting of the number of intra-coded neighboring blocks,
    wherein in the first prediction mode, reconstructed samples are represented by a set of representative color values, and the set of representative color values comprises at least one of 1) palette predictors, 2) escaped samples, or 3) palette information included in the bitstream,
    wherein a first indication indicating whether to enable the first prediction mode for the first block is conditionally signaled in the bitstream when a width and a height of the first block are less than or equal to a first threshold respectively, and wherein the first indication is omitted from the bitstream in response to the width or the height of the first block being greater than the first threshold.

2. The method of claim 1, the first block is treated as a block having a prediction mode of MODE_PLT.

3. The method of claim 1, wherein the rule specifies that the first block is treated in a same manner as a second block coded in a second prediction mode in the counting of the number of intra-coded neighboring blocks,
    wherein in the second prediction mode, prediction samples are derived from blocks of sample values of a same video region as determined by block vectors.

4. The method of claim 3, wherein the second block is treated as a non-intra block to be excluded from the counting of the number of intra-coded neighboring blocks.

5. The method of claim 1, wherein a deblocking filtering process is skipped for a sample of the first block.

6. The method of claim 1, further comprising determining that a luma mapping process including a piecewise linear model is not applied for the first block.

7. The method of claim 1, wherein the first threshold is 64.

8. The method of claim 1, wherein the conversion includes encoding the video into the bitstream.

9. The method of claim 1, wherein the conversion includes decoding the bitstream from the video.

10. An apparatus for processing video data comprising a processor and a non-transitory memory with instructions thereon, wherein the instructions upon execution by the processor, cause the processor to:
    determine, for a conversion between a current block of a video and a bitstream of the video, a number of intra-coded neighboring blocks of the current block for a combined inter-intra prediction mode according to a rule,
    perform the conversion based on the determining,
    wherein in the combined inter-intra prediction mode, a prediction signal of the current block is generated at least based on an intra prediction signal and an inter prediction signal, and
    wherein the rule specifies that a first block coded using a first prediction mode is treated as a non-intra block to be excluded from counting of the number of intra-coded neighboring blocks,
    wherein in the first prediction mode, reconstructed samples are represented by a set of representative color values, and the set of representative color values comprises at least one of 1) palette predictors, 2) escaped samples, or 3) palette information included in the bitstream,
wherein a first indication indicating whether to enable the first prediction mode for the first block is conditionally signaled in the bitstream when a width and a height of the first block are less than or equal to a first threshold respectively, and wherein the first indication is omitted from the bitstream in response to the width or the height of the first block being greater than the first threshold.

11. The apparatus of claim 10, the first block is treated as a block having a prediction mode of MODE_PLT.

12. The apparatus of claim 10, wherein the rule specifies that the first block is treated in a same manner as a second block coded in a second prediction mode in the counting of the number of intra-coded neighboring blocks,
wherein in the second prediction mode, prediction samples are derived from blocks of sample values of a same video region as determined by block vectors.

13. The apparatus of claim 12, wherein the second block is treated as a non-intra block to be excluded from the counting of the number of intra-coded neighboring blocks.

14. The apparatus of claim 10, wherein a deblocking filtering process is skipped for a sample of the first block.

15. The apparatus of claim 10, wherein the instructions further cause the processor to: determine that a luma mapping process including a piecewise linear model is not applied for the first block.

16. The apparatus of claim 10, wherein the first threshold is 64.

17. A non-transitory computer-readable storage medium storing instructions that cause a processor to:
determine, for a conversion between a current block of a video and a bitstream of the video, a number of intra-coded neighboring blocks of the current block for a combined inter-intra prediction mode according to a rule,
perform the conversion based on the determining,
wherein in the combined inter-intra prediction mode, a prediction signal of the current block is generated at least based on an intra prediction signal and an inter prediction signal, and
wherein the rule specifies that a first block coded using a first prediction mode is treated as a non-intra block to be excluded from counting of the number of intra-coded neighboring blocks,
wherein in the first prediction mode, reconstructed samples are represented by a set of representative color values, and the set of representative color values comprises at least one of 1) palette predictors, 2) escaped samples, or 3) palette information included in the bitstream,
wherein a first indication indicating whether to enable the first prediction mode for the first block is conditionally signaled in the bitstream when a width and a height of the first block are less than or equal to a first threshold respectively, and wherein the first indication is omitted from the bitstream in response to the width or the height of the first block being greater than the first threshold.

18. A non-transitory computer-readable recording medium storing a bitstream of a video which is generated by a method performed by a video processing apparatus, wherein the method comprises:
determining, a number of intra-coded neighboring blocks of a current block of a video for a combined inter-intra prediction mode according to a rule,
generating the bitstream based on the determining,
wherein in the combined inter-intra prediction mode, a prediction signal of the current block is generated at least based on an intra prediction signal and an inter prediction signal, and
wherein the rule specifies that a first block coded using a first prediction mode is treated as a non-intra block to be excluded from counting of the number of intra-coded neighboring blocks,
wherein in the first prediction mode, reconstructed samples are represented by a set of representative color values, and the set of representative color values comprises at least one of 1) palette predictors, 2) escaped samples, or 3) palette information included in the bitstream,
wherein a first indication indicating whether to enable the first prediction mode for the first block is conditionally signaled in the bitstream when a width and a height of the first block are less than or equal to a first threshold respectively, and wherein the first indication is omitted from the bitstream in response to the width or the height of the first block being greater than the first threshold.

19. The non-transitory computer-readable storage medium of claim 17, the first block is treated as a block having a prediction mode of MODE_PLT,
wherein the rule specifies that the first block is treated in a same manner as a second block coded in a second prediction mode in the counting of the number of intra-coded neighboring blocks,
wherein in the second prediction mode, prediction samples are derived from blocks of sample values of a same video region as determined by block vectors.

20. The non-transitory computer-readable recording medium of claim 18, the first block is treated as a block having a prediction mode of MODE_PLT,
wherein the rule specifies that the first block is treated in a same manner as a second block coded in a second prediction mode in the counting of the number of intra-coded neighboring blocks,
wherein in the second prediction mode, prediction samples are derived from blocks of sample values of a same video region as determined by block vectors.

* * * * *